US012620380B1

(12) United States Patent
Janes

(10) Patent No.: US 12,620,380 B1
(45) **Date of Patent: *May 5, 2026**

(54) SYSTEMS, DEVICES, AND METHODS FOR DYNAMIC SYNCHRONIZATION OF A PRERECORDED VOCAL BACKING TRACK TO A VOCAL PERFORMANCE

(71) Applicant: Eidol Corporation, Studio City, CA (US)

(72) Inventor: Clayton Janes, Woodland Hills, CA (US)

(73) Assignee: Eidol Corporation, Studio City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/350,942

(22) Filed: Oct. 6, 2025

(51) Int. Cl.
*G10H 1/36* (2006.01)

(52) U.S. Cl.
CPC ....... *G10H 1/366* (2013.01); *G10H 2210/005* (2013.01); *G10H 2240/325* (2013.01)

(58) Field of Classification Search
CPC ............. G10H 1/366; G10H 2210/005; G10H 2240/325
See application file for complete search history.

(56) References Cited

U.S. PATENT DOCUMENTS 5,693,903 A 12/1997 Heidorn et al.
5,739,452 A 4/1998 Nagata
(Continued)

FOREIGN PATENT DOCUMENTS

CN 115550776 A 12/2022
EP 1962278 A1 8/2008
(Continued)

OTHER PUBLICATIONS

Sangeon Yong, Juhan Nam, Singing Expression Transfer from One Voice to Another for a Given Song, 2018 IEEE International Conference on Acoustics, Speech and Signal Processing (ICASSP), Apr. 2018, pp. 151-155, Institute of Electrical and Electronics Engineers, Piscataway, New Jersey.
(Continued)

*Primary Examiner* — Jeffrey Donels
(74) *Attorney, Agent, or Firm* — Stone Creek Services LLC; Alan M Flum

(57) ABSTRACT

Disclosed are systems, methods, and devices, that overcome timing and self-expression limitations experienced by vocalists when using prerecorded vocal backing tracks. The disclosed system, devices, and methods, dynamically synchronizes prerecorded vocal backing tracks with a vocal stream by extracting vocal elements, such as phonemes, vector embeddings, or vocal audio spectra, from the vocal performance. These extracted vocal elements are matched against corresponding timestamped vocal elements previously derived from the prerecorded vocal backing track, enabling precise adjustment and alignment of the backing track timing to the vocalist's performance. Additionally, the system enhances expressive performance by identifying prosody factors, such as pitch, vibrato, accent, stress, dynamics, and level, in the vocal performance, and dynamically adjusting corresponding prerecorded prosody factors within predefined ranges. This maintains naturalness and spontaneity in the vocalist's performance, overcoming traditional limitations associated with prerecorded vocal backing tracks.

21 Claims, 53 Drawing Sheets

(56) References Cited

U.S. PATENT DOCUMENTS

| | | | | |
|---|---|---|---|---|
| 5,750,912 | A | 5/1998 | Matsumoto | |
| 5,753,845 | A | 5/1998 | Nagata et al. | |
| 5,773,744 | A * | 6/1998 | Nagata | G10H 1/10 84/625 |
| 5,811,707 | A | 9/1998 | Kakehashi et al. | |
| 5,876,213 | A * | 3/1999 | Matsumoto | G10H 1/366 84/610 |
| 5,939,654 | A * | 8/1999 | Anada | G09B 15/002 84/610 |
| 5,966,687 | A | 10/1999 | Ojard | |
| 6,336,092 | B1 | 1/2002 | Gibson et al. | |
| 6,377,917 | B1 | 4/2002 | Gimenez de los Galanes et al. | |
| 6,836,761 | B1 | 12/2004 | Kawashima et al. | |
| 7,016,841 | B2 | 3/2006 | Kenmochi et al. | |
| 7,135,636 | B2 | 11/2006 | Kemmochi et al. | |
| 7,825,321 | B2 | 11/2010 | Bloom et al. | |
| 7,974,838 | B1 | 7/2011 | Lukin et al. | |
| 8,868,411 | B2 | 10/2014 | Cook et al. | |
| 9,412,390 | B1 | 8/2016 | Chaudhary | |
| 9,754,571 | B2 | 9/2017 | Salazar et al. | |
| 10,540,139 | B1 | 1/2020 | Janes | |
| 10,540,950 | B2 | 1/2020 | Nurse | |
| 10,871,937 | B2 | 12/2020 | Janes | |
| 10,885,894 | B2 | 1/2021 | Nam et al. | |
| 11,183,168 | B2 | 11/2021 | Yu et al. | |
| 11,232,787 | B2 | 1/2022 | Winsor | |
| 11,398,223 | B2 | 7/2022 | Kim | |
| 11,670,270 | B2 | 6/2023 | Yang et al. | |
| 12,444,393 | B1 * | 10/2025 | Janes | G10L 25/51 |
| 2003/0140770 | A1 | 7/2003 | Barry | |
| 2006/0112812 | A1 | 6/2006 | Venkataraman et al. | |
| 2012/0234158 | A1 | 9/2012 | Chan et al. | |
| 2017/0092252 | A1 | 3/2017 | Lopiccolo et al. | |
| 2018/0288467 | A1 | 10/2018 | Holmberg et al. | |
| 2019/0088161 | A1 | 3/2019 | Humphrey et al. | |
| 2021/0055905 | A1 | 2/2021 | Moldover et al. | |
| 2021/0191973 | A1 | 6/2021 | Marchini et al. | |
| 2021/0248985 | A1 | 8/2021 | Yang et al. | |
| 2021/0256968 | A1 | 8/2021 | Winsor | |
| 2022/0051448 | A1 | 2/2022 | Steinwedel et al. | |
| 2023/0082086 | A1 | 3/2023 | Echeveste et al. | |
| 2023/0351993 | A1 | 11/2023 | Kinnunen et al. | |

FOREIGN PATENT DOCUMENTS

| | | | |
|---|---|---|---|
| EP | 3869495 | A1 | 8/2021 |
| GB | 2422755 | A | 1/2005 |
| JP | 4323029 | B2 | 9/2009 |
| JP | 2000267677 | A | 10/2017 |
| JP | 6901955 | B2 | 7/2021 |
| WO | 2023227319 | A1 | 11/2023 |

OTHER PUBLICATIONS

Cristina Rottondi, Chris Chafe, Claudio Allocchio, and Augusto Sarti, An overview on networked music performance technologies, IEEE Access, vol. 4, pp. 8823-8843, Dec. 2016, Institute of Electrical and Electronics Engineers, Piscataway, New Jersey.

Patrick Cairns, Helena Daffern, and Gavin Kearney, Parametric Evaluation of Ensemble Vocal Performance Using an Immersive Network Music Performance Audio System, Journal of the Audio Engineering Society, vol. 69, No. 12, pp. 924-933, Dec. 2021, Audio Engineering Society, New York, New York.

Christopher Raphael, Music Plus One and Machine Learning. International Conference on Machine Learning (ICML) 2010, Jun. 2010, pp. 21-28.

Alex Baevski, Henry Zhou, Adelrahman Mohamed, Michael Auli, wav2vec 2.0: A Framework for Self-Supervised Learning of Speech Representations, Facebook AI, NIPS'20: Proceedings of the 34th International Conference on Neural Information Processing Systems Article No. 1044, Dec. 6, 2020, pp. 12449-12460 downloaded from the Internet from https://dl.acm.org/doi/pdf/10.5555/3495724.3496768 on Mar. 7, 2025.

Alex Baevski, Wei-Ning Hsu, Alexis Conneau, Michael Auli, Unsupervised Speech Recognition, NIPS'21: Proceedings of the 35th International Conference on Neural Information Processing Systems Article No. 2131, Dec. 6, 2021, pp. 27826-27839, downloaded from the Internet from https://proceedings.neurips.cc/paper/2021/file/ea159dc9788ffac311592613b7f71fbb-Paper.pdf on Mar. 9, 2025.

Zplane Elastique Pro 3.3.7 Documentation, Sep. 2021, zplane.development GmbH & Co. KG, downloaded from the Internet from https://licensing.zplane.de/uploads/SDK/ELASTIQUE-PRO/V3/manual/elastique_pro_v3_sdk_documentation.pdf on Mar. 13, 2025.

Kaizhi Qian, Yang Zhang, Heiting Gao, Junrui Ni, Cheng-I, Jeff Lai, David Cox, Mark Hasegawa-Johnson, Shiyu Chang, Contentvec: An Improved Self-Supervised Speech Representation by Disentangling Speakers, Proceedings of the 39th International Conference on Machine Learning, Baltimore, Maryland, USA, PMLR 162, 2022, downloaded from the Internet on Mar. 18, 2025 from https://arxiv.org/pdf/2204.09224.

Welcome to Matchmaker's Documentation!, dowloaded from the Internet at https://pymatchmaker.readthedocs.io/en/latest/ on Mar. 20, 2025.

Neil Zeghidour, et al., SoundStream: An End-to-End Neural Audio Codec, arXiv:2107.03312v1, Jul. 7, 2021, downloaded from the Internet from https://arxiv.org/pdf/2107.03312 on Aug. 19, 2025.

Systems, Devices, and Methods for Dynamic Synchronization of a Prerecorded Vocal Backing Track to a Live Vocal Performance, U.S. Appl. No. 19/182,460, filed Apr. 17, 2025, Inventor: Clayton Janes, Applicant and Assignee: Eidol Corporation, Studio City California, United States Patent and Trademark Office, Alexandria, Virginia.

Systems, Devices, and Methods for Dynamic Synchronization of a Prerecorded Vocal Backing Track to a Vocal Performance, U.S. Appl. No. 63/886,246, filed Sep. 23, 2025, Inventor: Clayton Janes, Applicant and Assignee: Eidol Corporation, Studio City California, United States Patent and Trademark Office, Alexandria, Virginia.

Systems, Devices, and Methods for Dynamic Synchronization of a Prerecorded Vocal Backing Track to a Live Vocal Performance, U.S. Appl. No. 19/350,557, filed Oct. 6, 2025, Inventor: Clayton Janes, Applicant and Assignee: Eidol Corporation, Studio City California, United States Patent and Trademark Office, Alexandria, Virginia.

* cited by examiner 124a 124b 124c

124

| | | |
|---|---|---|
| 0.93 | 1.33 | 'ɪts |
| 1.42 | 1.55 | 'eɪ |
| 1.64 | 2.05 | 'bju: |
| 2.08 | 2.32 | tə |
| 2.34 | 2.70 | fʊl |
| 2.75 | 2.84 | 'deɪ |
| 2.84 | 2.95 | 'əʊ |

FIG. 4

134

134b 134a

| | | | | | | | | | | | |
|---|---|---|---|---|---|---|---|---|---|---|---|
| 0.90 | $n_1$ | $n_2$ | $n_3$ | $n_4$ | $n_5$ | $n_6$ | $n_7$ | $n_8$ | ... | $n_{299}$ | $n_{300}$ |
| 0.92 | $n_1$ | $n_2$ | $n_3$ | $n_4$ | $n_5$ | $n_6$ | $n_7$ | $n_8$ | ... | $n_{299}$ | $n_{300}$ |
| 0.94 | $n_1$ | $n_2$ | $n_3$ | $n_4$ | $n_5$ | $n_6$ | $n_7$ | $n_8$ | ... | $n_{299}$ | $n_{300}$ |
| 0.96 | $n_1$ | $n_2$ | $n_3$ | $n_4$ | $n_5$ | $n_6$ | $n_7$ | $n_8$ | ... | $n_{299}$ | $n_{300}$ |
| 0.98 | $n_1$ | $n_2$ | $n_3$ | $n_4$ | $n_5$ | $n_6$ | $n_7$ | $n_8$ | ... | $n_{299}$ | $n_{300}$ |
| 1.00 | $n_1$ | $n_2$ | $n_3$ | $n_4$ | $n_5$ | $n_6$ | $n_7$ | $n_8$ | ... | $n_{299}$ | $n_{300}$ |
| 1.02 | $n_1$ | $n_2$ | $n_3$ | $n_4$ | $n_5$ | $n_6$ | $n_7$ | $n_8$ | ... | $n_{299}$ | $n_{300}$ |
| 1.04 | $n_1$ | $n_2$ | $n_3$ | $n_4$ | $n_5$ | $n_6$ | $n_7$ | $n_8$ | ... | $n_{299}$ | $n_{300}$ |
| 1.06 | $n_1$ | $n_2$ | $n_3$ | $n_4$ | $n_5$ | $n_6$ | $n_7$ | $n_8$ | ... | $n_{299}$ | $n_{300}$ |
| 1.08 | $n_1$ | $n_2$ | $n_3$ | $n_4$ | $n_5$ | $n_6$ | $n_7$ | $n_8$ | ... | $n_{299}$ | $n_{300}$ |
| 1.10 | $n_1$ | $n_2$ | $n_3$ | $n_4$ | $n_5$ | $n_6$ | $n_7$ | $n_8$ | ... | $n_{299}$ | $n_{300}$ |
| 1.12 | $n_1$ | $n_2$ | $n_3$ | $n_4$ | $n_5$ | $n_6$ | $n_7$ | $n_8$ | ... | $n_{299}$ | $n_{300}$ |
| 1.14 | $n_1$ | $n_2$ | $n_3$ | $n_4$ | $n_5$ | $n_6$ | $n_7$ | $n_8$ | ... | $n_{299}$ | $n_{300}$ |
| 1.16 | $n_1$ | $n_2$ | $n_3$ | $n_4$ | $n_5$ | $n_6$ | $n_7$ | $n_8$ | ... | $n_{299}$ | $n_{300}$ |

FIG. 5

144

| 144b | 144a |
| --- | --- |
| 0.90 | FFT #1 |
| 0.91 | FFT #2 |
| 0.92 | FFT #3 |
| 0.93 | FFT #4 |
| 0.94 | FFT #5 |
| 0.95 | FFT #6 |
| 0.97 | FFT #7 |
| 0.98 | FFT #8 |
| 0.99 | FFT #9 |
| 1.00 | FFT #10 |
| 1.01 | FFT #11 |
| 1.02 | FFT #12 |
| 1.03 | FFT #13 |
| 1.04 | FFT #14 |

FIG. 6

SYSTEMS, DEVICES, AND METHODS FOR DYNAMIC SYNCHRONIZATION OF A PRERECORDED VOCAL BACKING TRACK TO A VOCAL PERFORMANCE

BACKGROUND

Audience enjoyment of live music often hinges on the quality and consistency of the vocalist's performance. Even seasoned professionals frequently encounter various challenges during live performances. These challenges may include vocal strain from rigorous touring schedules, age-related changes in vocal range and stamina, lifestyle factors impacting vocal health, fatigue from travel and from consecutive performances, and illness adversely impacting vocal quality. Such challenges may significantly diminish a vocalist's overall performance quality, undermining their confidence and detracting from the audience experience.

To address such performance challenges, performing artists may utilize prerecorded vocal backing tracks. A prerecorded vocal backing track is a previously captured recording of a vocalist's performance, intended to support, supplement, or entirely replace segments of their live vocal performance. Typically, such tracks may be recorded in controlled settings, such as professional recording studios, to ensure optimal vocal quality. During live performances, a playback engineer manually cues and initiates playback of the prerecorded vocal backing track at precise moments. The front-of-house audio engineer subsequently mixes the prerecorded vocal backing track with the live vocal signal during selected portions of the performance, occasionally substituting the prerecorded track entirely for specific song segments. In scenarios where a prerecorded vocal backing track fully replaces or significantly supplements live vocals, the vocalist often must mime or "lip-sync" their performance so it visually aligns with the prerecorded vocal track.

Prerecorded vocal backing tracks are also used in scenarios where the result is recorded rather than fed to a live audience. For example, motion picture films, television shows, and music videos use prerecorded vocal backing tracks. A performer in a motion picture film or television show may sing a song or mime singing a song to a prerecorded vocal backing track. Similarly, in a music video, the performer either sings, or pretends to sing, to a prerecorded backing track. In the above scenarios, the final result is generally an audio recording of the prerecorded vocal backing track combined with a visual recording of the performer miming or singing to the prerecorded vocal track.

SUMMARY

The Inventor, through extensive experience in performance technology for major touring acts, has identified significant drawbacks in current prerecorded vocal backing track usage.

First, while the prerecorded vocal backing track is in use, the vocalist's timing is critical. The vocalist needs to carefully mime or mimic the performance and make sure that their lip and mouth movements follow the prerecorded vocal backing track. Second, when the prerecorded vocal backing track is used to replace segments of a vocalist's live singing, unique nuances of their live performance, such as deliberate changes in timing, pitch, vibrato, and emphasis, are lost.

In motion picture, television, and music video production, the performer's timing is also critical, when using prerecorded vocal backing tracks. While the performer may not necessarily be singing to a live audience, their lip and mouth movements, as they sing to or mime the prerecorded vocal backing track, are captured as motion picture images. For this reason, the same issues described in the immediately preceding paragraph, may also apply here. For example, mis-synchronization of the performer's lip movement may require editing out the mis-synchronized portions, or reshooting the scene.

The Inventor's systems, devices, and methods, overcome the timing issues discussed above. It does so by dynamically controlling timing of a prerecorded vocal backing track, so it is time-synchronized to a vocal performance. For example, the timing of the prerecorded vocal backing track may be dynamically controlled by using vocal elements extracted from a vocal stream of the vocalist's performance; then matching the extracted vocal elements to timestamped vocal elements from the prerecorded vocal backing track; and using the matched vocal elements to manipulate the timing of the prerecorded vocal backing track. This can be carried out in realtime, but may also be carried out offline. Examples of vocal elements include phonemes, vector embeddings, or vocal audio spectra.

The Inventor's systems, devices, and methods overcome the self-expression issue by identifying prosody factors such as vibrato, accent, stress, and level (loudness or volume) in the vocal stream of the vocalist's performance. These prosody factors are then applied, within a preset range, to corresponding prosody factors in the prerecorded vocal backing track in realtime or in non-realtime, depending on the application.

Typically, the prerecorded vocal backing track may be preprocessed to identify, extract, and timestamp vocal elements such as phonemes, vector embeddings, or vocal audio spectra. The prerecorded vocal backing track may also be preprocessed to identify, extract, and timestamp prosody factors. Preprocessing may reduce processing requirements and latency, which is helpful in realtime applications such as live performances.

Unlike music learning and practice systems that perform tempo matching (i.e., detect and match musical beats measured in beats/minute), timestamping vocal elements as described within this disclosure, allows for precision alignment of vocals within a prerecorded vocal backing track in realtime (i.e., approximately 30 milliseconds or less). This allows timestamping, as described in this disclosure, sufficient for miming or lip syncing in a live performance venue.

During a live vocal performance, vocal elements, such as phonemes, vector embeddings, or vocal audio spectra, may be extracted from the vocal stream of the live vocal performance, in realtime, as they occur. For a vocal performance, such as a music video, motion picture, or cloud-based video, the vocal elements may be identified and extracted, offline, from a recording of the vocal performance. The extracted vocal elements with their time position can be optionally stored in temporal alignment map, for example, as a table or timing map giving vocal element values for a given point in time.

The prerecorded vocal backing track, and timestamped vocal elements from the prerecorded vocal backing track, and may be preloaded into the system performing the vocal element extraction, matching, and dynamic synchronization before the processing occurs. The timestamped vocal elements may be stored in a table or timing map. The timestamped vocal element from the prerecorded vocal backing track are matched and dynamically aligned to the vocal elements extracted from the vocal stream. With the timestamped vocal elements matched to the vocal elements from the live vocal performance, the vocal elements within the prerecorded vocal backing track are time compressed or expanded to match the timing of the corresponding vocal elements in the vocal performance. Typically, this extraction, matching, and alignment process may be accomplished using a machine-learning predictive algorithm. For realtime application, the process of vocal element identification, extraction, matching, and synchronization of the prerecorded vocal backing track, and outputting a resulting dynamically controlled prerecorded vocal backing track, can take place in realtime (i.e., typically under 30 ms). For non-realtime applications, the process can take place offline. The vocal element identification and extraction software may be pretrained before the vocal performance to help facilitate vocal element identification.

Vocal element types such as phonemes, vocal audio spectra, and vector embeddings may be used alone or in combination with one another. If the system uses multiple vocal element types at the same time, the system may use a confidence weighting system to predict more accurate alignment. This can reduce processing latency while maintaining accurate synchronization and prevent unnecessary correction. A confidence score is a numerical value that reflects the probability that the vocal performance and the prerecorded vocal backing track are time-synchronized. A confidence score may be dynamically assigned by comparing the time position of a vocal element within the vocal stream to a corresponding timestamped vocal element extracted from the prerecorded vocal backing track signal. For example, phonemes may use connectionist temporal classification between the two signals to create a confidence score. Vector embeddings may use cosine similarity to create a confidence score. Vocal audio spectra may use spectral correlation to create a confidence score. The device takes an average of the confidence scores. The device, would time-stretch or time compress the prerecorded vocal backing track signal in realtime to maintain alignment if the confidence level of the average of the confidence scores falls below a predetermined confidence threshold. The process of confidence weighting may take place in realtime, for applications requiring realtime processing, and may take place offline for applications not requiring realtime processing.

The vocal stream resulting from the analog-to-digital conversion process, may be represented by a pulse-code-modulation (PCM) stream. Alternatively, the vocal stream may be represented in other audio formats as a neural audio codec pipeline and processed in the neural audio codec latent feature space. Examples of a neural audio codec include, but are not limited to, SoundStream by Alphabet, Inc. or Encodec by Meta Platforms Inc. Vocal elements extraction may be performed directly in the neural audio codec's latent feature space rather than using a PCM stream. This reduces bandwidth and latency while preserving alignment accuracy.

Phoneme and vector embeddings identification, matching, and extraction may be carried out using machine learning models such as ContentVec, Wave2Vec 2.0, Whisper, Riva, and HuBERT. Vocal audio spectra may be extracted, for example, using a fast Fourier Transform (FFT) taken at time intervals to capture how the vocal audio spectra varies over time. Vocal element extraction may be performed PCM domain. Alternatively, vocal element extraction may be performed in the latent feature space of a neural audio codec, rather than in the PCM domain, to reduce bandwidth and processing latency while preserving alignment accuracy. Additional predictive modeling techniques may be used to enhance alignment accuracy. Examples of these additional predictive models include Kalman filters, state-space models, reinforced learning, and deep learning neural networks.

Time alignment, or time-synchronization of the prerecorded vocal backing track a vocal performance, or vocal stream, may be carried out using a dynamic time-compression and expansion algorithm. For example, by software modules such as Zplane Élastique, Dirac Time Stretching, Zynaptiq ZTX, or Audiokinetic Wwise to perform dynamic time warping. Time alignment may alternatively be carried out using neural network-based phoneme sequence modeling, reinforcement learning-based synchronization, or hybrid predictive time warping. For example, time alignment of the next phoneme's position, without computing a full cosine transform matrix, might be predicted using a neural network-based phoneme sequencing model, a recurrent neural network, or a transformer.

The following is a non-limiting example of how the vocal backing track synchronization unit may dynamically control one or more prosody parameters within the prerecorded vocal backing track. Vector embeddings and prosody factors may be pre-extracted from the prerecorded vocal backing track. During this preprocessing phase, the preprocessing system creates a timestamped and contextual prosody factor map. The map may be loaded into the vocal backing track synchronization system before backing track alignment phase.

During the backing track alignment phase, vocal elements, such as vector embeddings, extracted from the vocal stream are continuously loaded into the predictive model. This may occur in realtime for applications requiring it, such as live vocal performances. Vocal elements may be extracted at a periodic frame interval in the PCM domain. Vocal elements may alternatively be extracted using a neural audio codec such as SoundStream, Encodec, or equivalent. As a non-limiting example, the periodic frame interval in neural audio codec feature latent space (i.e., latent frame) may be 20-milliseconds. Each periodic frame interval produces a latent feature vector used for alignment. The resulting extracted vocal elements are loaded into a predictive model. The predictive model may forecast alignment of the resulting extracted vocal elements. As a non-limiting example, the forecast alignment may occur in an interval 50-200 milliseconds ahead of the current frame position, enabling realtime prosody factor adjustment while maintaining sub-30-millisecond latency (i.e., for the purpose of this disclosure, in realtime).

These predictions are passed into the prosody factor adjustment algorithm for synchronization. The prosody parameters are adjusted within a preset range according to user input controls. This preset range may be adjusted for example, by the playback engineer (i.e., the engineer responsible for the backing tracks and other effects), by the front-of-house engineer (the engineer responsible for sending the final mix to the audience), a mix engineer, post-production engineer, or a content creator, depending on the application. In this example, if the vocalist sings off key, the prerecorded vocal backing track can be adjusted to reflect variation in the singer's pitch, but within a more acceptable and pleasing range. In another example, if the vocalist sings louder or softer, the prerecorded vocal backing track can be adjusted automatically to reflect this variation in the singer's loudness, but within an acceptable range. For live vocal performances, the backing track alignment phase can be processed in realtime.

In a live performance scenario, the playback engineer, or system user, may control a standalone device by an interface within the device or by a software interface from a computer or mobile device in communication with the standalone device. It may alternatively be controlled by a computer with sufficient processing and GPU capability to perform the necessary calculations in realtime. Both the live vocal signal and the prerecorded vocal backing track may be sent to the front-of-house audio mixing console. The signals may be sent as a multichannel digital audio signal, for example, via MADI, AES67, ADAT Lightpipe, Dante, or Ravenna. Alternatively, the signals may be sent to the front-of-house mixer as analog audio signals. The front-of-house mixer also receives audio signals from the other performers such as guitar players, keyboardists, drummers, horns, or acoustic string instruments. The front-of-house engineer mixes the signals and sends the resulting mix to speakers for the audience to hear.

In some live performance scenarios, a live performance may be transmitted for broadcast, for example to a broadcast truck at a live venue or to a local partner facility. Before a live broadcast, the prerecorded vocal backing track and the timestamped vocal elements extracted from the prerecorded vocal backing track may be stored on an edge infrastructure. Non-limiting examples of edge infrastructures include content delivery network (CDN) nodes, a broadcast truck at the venue, or local systems at partner facilities. During the live performance, a vocal element timing map generated from the live vocal performance is sent in realtime to the edge servers. The vocal element timing map may be compact, allowing it to be transmitted in realtime over the network. The alignment map contains time-stretch and compression instructions, which are applied locally to the prerecorded vocal backing track. This eliminates the need to transmit large audio files during the event and minimizes latency. The prerecorded vocal backing track may be prepositioned to a known start point to further reduce latency.

In another example, a vocalist may perform from a remote location away from the live performance venue. As, an example, this might be a guest vocalist. A prerecorded vocal backing track may be dynamically synchronized to the vocalist's performance. As an example, an audience at the live performance venue might see video, and hear audio of a vocalist performing at the remote location. The audio could be their actual live performance or could include portions that are from a dynamically-synchronized prerecorded vocal backing track. As the vocalist sings at the remote location, vocal elements are identified and extracted, in realtime, from the vocalist's vocal stream. The prerecorded vocal backing track, heard by the audience, is dynamically synchronized to the vocalist's vocal stream, by using the vocal elements extracted from their vocal stream, matched to timestamped vocal elements from the prerecorded vocal backing track. As an example, a vocal element extraction algorithm may identify and extract vocal elements from the vocalist's live vocal stream. A live vocal stream timing map is created from the extracted vocal elements. A dynamic synchronization algorithm dynamically synchronizes the timing of the prerecorded vocal backing track to the vocalist's live vocal stream using the live vocal stream timing map, in combination with a pre-loaded timing map of timestamped vocal elements pre-extracted from the prerecorded vocal backing track.

The identification and extraction of the vocal elements from the vocalist's live performance could be performed at the remote venue. Alternatively, the identification and extraction of vocal elements from the vocal stream could be performed at the live performance venue. Dynamically controlling the timing of the prerecorded vocal backing track typically takes place at the live performance venue, but could take place at the remote location. The front-of-house mix engineer, or the playback engineer, may choose whether to send the dynamically-synchronized prerecorded vocal backing track or the vocalist's remote live vocal performance through the speakers to the audience. In either case, the video that the audience sees, and audio that the audience hears, are synchronized, without any modification to the video. This is because the video is a true representation of the vocalist's remote live vocal performance. With the prerecorded vocal backing track dynamically aligned to the vocalist's remote live vocal performance, the audience will hear the prerecorded vocal backing track in synch with the video that they see.

In another example, a second vocalist, such as a fan, may sing vocals of a first vocalist's songs on an interactive music platform. For example, a fan may perform the vocals of professional artist's song. The second vocalist's vocal performance is used as the control vocal to drive timing adjustments to the first vocalist's prerecorded vocal backing track. This reverses the conventional direction of alignment. In a conventional scenario, such as performing Karaoke, the second vocalist's performance follows the artist's prerecorded track and is what is heard by their audience. In contrast, using the methods, system, and devices of this disclosure, the second vocalist's live vocal performance is as a control input to modify the timing, and optionally, prosody factors, of the prerecorded vocal backing track of the first vocalist. This results in an output where only the first vocalist's voice, from the prerecorded vocal backing track, is heard, but with timing and phrasing following the second vocalist's performance.

The second vocalist's live vocal performance may be used to produce a duet with the prerecorded vocal backing track of the first vocalist. As described above, the second vocalist's live vocal performance modifies the timing of the prerecorded vocal backing track and may also be used to adjust prosody factors of the original vocalist's performance on the prerecorded vocal backing track. In this scenario, however, the second vocalist's vocal performance is retained in the final mix includes both a mix of the second vocalist's live vocal performance and the original artist's vocal performance. In one instance, the relative level between the second vocalist's live vocal performance and the original artist's vocal performance may be set to a predetermined ratio, or mix. In another instance, the relative level between the second vocalist's live vocal performance and the original artist's vocal performance may be may be adjustable. Alternatively, the second vocalist may choose between a predetermined mix or an adjustable mix.

The following are examples of how the Inventor's systems, devices, and methods may be applied to scenarios where time aligning a vocal performance or adjusting prosody factors do not necessarily need to be carried out in realtime.

An example where the Inventor's systems, devices, and methods need not be carried out in realtime is in motion pictures, television shows, or music videos. Currently, in the motion picture, television, and music video industries, a performer, such as an actor or singer, mimes or mimics a prerecorded vocal backing track. The prerecorded vocal backing track may include their own, or someone else's performance.

The Inventor's systems, devices, and methods time-align the prerecorded vocal backing track to the motion picture visual images by dynamically controlling the timing, and optionally, prosody factors, of the prerecorded vocal backing track using the vocal elements extracted from the performer's vocal performance. The performer's singing is recorded while making the motion picture or music video. Vocal elements are extracted from the recording and, optionally, a timing map may be created. Vocal elements extracted from the vocalist's performance may be used to control the prerecorded vocal track during post production, or editing. This results in audio that is lip synchronized to the motion picture or video stream without manipulation of video or video timing.

Using the same principle, a fan or other content creator could record audio and video of themselves singing on their mobile device or computer and upload the saved performance to a cloud-based platform. Examples of cloud-based platform, include YouTube, Vimeo, TikTok, or Instagram. Vocal elements extracted from the uploaded file control the timing, and optionally, prosody factors, of a prerecorded vocal backing track to match the fan or content creator's performance.

For example, a fan, or content creator, could record a video of themselves, or someone else, performing a cover of an artist's prerecorded vocal track. A music cover tool, using aspects of the Inventor's systems, methods, or devices, could synchronize or modify prosody factors of the artist's prerecorded vocal track to the fan's vocal performance. The resulting time synchronized, or prosody factor-modified prerecorded vocal backing track can be combined with the original video image file and published on the cloud-based platform.

In one scenario, the process of vocal element extraction, time-alignment, or prosody factor adjustment may take place on the fan's mobile device or personal computer. The resulting video file containing the synchronized vocal backing track could be uploaded to the cloud-based platform for publication. In another scenario, the process could take place on the cloud-based platform, or other remote server or servers. For example, the fan would upload the audio and video file of their performance, or combined audio and video file, and the cloud-based platform would do the vocal element extraction and time-alignment of the prerecorded vocal backing track. In yet another scenario, part of the process could take place on the fan's computer or mobile device while the remainder of the process could take place on the cloud-based platform.

A prerecorded vocal backing track could be time synchronized or prosody-factor adjusted from a synthetically generated voice. A synthetically generated voice, with specified timing or voice prosody could be used to adjust or correct audio recordings in a recording studio environment or in post-production. For persons with vocal disabilities, but with control over a synthetically generated voice, the Inventor's systems, methods, and devices described herein could use the person's synthetic voice to control the timing and prosody of a prerecorded vocal backing track. The prerecorded vocal backing track could be for example, sung words or spoken words. A robot with synthetic vocal capabilities could use their voice to control the timing or prosody of a prerecorded vocal backing track.

The vocal backing track alignment system may include a microphone preamplifier, an analog-to-digital converter, one or more processors, and a tangible medium such as a solid-state drive (SSD), DRAM, ECC RAM, hard drive, flash memory, or other digital storage medium. The tangible medium may store non-transitory computer-readable instructions that may be applied to one or more processors. These devices may be housed together and presented as a standalone device (for example, within a vocal backing track synchronization unit). Alternatively, the components may be presented in separate units. For example, the one or more processors could be housed within a computer, multiple computers, or a combination of a standalone device and one or more computers.

As an example, the microphone preamplifier within the standalone device may be structured to receive a vocal performance from a microphone. The analog-to-digital converter may be connected to the microphone preamplifier and may be structured to produce a digital audio signal. The tangible medium may include software routines that instruct one or more of the processors to dynamically control the timing of a prerecorded vocal backing track. This may optionally be done in realtime, as discussed above.

This Summary discusses various examples and concepts. These do not limit the inventive concept. Other features and advantages can be understood from the Detailed Description, figures, and claims.

BRIEF DESCRIPTION OF DRAWINGS

FIGS. 4, 5, and 6 illustrate a conceptual view of a timestamped phoneme table, timestamped multi-dimensional vector embeddings, and timestamped FFT-generated spectral data, respectively.

FIG. 47 illustrates a visual recording studio setup, FIG. 48 illustrates the post-production or editing process, and FIG. 49 illustrates the resulting alignment of the audio to the video images.

DETAILED DESCRIPTION

Figure 1:
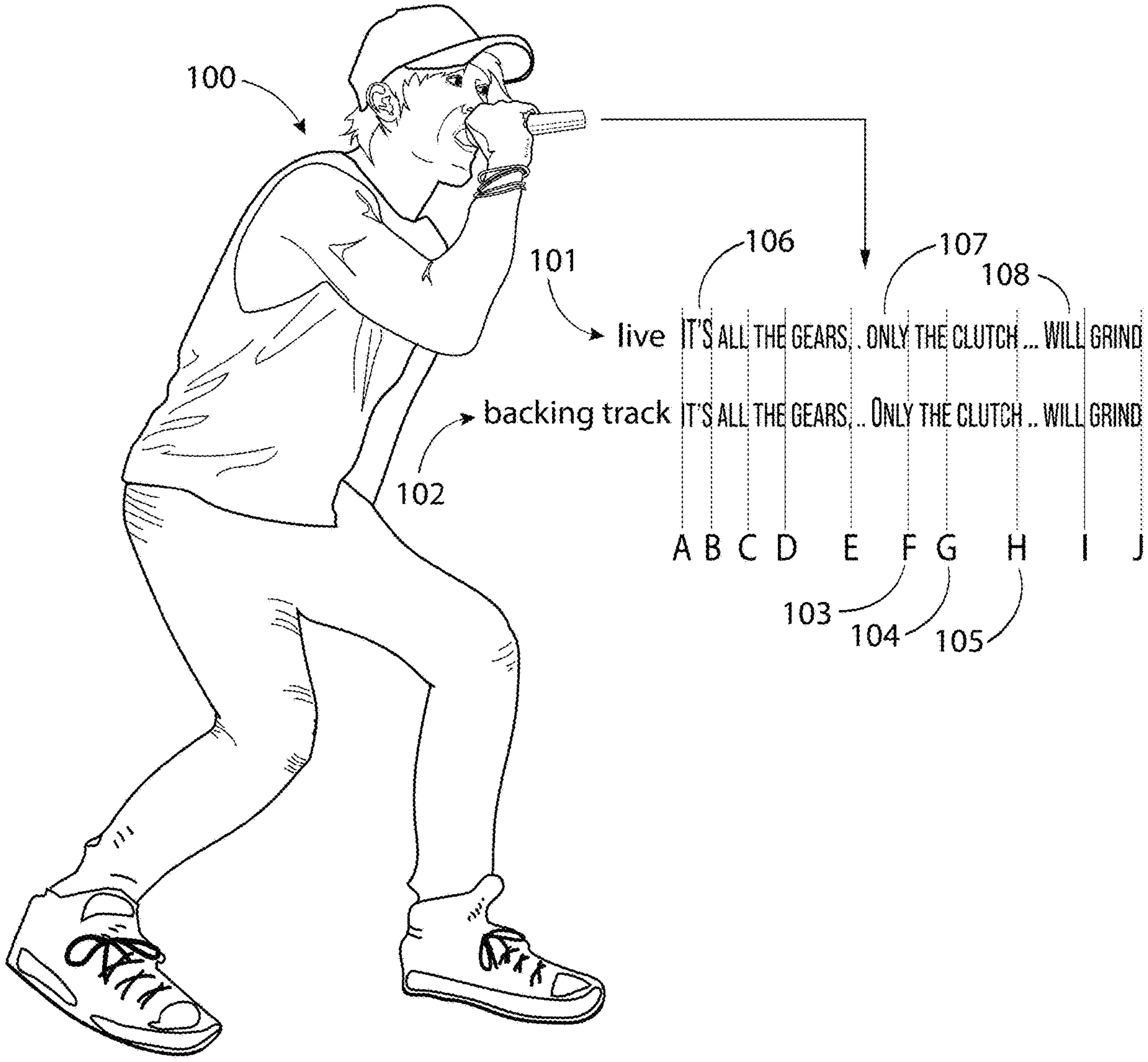
FIG. 1 illustrates, a vocalist singing lyrics with portions that deviate from a prerecorded vocal backing track.

The Detailed Description and claims may use ordinals such as "first," "second," or "third," to differentiate between similarly named parts. These ordinals do not imply order, preference, or importance. Unless otherwise indicated, ordinals do not imply absolute or relative position. This disclosure uses "optional" to describe features or structures that are optional. Not using the word "optional" does not imply a feature or structure is not optional. In this disclosure, "or" is an "inclusive or," unless preceded by a qualifier, such as either, which signals an "exclusive or." An "or" may also be interpreted as an exclusive or if the, in the context of the sentence or phrasing where the "or" is used, an inclusive or would produce a non-sensical result. As used throughout this disclosure, "comprise," "include," "including," "have," "having," "contain," "containing" or "with" are inclusive, or open ended, and do not exclude unrecited elements. The words "a" or "an" mean "one or more."

This disclosure uses the terms front-of-house engineer or playback engineer as examples of persons typically found in a large-venue live sound production. The term live sound engineer is used to denote a person operating a live sound mixer, or PA mixer, in a general live sound setting. The disclosure uses the term mix engineer to describe a person operating an audio mixing console or a digital audio workstation within a recording studio. The term live broadcast engineer is used to denote a person operating audio equipment during a live television or streaming broadcast. The operation of these systems or devices are not limited to such individuals. Within the meaning of this disclosure, the more general terms "operator" or "equipment operator" equally apply and are equivalent. The terms "fan," or "content creator," may be denote a person who might be using or operating systems, devices, or methods described within some of the examples within this disclosure. The use of these terms within the disclosure does not limit the usage of these devices to fans or content creators. The more general terms "user," "equipment operator," or "operator" equally apply.

The Detailed Description includes the following sections: "Definitions," "Overview," "General Principles and Examples," and "Conclusion," and Variations."

Definitions

Lip Syncing: As defined in this disclosure, lip syncing means the act of a vocal performer miming or mimicking a prerecorded performance so that their lip or mouth movements follow the prerecorded performance.

Vocal Elements: As defined in this disclosure, a vocal element is a representation or descriptor of a vocal (singing) signal, which may be derived directly from it physical/acoustic properties or generated by data driven methods. Examples of physical/acoustic properties include phonemes, frequency spectra, or time-domain signal envelopes. Examples of data driven methods include vector embeddings that may encode acoustic, linguistic, semantic, or other vocal attributes.

Overview

As discussed in the Summary, the Inventor through extensive experience in performance technology for major touring acts, has identified significant drawbacks in current prerecorded vocal backing track usage. The Inventor observed that while prerecorded vocal backing tracks are useful in helping to enhance live vocal performances, they have a number of drawbacks. First, while the prerecorded vocal backing track is in use, the vocalist's timing is critical. The vocalist needs to carefully mime or mimic the performance and make sure that their lip and mouth movements follow the prerecorded vocal backing track. Second, prerecorded vocal backing tracks can remove a degree of individual expression as they do not allow for the vocalist to spontaneously express themselves. Referring to FIG. 1, as an example, say that a vocalist 100 had trouble during a particular performance, because of a scratchy throat, hitting certain notes in the phrase: "It's all the gears, only the clutch will grind." Knowing this, the playback engineer decides to use a portion of a prerecorded vocal backing track 102 to help the vocalist 100 through that particular phrase. In this scenario, the vocal performance 101 has different timing and different emphasis on some of the words than the prerecorded vocal backing track 102. The timing differences may cause a potentially visible lip-sync discrepancy at position F 103, position G 104, and position H 105. Even if the timing discrepancies were not visible, expressiveness would be lost. This is because the playback engineer chose to use the prerecorded vocal backing track 102 in order to mask the vocalist potentially singing off key. The articulation of the words from the vocal performance 101, "It's," at position 106, "only," at position 107, and "will" at position 108, would be lost.

Figure 2:
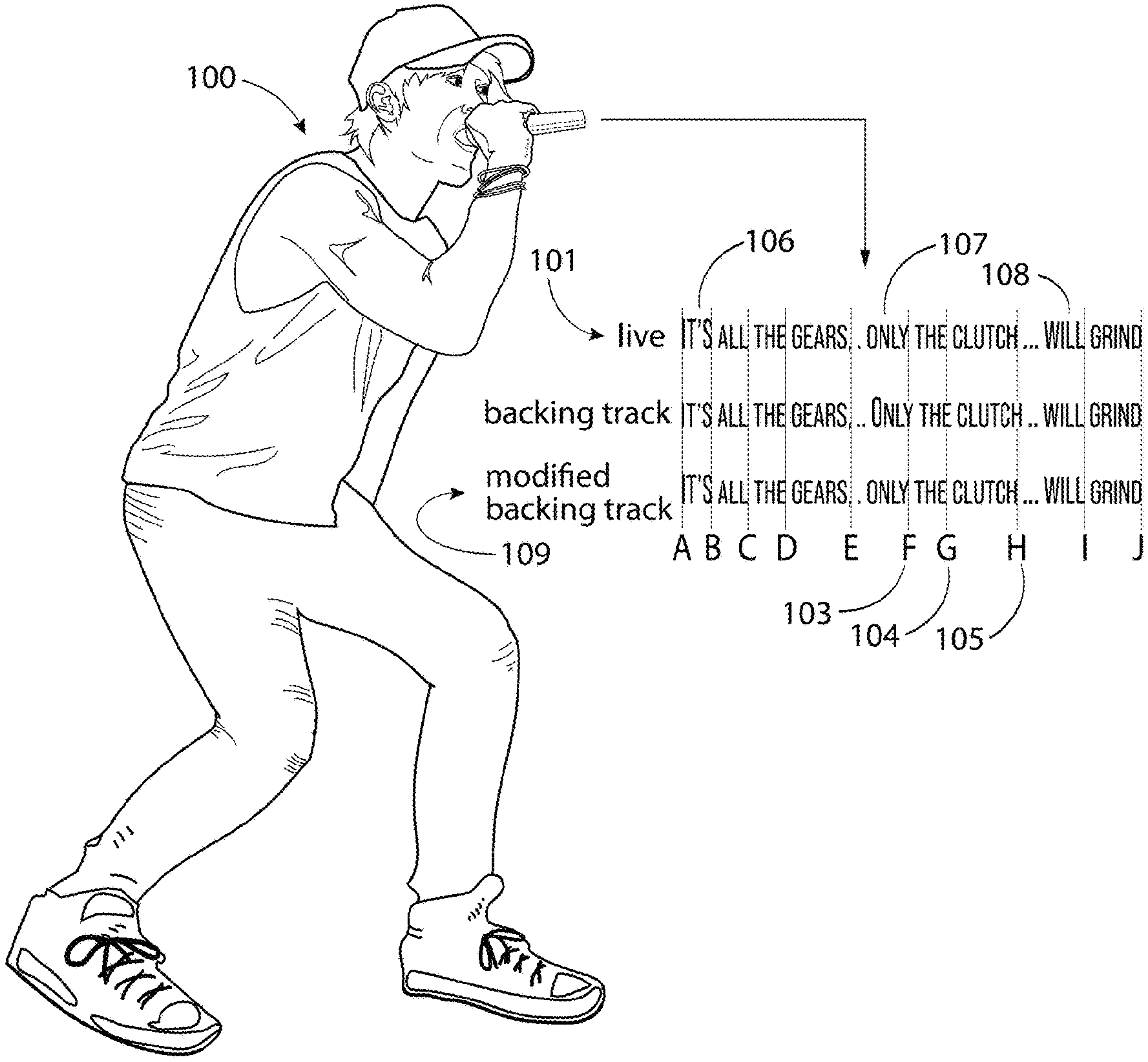
FIG. 2 illustrates, the vocalist singing lyrics where the prerecorded vocal backing track is modified in realtime in response to the vocalist's live vocal performance.

The Inventor developed devices, systems, and methods for overcoming these potential drawbacks while still retaining the advantages of using a prerecorded vocal backing track 102. The Inventor's system and device uses a vocal performance 101 to manipulate the timing and prosody of the prerecorded vocal backing track 102. FIG. 2 shows the same hypothetical scenario as FIG. 1, but this time with the addition of a modified backing track 109 processed by the Inventor's system or device. The modified backing track 109 retains the pitch of the prerecorded vocal backing track 102 while retaining the expressiveness of the vocalist's performance. The modified backing track 109 now matches the timing at position F 103, position G 104, and position H 105 of the vocal performance 101. The modified backing track 109 also matches the emphasis of the vocal performance 101 at position 106, position 107, and position 108. In this scenario, the audience hears the vocalist 100 singing in key, thanks to the modified backing track 109 being time-synchronized to the vocal performance 101 with nuances and timing of his live performance.

General Principles and Examples

The Inventor's systems, devices, and methods, overcome the timing issues discussed above, by dynamically controlling the timing of a prerecorded vocal backing track, using vocal elements, such as phonemes, vector embeddings, or vocal audio spectra, extracted from a vocal stream, the vocal stream being a digitized version of the vocal performance. The device and system may optionally dynamically control one or more prosody parameters within the prerecorded vocal backing track. Dynamically controlling the timing of the prerecorded backing track may be accomplished in realtime or offline (i.e., not in realtime), depending on the application. For example, during a live vocal performance, extracting vocal elements and dynamically synchronizing the timing of the prerecorded vocal backing track to the timing of the extracted vocal elements, and outputting a resulting dynamically controlled prerecorded vocal backing track, would likely take place in realtime to assure realism. Synchronizing the prerecorded vocal backing track to a non-live music performance, such as a music video, prerecorded television production, or motion picture can take place offline.

Figure 3:
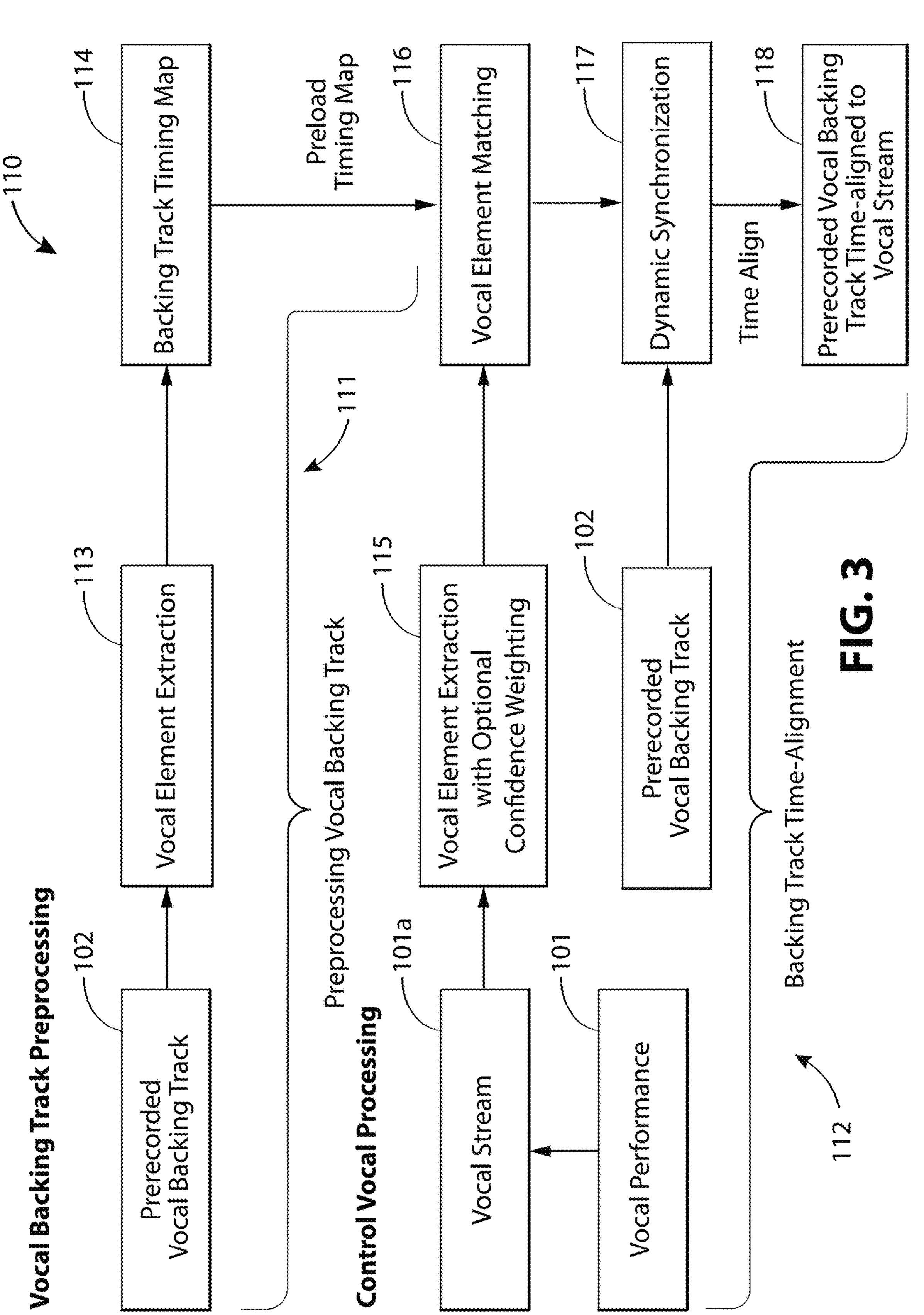
FIG. 3 illustrates a conceptual overview of the preprocessing phase, and backing track alignment phase, of the vocal element extraction and synchronization system.

FIG. 3 illustrates a conceptual overview of a vocal element extraction and synchronization system 110. The process is separated into a preprocessing phase 111 and a backing track alignment phase 112. The preprocessing phase extracts vocal elements, such as phonemes, vector embeddings, feature vectors, or audio spectra, from the prerecorded vocal backing track 102. The system then time stamps the extracted backing track vocal elements, and may store the timestamped vocal elements in a first vocal element timing map. During the backing track alignment phase 112, the backing track timing map 114 acts as a "blueprint" to aid the system to dynamically match vocal elements extracted from the vocal stream 101*a* with corresponding timestamped vocal elements extracted during the preprocessing phase 111. The vocal stream 101*a* digitally representing the vocal performance 101.

One of the challenges faced by the Inventor was how to extract vocal elements, such as phonemes, vector embeddings, and vocal audio spectra. Then match these vocal elements to corresponding backing track vocal elements. And then take the matched vocal elements and adjust the timing in the vocal backing track in realtime so that any processing delays are not perceptible. The threshold of perception for processing delay is typically about 30 milliseconds or less, with less delay being better. For the purpose of this disclosure we will refer to a delay of approximately 30 milliseconds or less as "realtime." The Inventor discovered that the he could reduce processing delays by preprocessing the prerecorded vocal backing track 102 as described above, offline, before a live vocal performance. Preprocessing the prerecorded vocal backing track 102 has several advantages. First, the prerecorded vocal backing track 102 can be processed more accurately then would be possible during the live vocal performance because there is not a realtime processing constraint. Second, the additional overhead of identifying and timestamping vocal elements in the prerecorded vocal backing track 102 in realtime during the live vocal performance is eliminated. This allows the live performance algorithm to focus on identifying the vocal elements in the live vocal performance and matching these to timestamped vocal elements preidentified within the prerecorded vocal backing track. For applications that do not require realtime processing, extracting, and timestamping the backing track vocal elements ahead of time may reduce hardware, processor, and software overhead.

During the preprocessing phase 111, the prerecorded vocal backing track 102 may be analyzed by vocal element extraction 113. Vocal element extraction 113 identifies and extracts individual vocal elements and creates corresponding time stamps for each vocal element. The timestamped vocal elements may be stored in a backing track timing map 114. How the time stamp is characterized, depends on the type of vocal element, for example, phonemes, vector embeddings, or vocal audio spectra.

Before the vocal performance 101, the backing track timing map 114, and the prerecorded vocal backing track 102, are preloaded into the device that performs the vocal element extraction from the vocal performance 101, and time-alignment of the prerecorded vocal backing track 102 to the vocal performance 101. During the backing track alignment phase 112, vocal element extraction 115 identifies and extracts vocal elements from the vocal stream 101*a*. A second vocal element timing map may optionally be created from the vocal elements extracted from the vocal stream 101*a*. Vocal element matching 116 compares the vocal elements extracted from vocal stream 101*a* with the backing track timing map 114 created during the preprocessing phase 111. Vocal element matching 116 may use predictive algorithms to match vocal elements extracted from the live vocal performance to the timestamped vocal elements within backing track timing map 114. Based on the time prediction from vocal element matching 116, dynamic synchronization 117 may dynamically time-stretch or compress the prerecorded vocal backing track 102 to match the timing of the vocal performance 101. This results in a dynamically controlled prerecorded vocal backing track 118 is time-synchronized to the vocal performance 101. This process of identifying the vocal elements from the vocal stream 101*a*, matching the vocal elements to the timestamped vocal elements within the backing track timing map 114, adjusting the timing of the prerecorded vocal backing track 102, and outputting a resulting dynamically controlled prerecorded vocal backing track may optionally occur in realtime. However, depending on the application, it may also be accomplished offline.

In the examples throughout this disclosure, the vocal stream resulting from the analog-to-digital conversion process may be represented by a pulse-code-modulation (PCM) stream. PCM has the advantage of being widely supported by both hardware and software routines. Alternatively, the vocal stream may be represented in other audio formats. For example, it may be represented as a neural audio codec pipeline in neural audio-codec latent feature space.

Examples of neural audio codec include, but are not limited to, SoundStream by Alphabet, Inc. or Encodec by Meta Platforms Inc. Vocal elements extraction may be performed directly in the neural audio codec's latent feature space rather than decoding back to PCM. This reduces bandwidth and latency while preserving alignment accuracy.

FIGS. 4, 5, and 6 illustrate non-limiting examples of timing maps that may be produced from backing track vocal elements or vocal stream vocal elements. A person having ordinary skill in the art, once viewing FIGS. 4, 5, and 6, and reading the accompanying description, will readily recognize other ways to create timing maps or files that include equivalent information. FIG. 4 illustrates an example of a backing track timing map 124, which stores the start position 124*a*, the stop position 124*b*, of each of the phonemes 124*c*. In this example, the sung phrase "it's a beautiful day" is stored as phonemes 124*c*, each with a start position 124*a* and a stop position 124*b*. FIG. 5, for example, shows a backing track timing map 134, with a vector embeddings with three hundred dimensions (i.e., three hundred values) taken every ten milliseconds. For each timestamped vector embeddings 134*a* is a time 134*b*. For illustrative purposes, the numerical value of each dimension within the vector embeddings is represented by the letter "n" with a corresponding subscript. Note that three hundred dimensions is just an example, a vector embeddings timing map may be any number of dimensions that represents the vector embeddings. Note that timestamped latent vectors may be processed using the neural audio codec latent feature space rather than PCM space. In that case, time stamped latent feature vectors may be obtained directly from a neural audio codec such as SoundStream or Encodec. Each latent frame, typically 20 ms, may be stored with its corresponding time index to form a codec-based timing map.

FIG. 6, shows an example of the backing track timing map 144, with vocal audio spectra taken every ten milliseconds. For each timestamped vocal audio spectra 144*a* is a time 144*b*, representing the time which the vocal audio spectra was taken. Ten milliseconds is an example of how often the spectra is taken and should have sufficient granularity to capture the nuance in the vocal performance. Other vocal audio spectra capture rates that sufficiently capture the nuance of the vocal performance, for the reader's given application, can be used.

Figure 7:
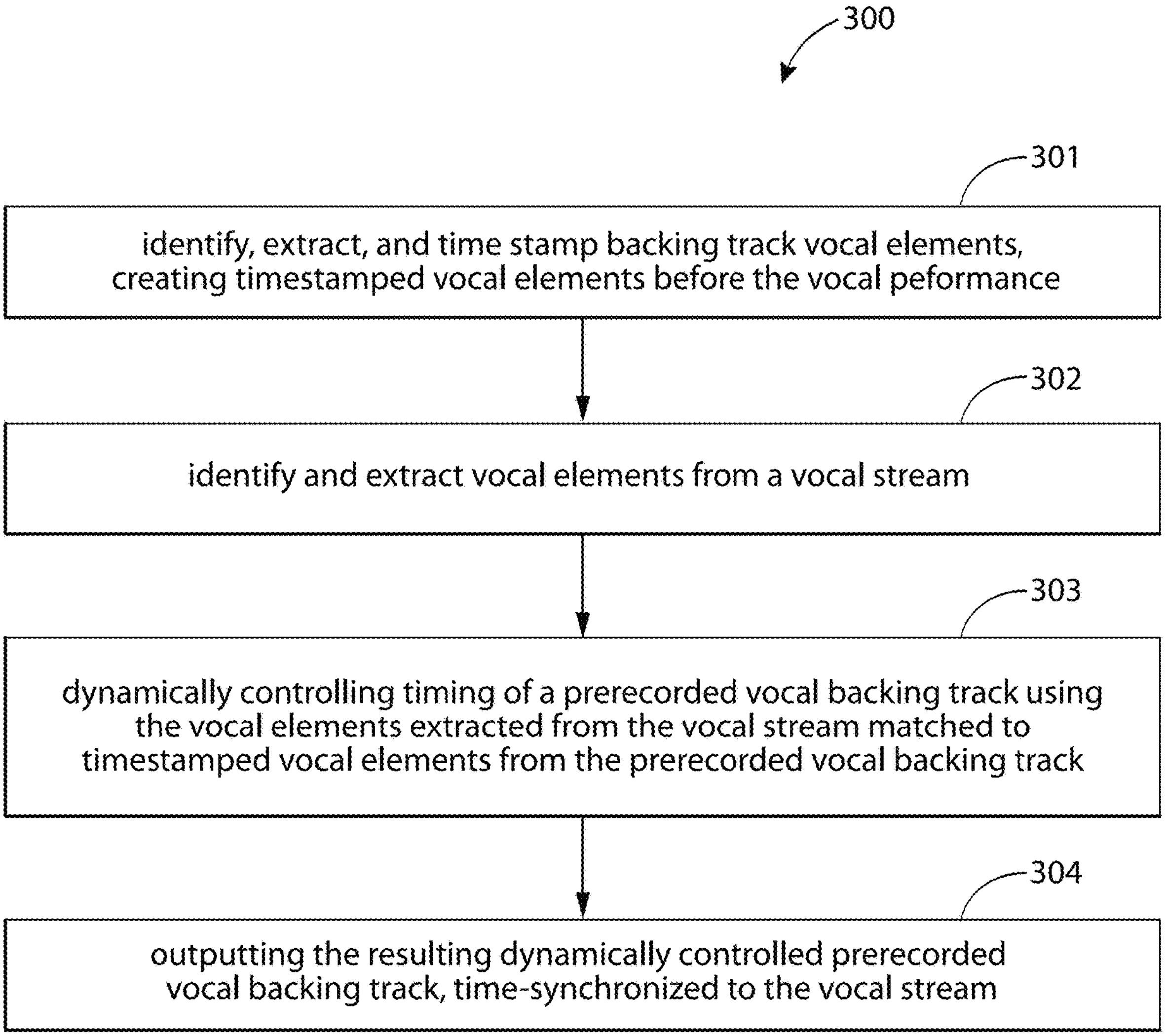
FIG. 7 illustrates a flow chart outlining a process associated with the conceptual overview of FIG. 3.

An example of the general process 300 is illustrated in FIG. 7. In step 301, vocal elements are identified, extracted, and time stamped from the prerecorded vocal backing track, to create corresponding timestamped vocal elements. This typically occurs before the vocal performance. The process of identifying, extracting, and timestamping backing track vocal elements from the prerecorded vocal backing track may be an offline process and does not need to be done in realtime.

In step 302, vocal elements are identified and extracted in realtime from the vocal stream, the vocal stream digitally representing the vocal performance. In step 303, the timing of the prerecorded vocal backing track is dynamically controlled (for example, dynamically time compressed or time stretched). This may be accomplished by matching vocal elements extracted from the vocal stream to the timestamped vocal elements extracted from the prerecorded vocal backing track. The time compression and expansion of the prerecorded vocal backing track may be based on timing differences between the vocal elements extracted from the vocal performance, and corresponding timestamped vocal elements extracted from the prerecorded vocal backing track. The result is a dynamically controlled prerecorded vocal backing track that is time-synchronized to the vocal stream, and therefore, the vocal performance. In step 304, the resulting dynamically controlled prerecorded vocal backing track is outputted in synch with the vocal stream, and therefore, the vocalist's singing. The resulting dynamically controlled prerecorded vocal backing track captures the vocalist's unique timing of the vocal performance. The vocalist sings to the prerecorded vocal backing track, naturally and spontaneously without needing to precisely mime or precisely mimic the prerecorded vocal backing track.

Figure 8:
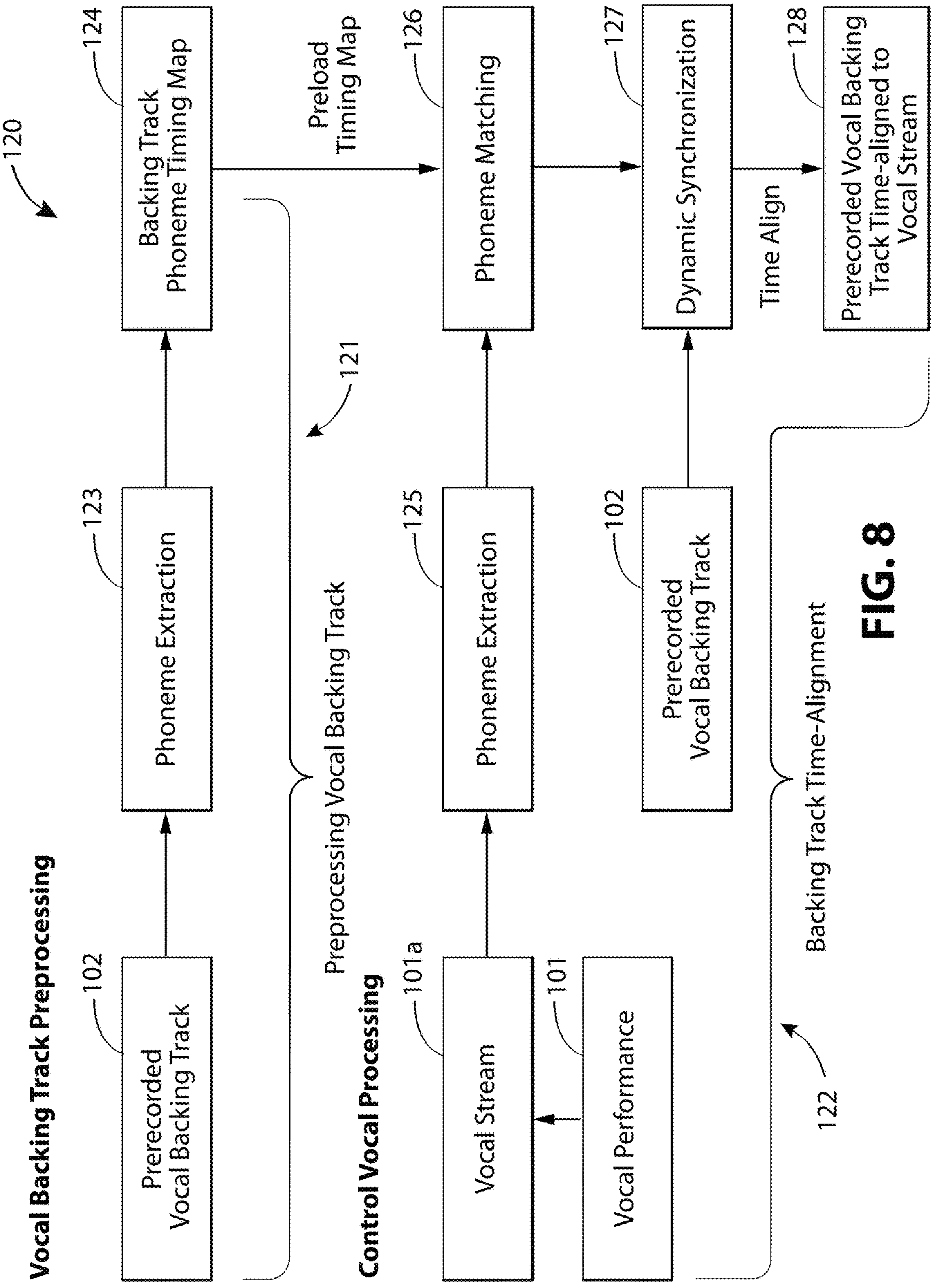
FIG. 8 illustrates a conceptual overview of the system of FIG. 3 using phoneme extraction and synchronization.
Figure 9:
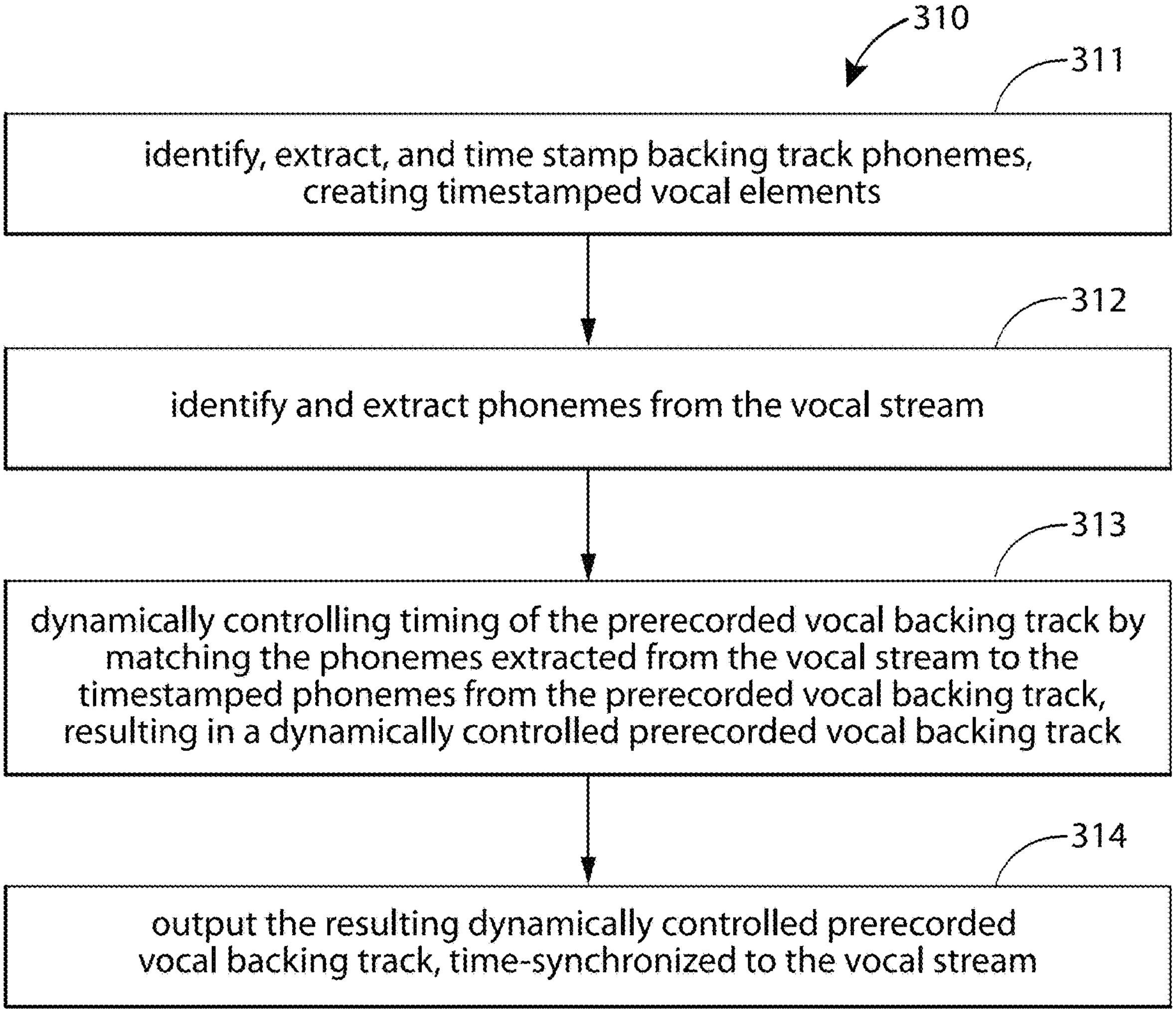
FIG. 9 illustrates a flow chart outlining a process associated with the conceptual overview of FIG. 8 which uses phoneme extraction and synchronization.

FIG. 8, shows a vocal element extraction and synchronization system 120 where the vocal elements include phonemes. FIG. 9 illustrates an example of a process 310 using phonemes for preprocessing the prerecorded vocal backing track and for the backing track alignment phase. In FIGS. 8 and 9, steps refer to FIG. 9, and called out elements refer to FIG. 8. In step 311, phonemes are identified, extracted, and time stamped from the prerecorded vocal backing track, before the vocal performance, to create timestamped phonemes. During the preprocessing phase 121, phoneme extraction 123, identifies and extracts phonemes from the prerecorded vocal backing track 102. The extracted phonemes may be stored with their corresponding start and finish positions in a backing track timing map 124, as previously described. The backing track timing map 124 may be stored in a data interchange format that uses human-readable text, such as Java script object notation (JSON) or comma separated value (CSV). In step 312, phonemes are identified and extracted from the vocal stream 101*a*. The vocal stream digitally representing the vocal performance 101. During the Backing track alignment phase 122, phoneme extraction 125 identifies and extracts phonemes from the vocal stream 101*a*. In step 313, the timing of the prerecorded vocal backing track is dynamically controlled (for example, using time compression or expansion). It does so by matching phonemes identified and extracted from the vocal stream 101*a* to corresponding timestamped phonemes from the prerecorded vocal backing track 102. Phoneme matching 126 compares the phonemes extracted from the vocal stream 101*a*, with the timestamped phonemes within the backing track timing map 124, created during the preprocessing phase 121. The timestamped phonemes may be referenced from the backing track timing map 124. Similarly, a second timing map may be referenced. The second timing map includes phonemes extracted from the vocal stream 101*a* and their corresponding time positions. Phoneme matching 126 may use predictive algorithms to match phonemes extracted from the vocal stream, to the timestamped phonemes within the backing track timing map 124. Examples of machine-learning models that may be suitable to identify, extract, and match phonemes include ContentVec, Wave2Vec 2.0, Whisper, Riva, or HuBERT. Dynamic synchronization 127 may dynamically time-stretch or compress the prerecorded vocal backing track 102 to match the timing of the vocal stream 101*a*, and hence, the vocal performance 101. The time compression and expansion of the prerecorded vocal backing track may be based on timing differences between the phonemes extracted from the vocal stream 101*a* and corresponding matched timestamped phonemes from the prerecorded vocal backing track 102. In step 314, this results in a dynamically controlled prerecorded vocal backing track 128 that is time-synchronized to the vocal stream 101*a*, and hence, the vocal performance 101. This process of identifying phonemes from the vocal stream 101*a*, matching the phonemes to the timestamped phonemes, adjusting the timing of the prerecorded vocal backing track 102, and outputting a resulting dynamically controlled prerecorded vocal backing track, may optionally occur in realtime, if required. For example, if the vocal performance 101 is a live vocal performance, this process can occur as the vocalist performs, and the audience hears, the prerecorded backing track in synch with the vocalist's performance.

Figure 10:
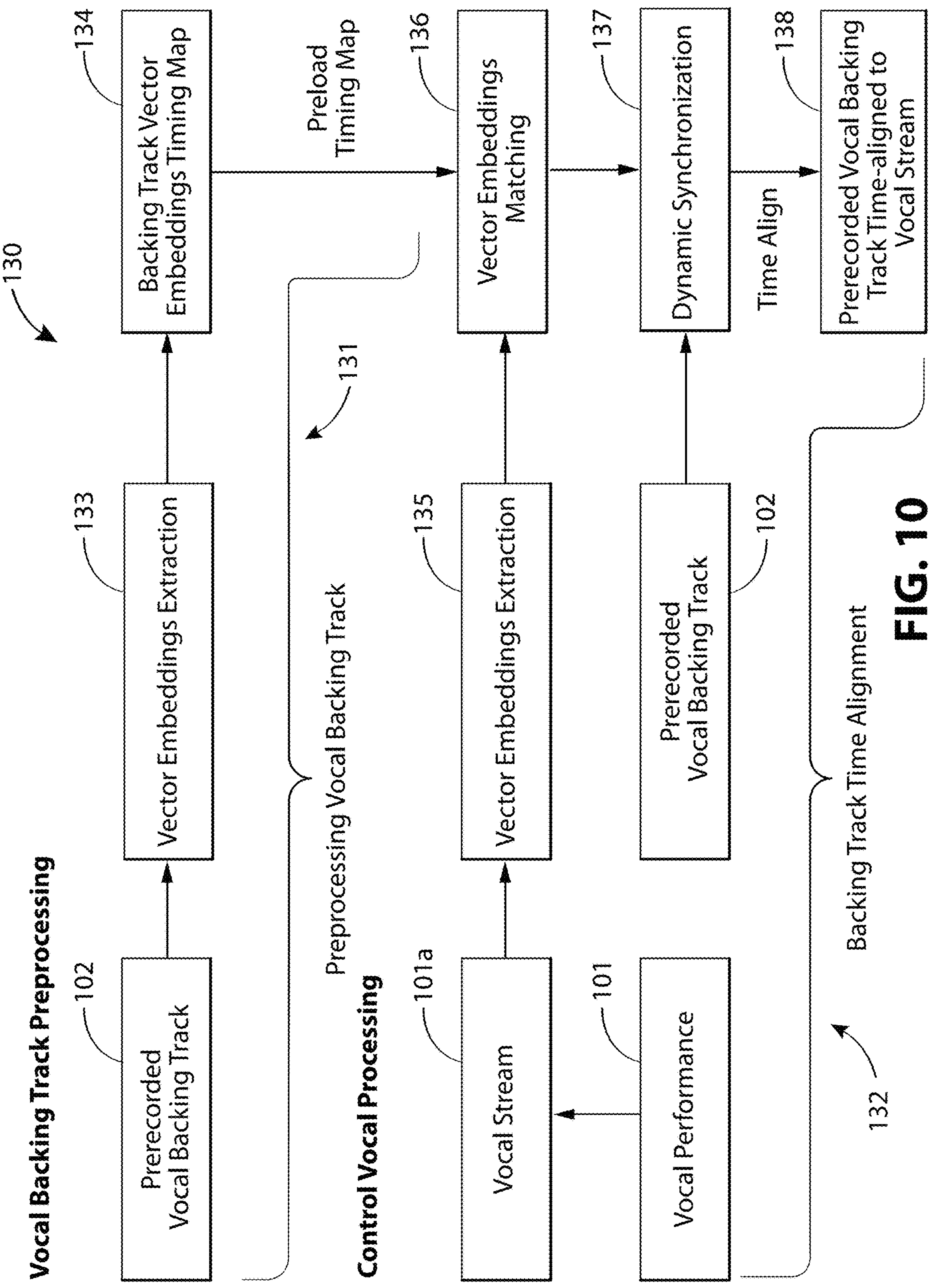
FIG. 10 illustrates a conceptual overview of the system of FIG. 3 using vector embeddings extraction and synchronization.
Figure 11:
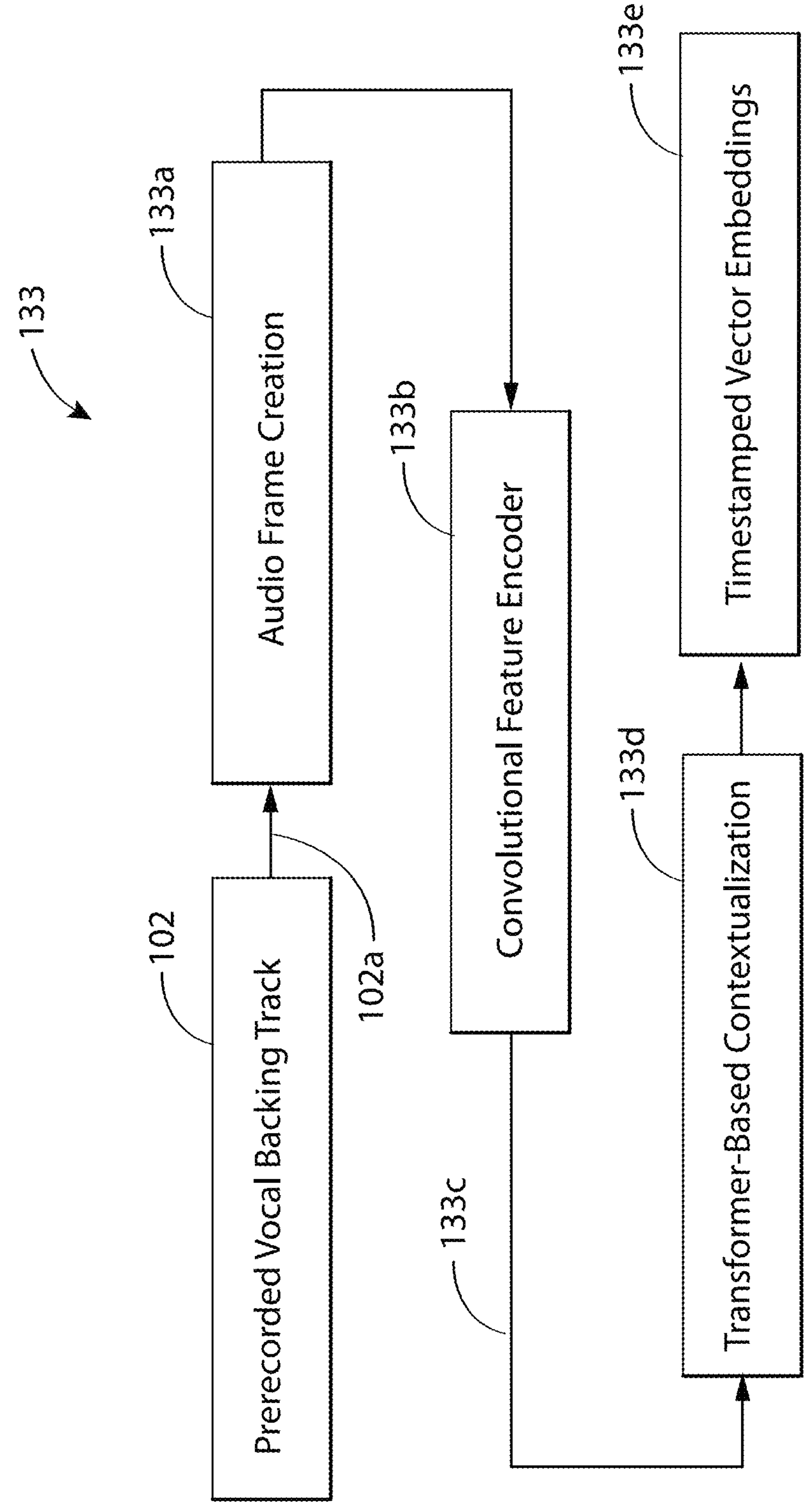
FIG. 11 illustrates internal preprocessing steps to generate timestamped vector embeddings from the prerecorded vocal backing track where: raw audio is segmented into overlapping frames, processed by a convolutional encoder to extract acoustic features, and then contextualized by a transformer neural network, resulting in precise, timestamped multi-dimensional vector embeddings.
Figure 13:
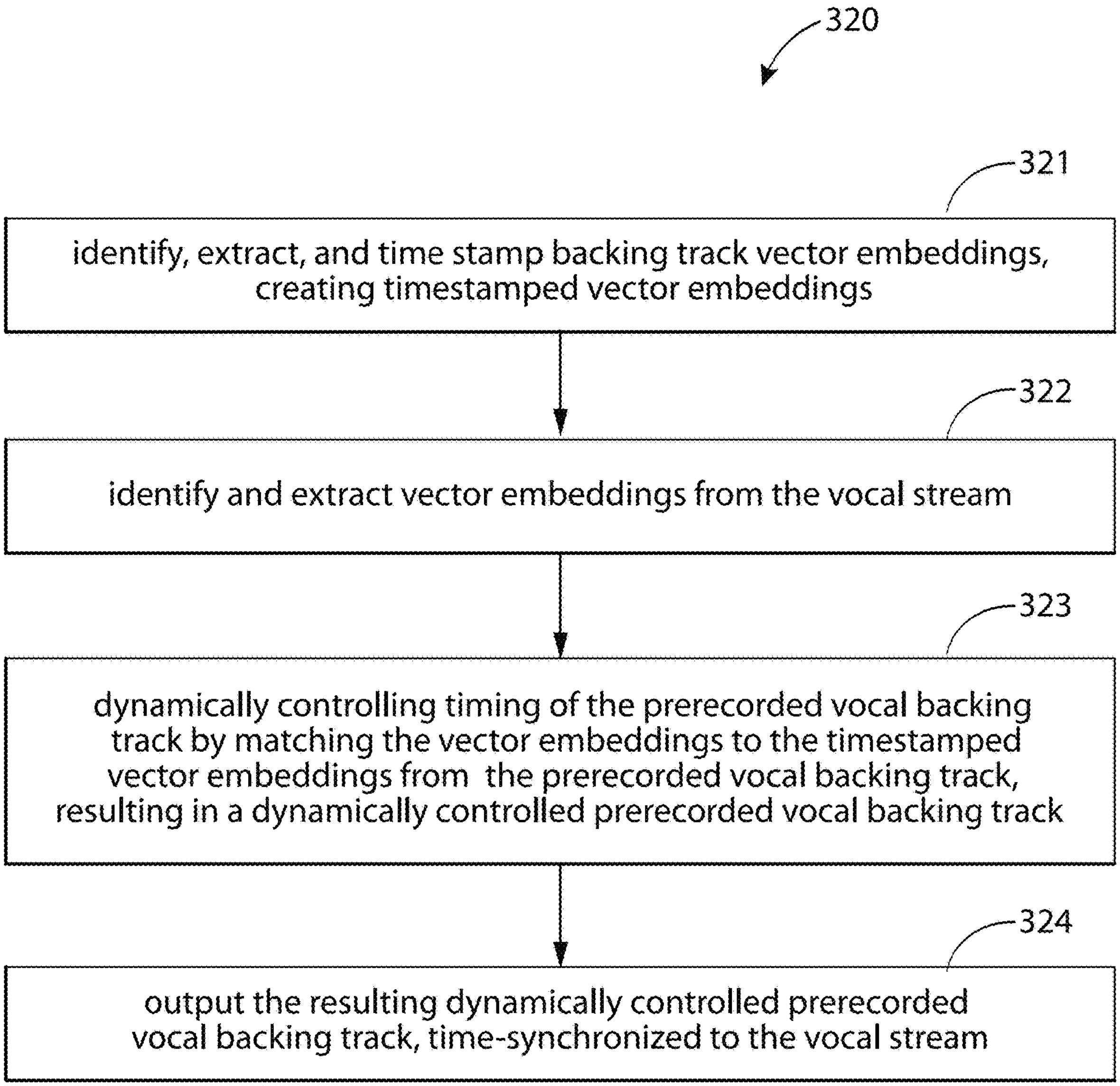
FIG. 13 illustrates a flow chart outlining a process associated with the conceptual overview of FIG. 10 which uses vector embeddings extraction and synchronization.

FIG. 10, shows a vocal element extraction and synchronization system 130, where the vocal elements are vector embeddings. FIG. 13 illustrates an example of a process 320 using vector embeddings for preprocessing the prerecorded vocal backing track, and for the backing track alignment phase. In FIGS. 10 and 13, steps refer to FIG. 13, and called out elements refer to FIG. 10. In step 321, vector embeddings are identified, extracted, and time stamped from the prerecorded vocal backing track, before the vocal performance to create timestamped vector embeddings. During the preprocessing phase 131, vector embeddings extraction 133, identifies and extracts vector embeddings from the prerecorded vocal backing track 102. FIG. 11 shows an example of how this process within vector embeddings extraction 133 might work.

Referring to FIG. 11, the raw audio waveforms of the prerecorded vocal backing track output signal 102*a* is divided into overlapping frames by audio frame creation module 133*a*, as a non-limiting example the raw audio waveform may be divided into 25 millisecond frames, with 20 millisecond strides. The resulting output is processed by a convolutional feature encoder 133*b*. The convolutional feature encoder extracts low-level vocal features such as pitch, timbre, and harmonic structures. It also learns phoneme-specific patterns such as formants and articulation, to differentiate between similar sounds. The extracted low-level features 133*c* are passed through a transformer model 133*d*, which models long-term dependences in singing patterns and learns contextual phoneme transitions. This results in better temporal resolution. Each frame from the transformer model 133*d* is converted into a timestamped multi-dimensional vector embeddings 133*e*. In this non-limiting example, each time stamp is 20 milliseconds apart because the 25 millisecond frames start every 20 milliseconds. The resulting timestamped vector embeddings may be stored in a timing map, such as the backing track timing map 134 of FIGS. 5 and 10. Referring to FIG. 5, the vector embeddings are 20 ms apart.

Referring to FIGS. 10 and 13, during the backing track alignment phase 132, in step 322, vector embeddings are identified and extracted in realtime from the vocal stream 101*a*, the vocal stream digitally representing the vocal performance 101. Vector embeddings extraction 135 identifies and extracts vector embeddings from the vocal stream 101*a*. In step 323, the timing of the prerecorded vocal backing track is dynamically controlled (for example, dynamically time compressed or stretched). It may accomplish this by matching vector embeddings identified and extracted from the vocal stream 101*a* to the timestamped vector embeddings from the prerecorded vocal backing track 102. Vector embeddings matching 136 compares the vector embeddings extracted from the vocal stream 101*a* with the timestamped vector embeddings within the backing track timing map 134 created during the preprocessing phase 131. A second vector embeddings timing map may be created that represents the vector embeddings extracted from the vocal stream 101*a*. In this case, vector embeddings matching 136 may compare the vector embeddings in the second timing map to the vector embeddings in the backing track timing map 134. Vector embeddings matching 136 may use predictive algorithms to match vector embeddings extracted from the vocal stream, to the timestamped vector embeddings within the backing track timing map 134. Dynamic synchronization 137 may dynamically time-stretch or compress the prerecorded vocal backing track 102 to match the timing of the vocal stream 101*a*. Time compression and expansion of the prerecorded vocal backing track 102 may be based on timing differences between the vector embeddings extracted from the vocal stream 101*a* and corresponding timestamped vector embeddings from the prerecorded vocal backing track 102. In step 324, this results in a dynamically-aligned prerecorded vocal backing track 138 that is time-synchronized to the vocal stream, and therefore, the vocal performance 101. This process of identifying the vector embeddings from the vocal performance 101, matching the vector embeddings to the timestamped vector embeddings, adjusting the timing of the prerecorded vocal backing track 102, and outputting a resulting dynamically controlled prerecorded vocal backing track, may optionally occur in realtime.

Figure 12:
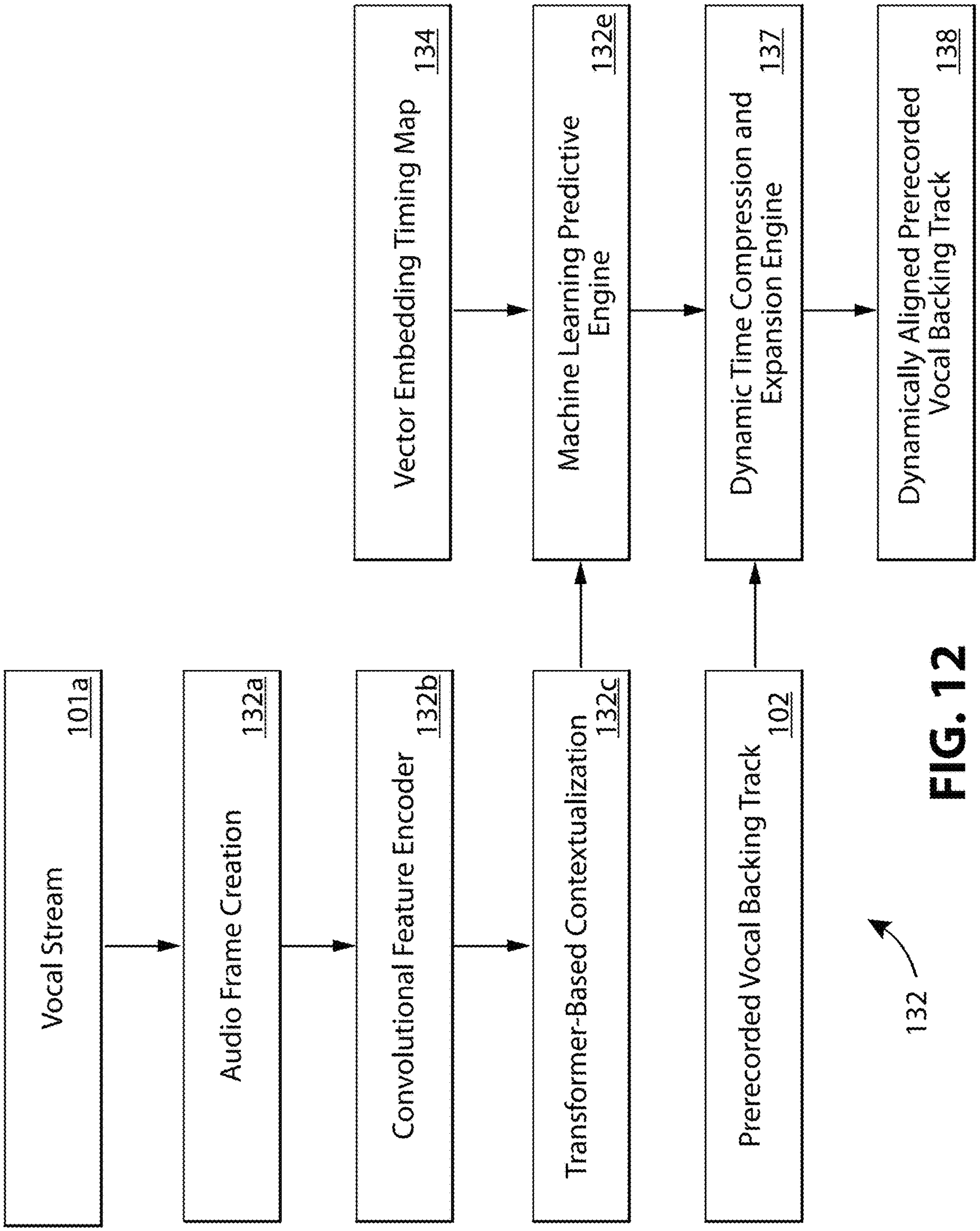
FIG. 12 illustrates the performance phase, detailing how vocal audio is segmented into overlapping frames, processed via convolutional feature extraction, contextualized using a transformer neural network, and matched in real-time to prerecorded vector embeddings, resulting in the predictive engine dynamically aligns the prerecorded backing track to the performance.

FIG. 12 illustrates an example of the backing track alignment phase 132 in more detail. The signal from the vocal stream 101*a* is divided into overlapping frames by an audio frame creation module 132*a*. The resulting output is processed by a convolutional feature encoder 132*b*. The output of the convolutional feature encoder 132*b* is processed by a transformer model 132*c*. The audio frame creation module 132*a*, the convolutional feature encoder 132*b*, and the transformer model 132*c*, are as described for audio frame creation module 133*a*, convolutional feature encoder 133*b*, and transformer model 133*d* of FIG. 11, respectively.

Referring to FIG. 12, the machine-learning predictor 132*e* compares and matches the timestamped vector embeddings from the backing track timing map 134 to the vector embeddings from the vocal performance. The machine-learning predictor 132*e* instructs dynamic synchronization 137 to time compress or expand the prerecorded vocal backing track 102, producing a dynamically-aligned prerecorded vocal backing track 138.

Figure 14:
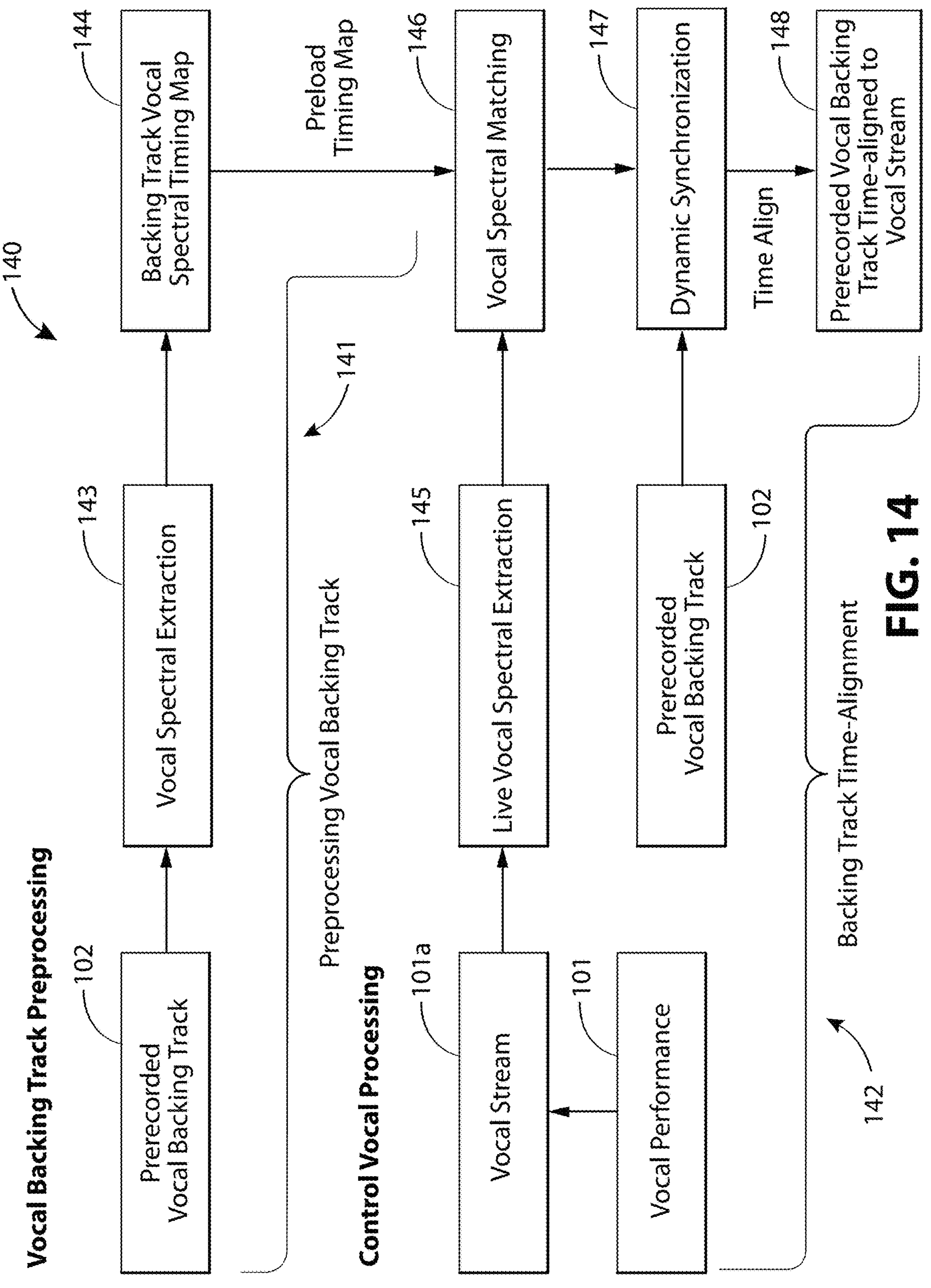
FIG. 14 illustrates a conceptual overview of the system of FIG. 3 using vocal audio spectral extraction and synchronization.
Figure 15:
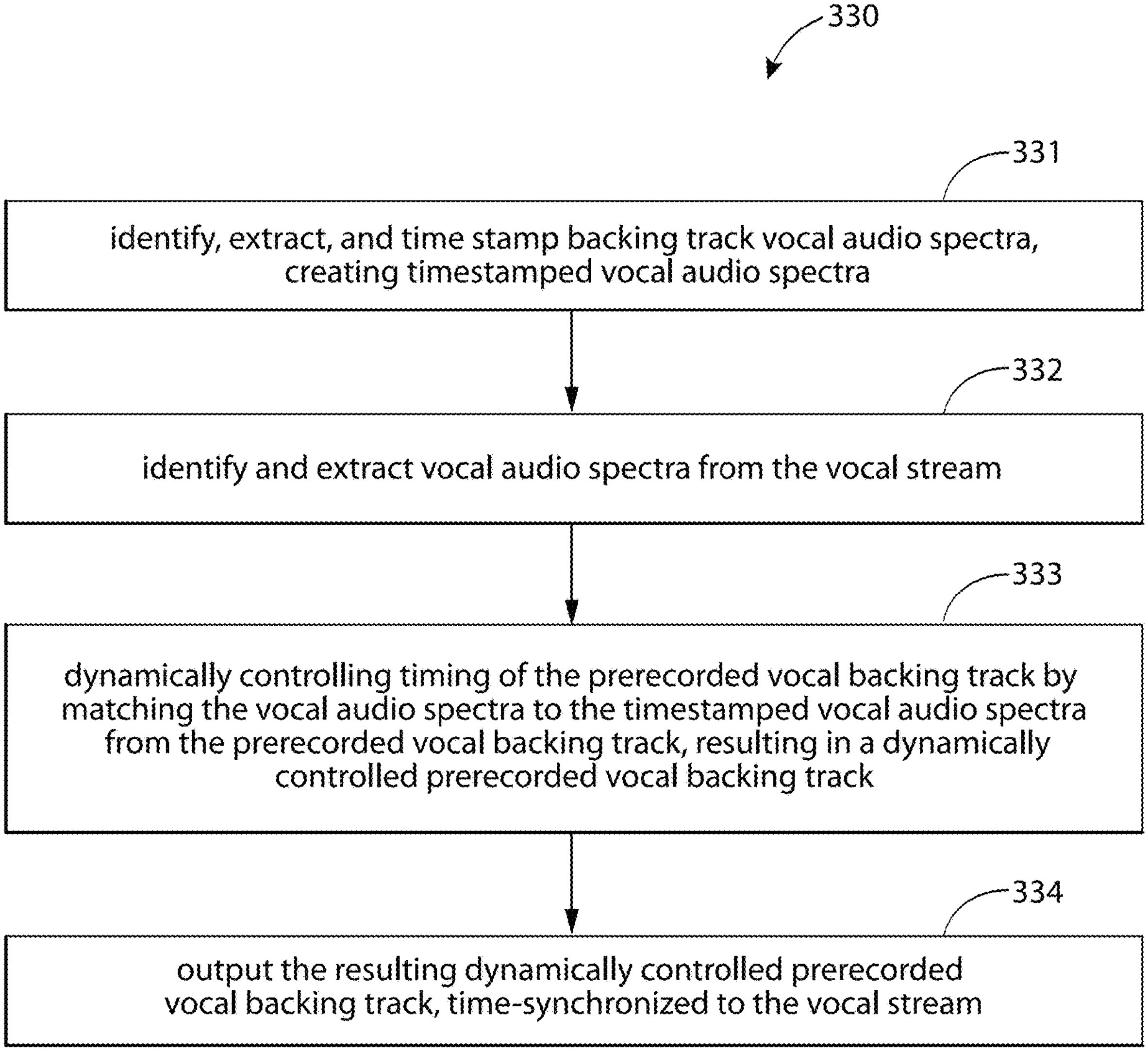
FIG. 15 illustrates a flow chart outlining a process associated with the conceptual overview of FIG. 14, which uses vocal audio spectral matching and synchronization.

FIG. 14 shows a vocal element extraction and synchronization system 140 where the vocal elements are audio spectra. FIG. 15 illustrates an example of a process 330 using vocal audio spectra for preprocessing the prerecorded vocal backing track and for the backing track alignment phase. In FIGS. 14 and 15, steps refer to FIG. 15, and called out elements refer to FIG. 14. In step 331, vocal audio spectra are identified, extracted, and time stamped from the prerecorded vocal backing track 102, before the vocal performance 101, to create corresponding timestamped vocal audio spectra. The process of identifying, extracting, and timestamping vocal audio spectra from the prerecorded vocal backing track 102 can take place offline, before the vocal performance, whether or not the backing track alignment phase 142 occurs in realtime. During the preprocessing phase 141, vocal audio spectra extraction 143, takes vocal audio spectra, from the prerecorded vocal backing track 102. The vocal audio spectra may be taken periodically, for example, by using FFT. A non-exhaustive list of other algorithms that may be suitable for extracting vocal audio spectra periodically include discrete wavelet transformation, discrete Hilbert transformation, or the Goertzel algorithm. The periodically sampled vocal audio spectra are stored with their corresponding timing in a backing track timing map 144. An example of such a timing map is shown in FIG. 6.

Referring again to FIGS. 14 and 15, in step 332, vocal audio spectra are identified and extracted in realtime from the vocal stream 101*a*. The vocal stream 101*a*, digitally represents the vocal performance 101. During the backing track alignment phase 142, vocal audio spectra extraction 145 identifies and extracts audio spectra from the vocal stream 101*a*. Vocal audio spectral matching 146 compares the vocal audio spectra extracted from the vocal stream 101*a*, with the timestamped vocal audio spectra within the backing track timing map 144. The vocal audio spectral matching 146, may use predictive algorithms to match vocal audio spectra extracted from the vocal performance 101, to the timestamped vocal audio spectra within the backing track timing map 144. The vocal audio spectra extracted from the vocal stream 101*a* can be stored, with their corresponding time positions in a second vocal audio spectra timing map. In that case, vocal audio spectral matching 146 may compare the values and time positions of the second vocal audio spectra timing map, with the timestamped vocal audio spectra within the backing track timing map 144.

In step 333, the timing of the prerecorded vocal backing track 102 is dynamically controlled (for example, dynamically time compressed or stretched) during the vocal performance 101. Dynamic synchronization 147 may dynamically time-stretch or compress the prerecorded vocal backing track 102. In step 334, this resulting in dynamically controlled prerecorded vocal backing track 148 that is outputted and is time-synchronized to the vocal stream 101*a*. Time compression and expansion of the prerecorded vocal backing track 102 may be based on timing differences between the vocal audio spectra extracted from the vocal performance 101 and corresponding matched timestamped vocal audio spectra from the prerecorded vocal backing track 102. This process of identifying vocal audio spectra from the vocal stream 101*a*, matching the vocal audio spectra to the timestamped vocal audio spectra, adjusting the timing of the prerecorded vocal backing track 102, and outputting the resulting dynamically controlled prerecorded vocal backing track, may optionally occur in realtime.

The alignment accuracy is based in part by how often a new FFT is performed. The frequency granularity, or bin width, depends on the audio sample rate (e.g., 48 kHz, 96 kHz, or 192 kHz) divided by the sample length of the FFT. For this reason, it may be desirable to have a series of FFTs spaced apart according to alignment accuracy but partially overlapping to allow for better frequency granularity. For example, an FFT may be taken every 10-milliseconds, like FIG. 6, and with a sample length of 100-milliseconds would yield an alignment accuracy of 10-milliseconds with 10 Hz resolution.

Vocal element types such as phonemes, vocal audio spectra, and vector embeddings may be used alone or in combination with one another. For example, phonemes could be used in combination with vocal audio spectra. Vocal audio spectra could be used in combination with vector embeddings. Vector embeddings could be used in combination with phonemes. If the system uses multiple vocal element types at the same time, the system may use a confidence weighting system to predict more accurate alignment. Confidence weighting may typically used in a system that uses a single vocal element type for dynamic synchronization of the prerecorded vocal backing track. The other vocal element types would not be used for dynamic synchronization, but to help enhance the timing accuracy. Alternatively, two or more vocal element types may be used in combination for dynamic synchronization with or without confidence weighting.

Figure 16:
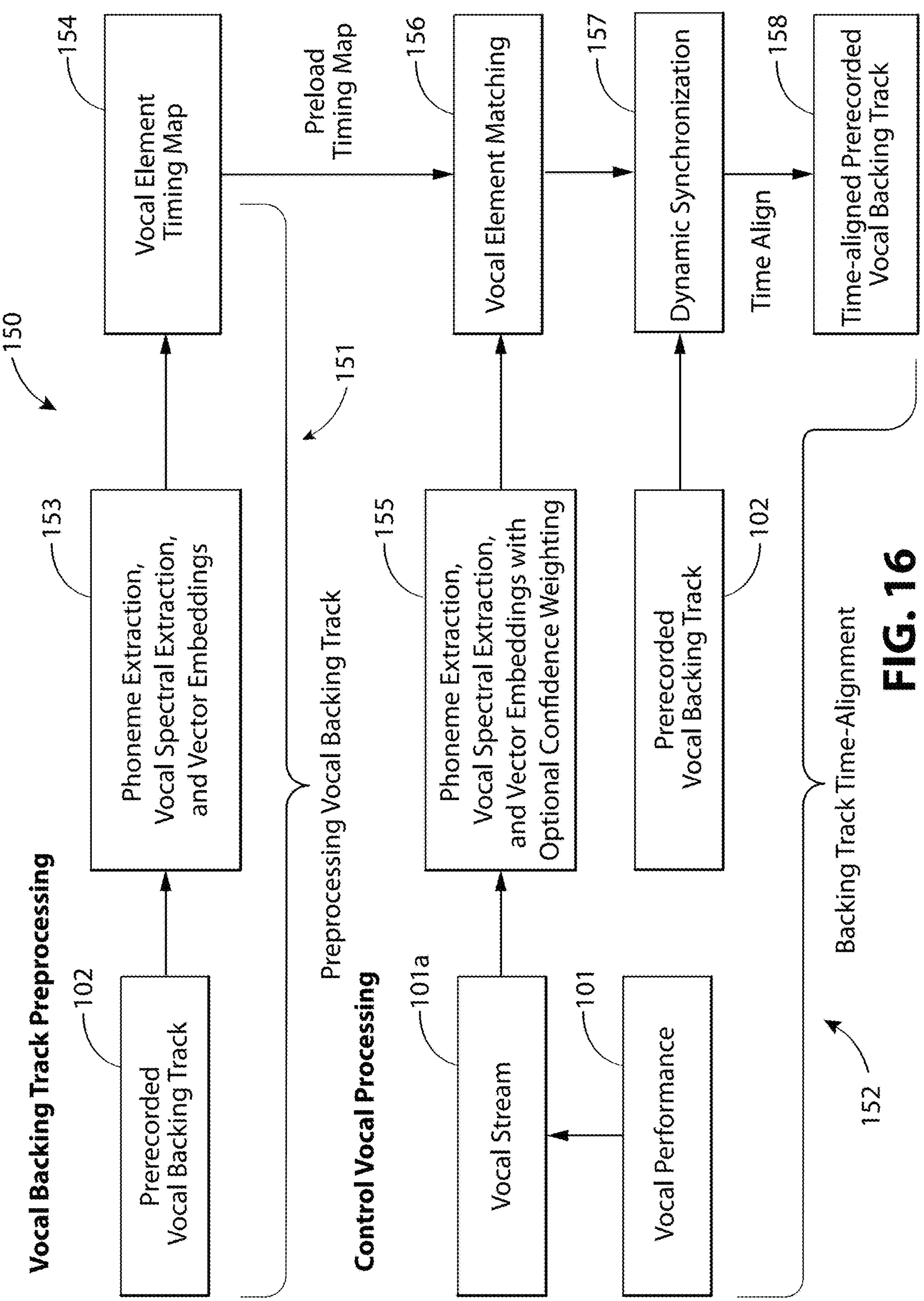
FIG. 16 illustrates a conceptual overview of the system of FIG. 3, which uses a combination of phoneme extraction, vocal audio spectral extraction, and vector embeddings with optional confidence weighting.
Figure 17:
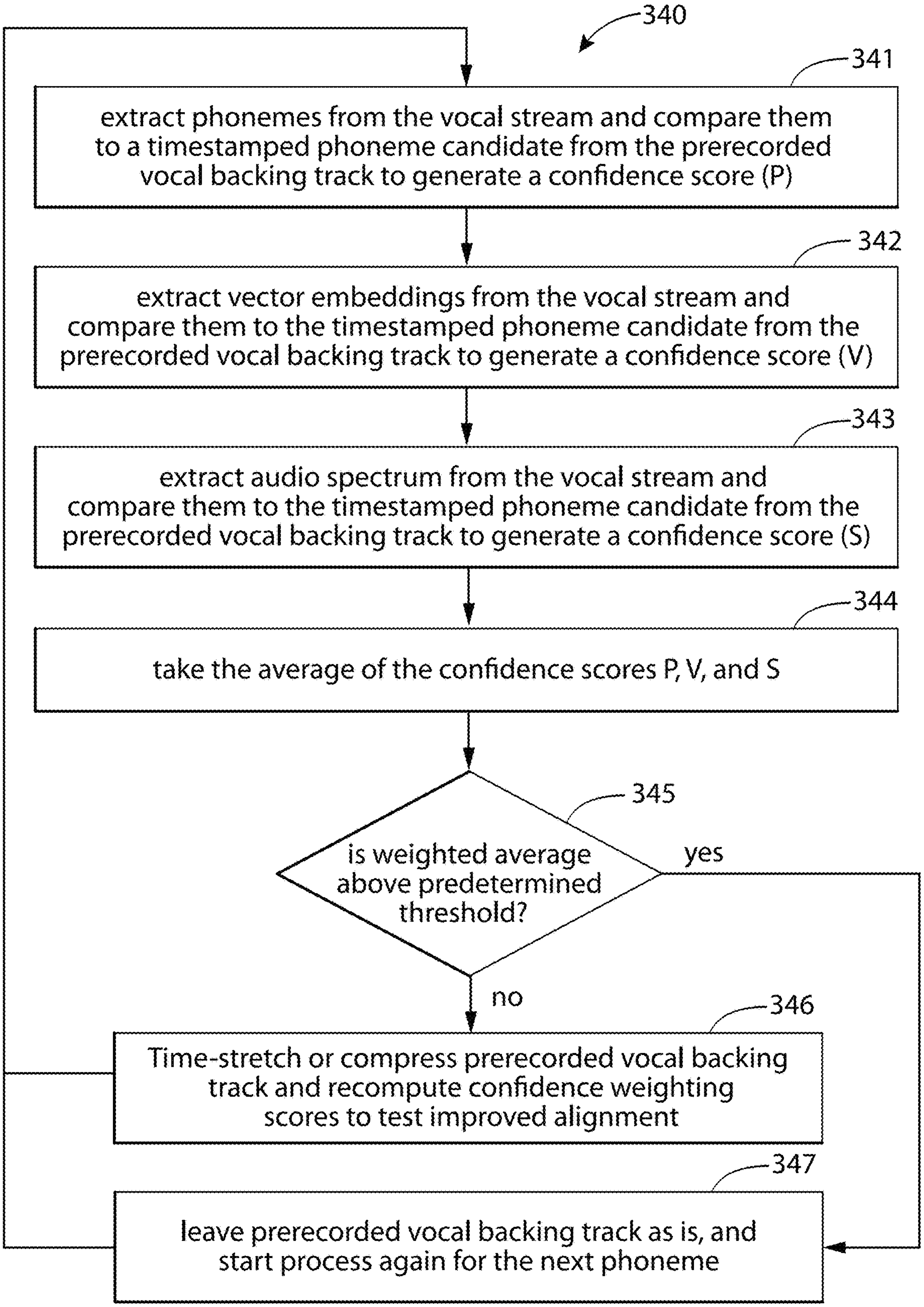
FIG. 17 is a flow chart illustrating the process of confidence weighting using multiple vocal element types: phonemes, vector embeddings, and audio spectra.

FIG. 16 illustrates a vocal element extraction and synchronization system 150 that uses a combination of phoneme extraction, vocal audio spectra extraction, and vector embeddings. It optionally uses confidence weighting. The discussion for FIGS. 16 and 17 gives an example of how to use multiple vocal element types with confidence weighting to enhance the timing accuracy of one vocal element used for dynamic synchronization. In this instance, the vocal element used for dynamic synchronization is phonemes, with vector embeddings and vocal audio spectra used to obtain confidence weighting to enhance the timing accuracy of the phonemes. The same principles described for FIGS. 16 and 17, can be applied to other combinations of vocal element types where one vocal element is used for dynamic synchronization and the other, or others, are used to obtain confidence weighting.

Referring to FIG. 16, during the preprocessing phase 151, vocal element extraction 153 identifies and extracts phonemes, vocal audio spectra, and vector embeddings, as previously described. As previously discussed, the backing track timing map 154 is typically produced before the vocal performance 101. The backing track timing map 154 and the prerecorded vocal backing track 102 may be preloaded into the device that performs the vocal element extraction and time-alignment. During the backing track alignment phase 152, vocal element extraction 155 identifies and extracts phonemes, vector embeddings, and vocal audio spectra from the vocal stream 101*a*. FIG. 17 illustrates an example of a confidence score process 340. When referring to FIGS. 16 and 17 together, steps refer to FIG. 17 and called out elements refer to FIG. 16. Referring to FIGS. 16 and 17, in step 341, an extracted phoneme from the vocal stream 101*a* is compared to a timestamped phoneme from the prerecorded vocal backing track 102 to obtain a confidence score (P). The system may use a connectionist temporal classification to determine the probability that the phoneme positions match. Connectionist temporal classification is a neural network-based sequence alignment method. Confidence scores may be processed in the PCM domain. Confidence scores may also be derived from latent representations of a neural audio codec, by comparing live codec latent vectors against timestamped codec latent vectors from the prerecorded backing track. The resulting codec-derived score may be combined with phoneme, embedding, or spectral scores in the overall weighting.

In step 342, vector embeddings are extracted from the vocal stream 101*a* and compared with the timestamped phoneme candidate from the prerecorded vocal backing track 102 to obtain a confidence score (V). A confidence weight can be assigned to a vector embeddings, for example, based on whether its phoneme embedding to nearby phonemes is consistent. For example, the phoneme with the vector embeddings created from the vocal stream 101*a*, can be compared with the phoneme candidate from the prerecorded vocal backing track 102 using cosine similarity.

In step 343, audio spectra are extracted from the vocal stream 101*a* and compared with the timestamped phoneme candidate from the prerecorded vocal backing track 102 to obtain a confidence score (S). The harmonic structure of vocal stream may be analyzed for stability. If the overtones are consistent over time, the confidence level is higher. As an example, the system analyzes harmonic alignment between the FFT taken from the vocal stream 101*a* and the phoneme candidate from prerecorded vocal backing track 102. In step 344, the system takes the average of the confidence scores P, V, and S.

In step 345, if the average is below the predetermined confidence threshold, then in step 346, the vocal element matching 156 directs dynamic synchronization 157 to time compress or time-stretch the prerecorded vocal backing track 102 for the tested phoneme. The time compression or time stretching is based on timing differences between the vocal elements. The process loops back to step 341 where it may optionally recompute the confidence weight to get a more accurate score before advancing to the next phoneme. In step 345, if the average is above the predetermined confidence threshold, then in step 347, vocal element matching 156 does not direct dynamic synchronization 157 to change the timing of the prerecorded vocal backing track 102 for the tested phoneme. The process advances to the next phoneme and is repeated until the end of the synchronized vocal portion. The result is a dynamically controlled prerecorded vocal backing track 158 that is time-synchronized to the vocal stream 101*a*, and therefore, the vocal performance 101.

Referring to FIG. 16, performing vocal element extraction 155, vocal element matching 156, dynamic synchronization 157, resulting in dynamically controlled prerecorded vocal backing track 158, including optional confidence weighting, can take place in realtime, for example during a live vocal performance. It can also take place offline for applications that do not require realtime processing, such as music videos or motion pictures.

Figure 18:
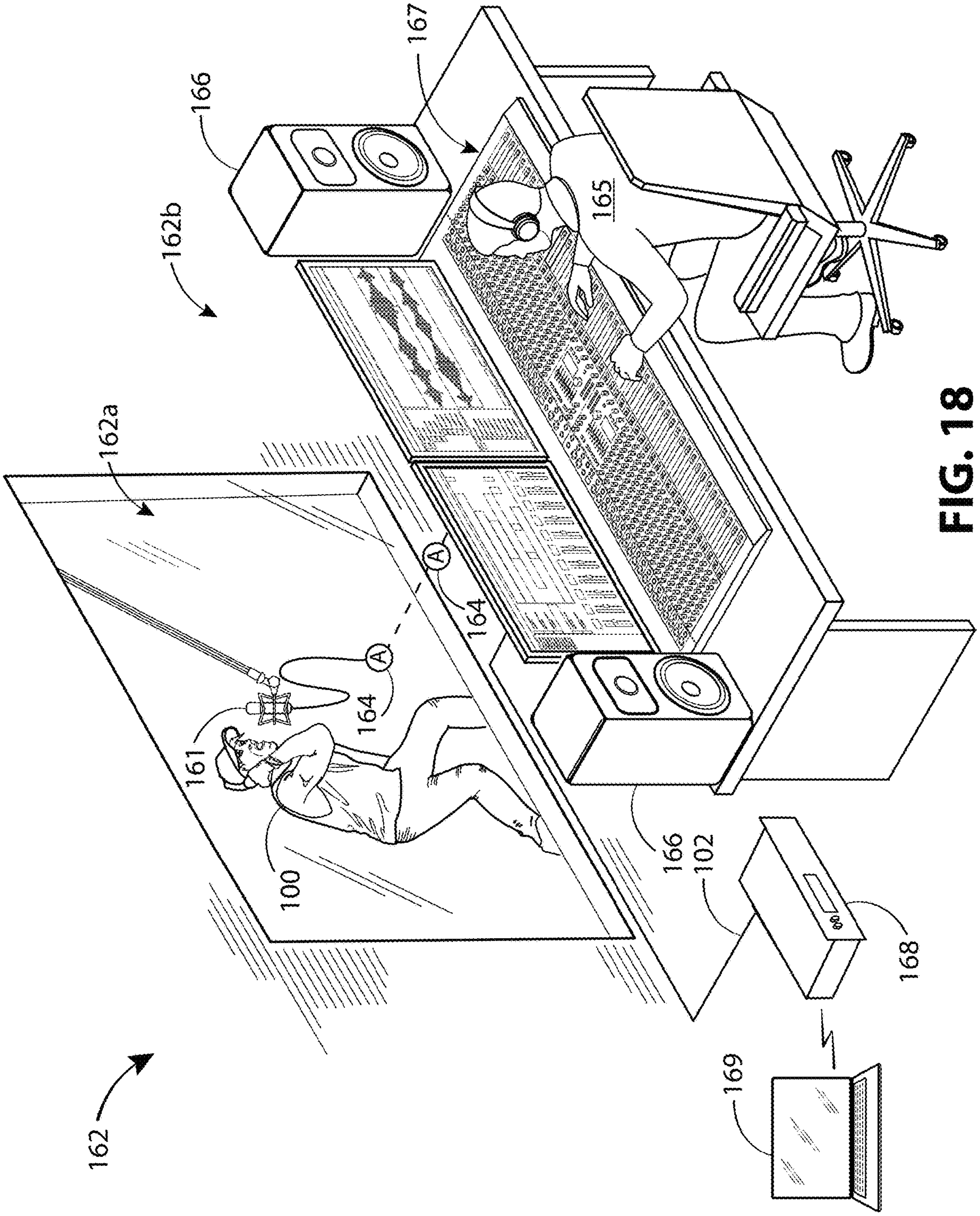
FIG. 18 illustrates a typical environment for recording the prerecorded vocal backing track.

The prerecorded vocal backing track is typically recorded in a controlled environment such as a recording studio, sound stage, or rehearsal studio. The prerecorded vocal backing track could even be recorded in the performance venue without an audience, before the vocal performance 101. FIG. 18 illustrates, as an example, the prerecorded vocal backing track 102 being recorded in a recording studio 162. The vocalist 100 sings into a microphone 161 inside the studio portion 162*a* of the recording studio 162. Inside the control room 162*b* of the recording studio 162, the microphone signal 164 (also indicated by the circled letter A), is routed to a microphone preamplifier. The preamplified signal is sent to an analog-to-digital converter for analog-to-digital conversion. The analog-to-digital converter and the microphone preamplifier can be within the digital audio workstation 167. They can also be within a digital mixing console, within a standalone unit, or even within the microphone itself. The mix engineer 165 records the prerecorded vocal backing track 102 into a digital audio workstation 167. The mix engineer 165, monitors the performance through monitor speakers 166. The mix engineer 165 sends the resultant prerecorded vocal backing track 102 from the digital audio workstation 167 to the vocal element extraction unit 168. This could be a digital audio signal such as AES67 or MADI, an analog signal, or a digital computer protocol signal such as Ethernet or Wi-Fi. The vocal element extraction unit 168 can be controlled via front panel controls, an external computer 169, or via the digital audio workstation 167.

Figure 19:
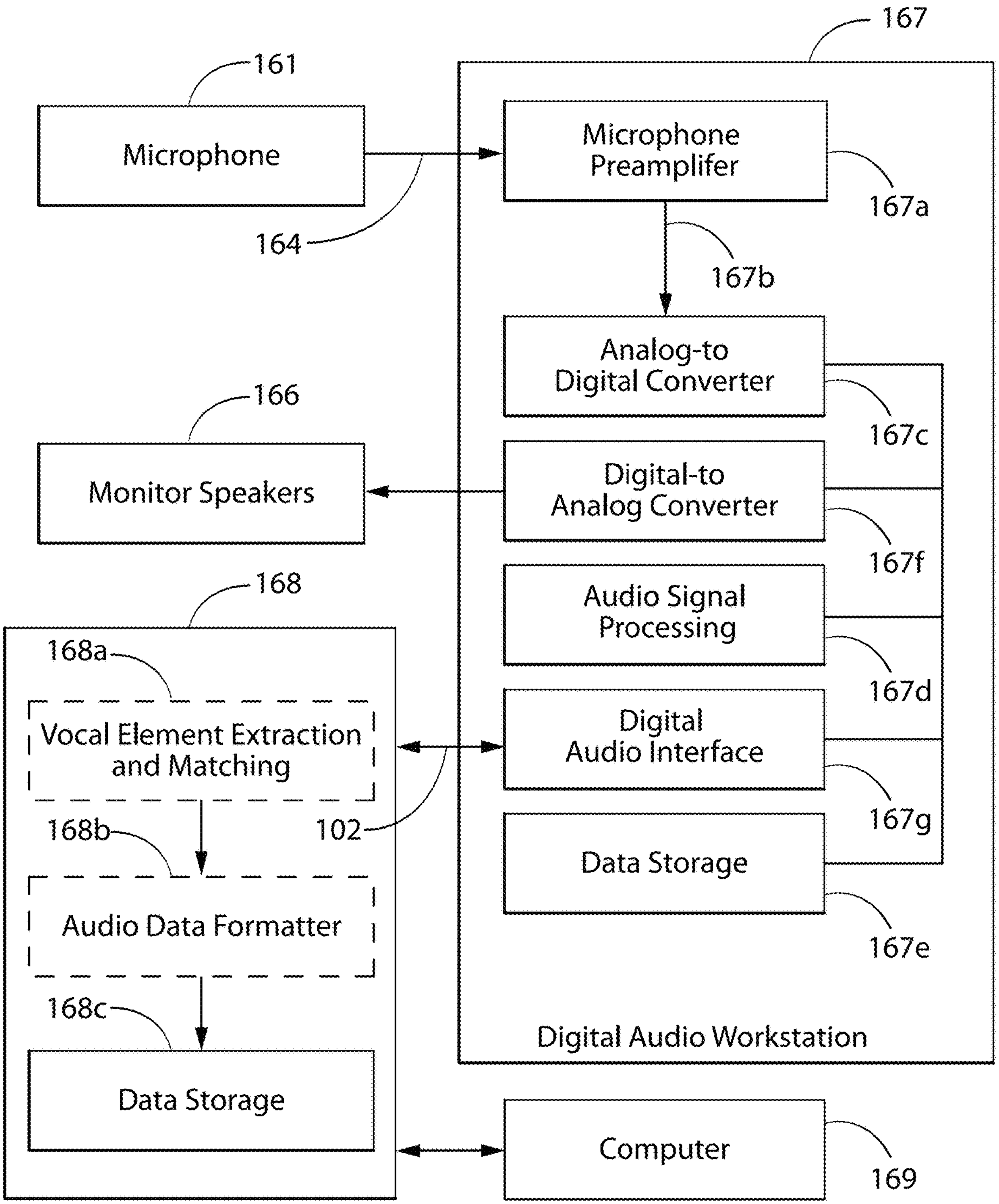
FIG. 19 shows a simplified block diagram that approximately corresponds to the use case of FIG. 18.

FIG. 19 shows one example of a block diagram of the preprocessing phase equipment and corresponds to the equipment setup of FIG. 18. As the vocalist sings into the microphone 161, the microphone signal 164 that results, is amplified by the microphone preamplifier 167*a*. The amplified microphone signal 167*b*, by analog-to-digital conversion is converted to a digital stream by the analog-to-digital converter 167*c*. The recording engineer may optionally perform audio signal processing to enhance the digitized vocal signal. Audio signal processing 167*d* may include frequency equalization, reverb, level compression, or other effects that may be available within the digital audio workstation 167. The digitized vocal signal is recorded on a data storage device 167*e*, such as a solid-state drive or SSD, resulting in a prerecorded vocal backing track 102. The recording engineer may monitor the recording process through monitor speakers 166. A digital-to-analog converter 167*f* converts the digitized audio signal to an analog signal which may be received by the monitor speakers 166. In this example, the monitor speakers 166 are assumed to be self-powered (i.e., include built-in amplifiers). For passive or unamplified monitor speakers, the digital audio workstation 167 may feed an audio amplifier. The audio amplifier would then feed an amplified audio signal to passive monitor speakers.

The recording engineer may post-process the prerecorded vocal backing track 102 using the vocal element extraction unit 168. The digital audio workstation 167, as illustrated, transmits the prerecorded vocal backing track 102 to the vocal element extraction unit 168 by the digital audio interface 167*g*. Alternatively, the prerecorded vocal backing track may be sent by a computer protocol such as Ethernet or Wi-Fi. If the vocal element extraction unit 168 is capable of receiving analog signals, the digital audio workstation 167 may optionally send the prerecorded vocal backing track as an analog signal using the digital-to-analog converter 167*f*.

The vocal element extraction unit 168 may include vocal element extraction 168*a*. Vocal element extraction 168*a* analyzes the prerecorded vocal backing track 102 identifying and extracting vocal elements such as phonemes, vector embeddings, or vocal audio spectra. For example, vocal element extraction 168*a* may break down the prerecorded vocal backing track 102 into phonemes and create corresponding time stamps for each phoneme. The phonemes may be identified and extracted using a transfer-based neural network, such as ContentVec, Wave2vec 2.0, or HUBERT. ContentVec and Wave2vec 2.0 may use semi-supervised machine-learning to identify the phonemes. The model may be trained to recognize phonemes on a large set of speech or vocal input, followed by a smaller set specific to the vocalist. As the phonemes, or other vocal elements, are extracted they are timestamped, i.e., their position in time (i.e. temporal position) is noted, as previously discussed.

Once the vocal elements are extracted, the audio data formatter 168*b* takes the timestamped vocal elements and creates a data file or timing map that stores each vocal element along with position in time. The resulting data file along with the prerecorded vocal backing track 102 can be stored within a data storage device 168*c*, such as a solid-state drive or SSD, within the vocal element extraction unit 168. The timestamped vocal elements data file along with the prerecorded vocal backing track 102 may also be transmitted back to the data storage device 167*e* in the digital audio workstation 167.

The vocal element extraction unit 168 may be controlled by a front panel graphical user interface (GUI) or tactile controls (for example, switches and rotary knobs), by the GUI within the digital audio workstation 167 or by an external computer 169.

Figure 20:
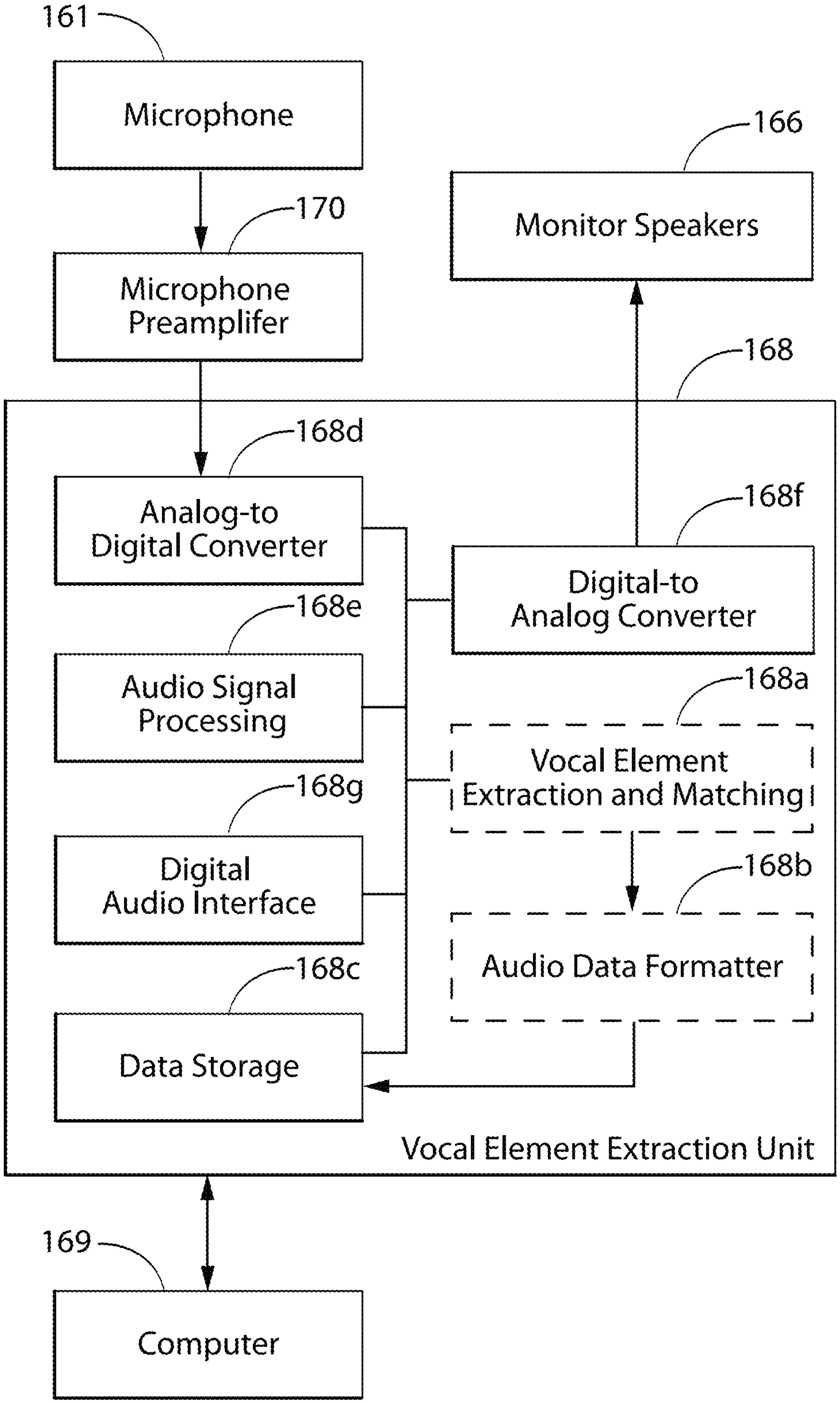
FIG. 20 shows a simplified block diagram that is an alternative structure for recording and preprocessing the prerecorded vocal backing track.

FIG. 20 shows an alternative block diagram for equipment suitable for the preprocessing phase. Referring to FIG. 20, in this example, rather than using a digital audio workstation, the microphone 161 may feed the vocal element extraction unit 168 via a microphone preamplifier 170. The resultant output of the vocal element extraction unit 168 may be monitored using monitor speakers 166. In this example, vocal element extraction 168*a*, the analog-to-digital converter 168*d*, audio signal processing 168*e*, digital-to-analog converter 168*f*, digital audio interface 168*g*, audio data formatter 168*b*, and data storage device 168*c* are housed within the vocal element extraction unit 168. The vocal element extraction unit 168 may include a GUI or may optionally use an external computer 169 as control and display. The analog-to-digital converter 168*d* receives the output of the microphone preamplifier 170. The output of the digital-to-analog converter 168*f* feeds the monitor speakers 166. The other blocks within the vocal element extraction unit 168 function as previously described. The vocal element extraction unit 168 may optionally include the microphone preamplifier 170, eliminating the need for an external microphone preamplifier. Equalization, level compression, and other vocal processing, may also optionally be included within the vocal element extraction unit 168. The vocal element extraction unit 168 may optionally receive signals from a digital microphone or a microphone with a digital interface via the digital audio interface 168*g*. The vocal element extraction unit 168 may optionally feed self-powered speakers that include a digital audio interface, via digital audio interface 168*g*.

In the preprocessing phase, vocal element extraction 168*a* does not need to extract and time stamp the vocal elements in realtime. Because of this, vocal element extraction 113 may optionally run within a desktop computer, laptop computer, or mobile device to run non-realtime deep learning model software in a production environment. An example of such a computer is a MacBook Pro M4 by Apple, which includes neural engine processing. In this scenario, typically, the microphone and monitor speakers might connect to the computer via a digital audio conversion device (i.e., with analog-to-digital conversion and digital-to-analog conversion) with a microphone preamplifier and line-level outputs.

Figure 21:
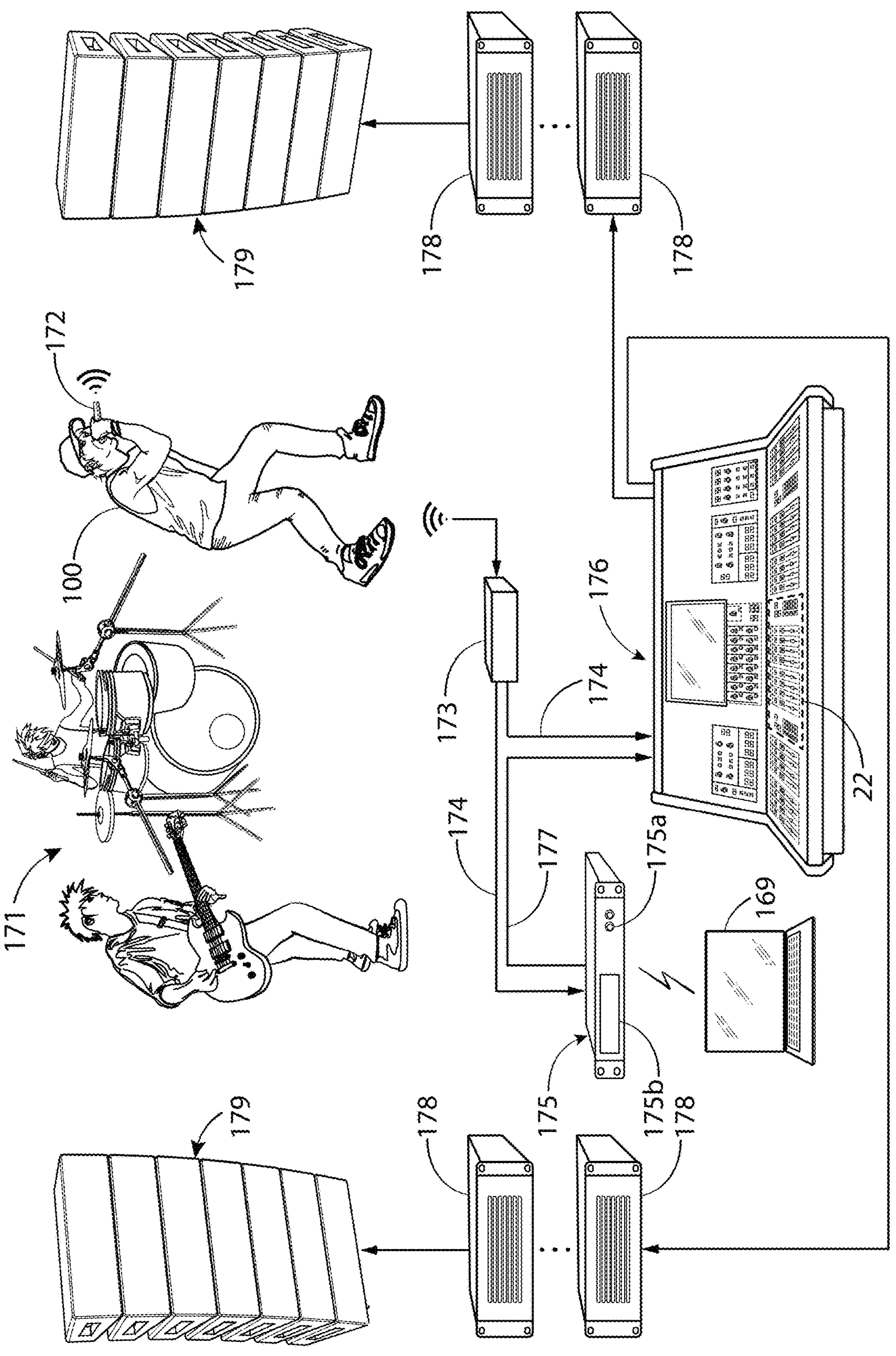
FIG. 21 illustrates a simplified typical setup for a touring band using the vocal backing track synchronization unit during a live performance.

FIG. 21 illustrates a typical live use case. In this example, it shows a configuration that could be used in a large venue. FIG. 21 shows a band 171 playing during a live performance. The vocalist 100 sings into a microphone 172. The vocalist's live performance may be transmitted to a signal splitter 173 where the live vocal signal 174 is routed to a vocal backing track synchronization unit 175 and to a front-of-house mixer 176. In this example, the front-of-house mixer 176 is a digital live sound mixer, but it could also be an analog live sound mixer. Alternatively, the live vocal signal 174 may be routed directly to the front-of-house mixer 176 and looped through to the vocal backing track synchronization unit 175. As a third alternative, live vocal signal 174 may be routed directly to the vocal backing track synchronization unit 175 and looped through digitally to the front-of-house mixer 176. The vocal backing track synchronization unit 175 may be the vocal element extraction unit 168 used in the preprocessing phase, or may be a different unit that is optimized for live performance and synchronization. The vocal backing track synchronization unit 175 identifies and extracts vocal elements, such as phonemes, vector embeddings, and vocal audio spectra from the live vocal performance, compares them to the timing map created during the preprocessing phase; typically, by using a predictive algorithm. As a result, the vocal backing track synchronization unit 175 time stretches or compresses the prerecorded vocal backing track to match the timing of the live vocal performance. The vocal backing track synchronization unit 175 may be controlled by the playback engineer using front panel controls 175*a* or a front panel display 175*b*. The front panel controls 175*a* and the front panel display 175*b* are optional. The playback engineer may also control the vocal backing track synchronization unit 175 using an external computer 169. As discussed, this process occurs in realtime. The time-synchronized vocal backing track 177 that results, is routed to the front-of-house mixer 176. In this example, it would be routed as a digital audio signal, using digital audio transfer protocol, such as AES/EBU, MADI, AES67, Ravenna, or Dante.

Figure 22:
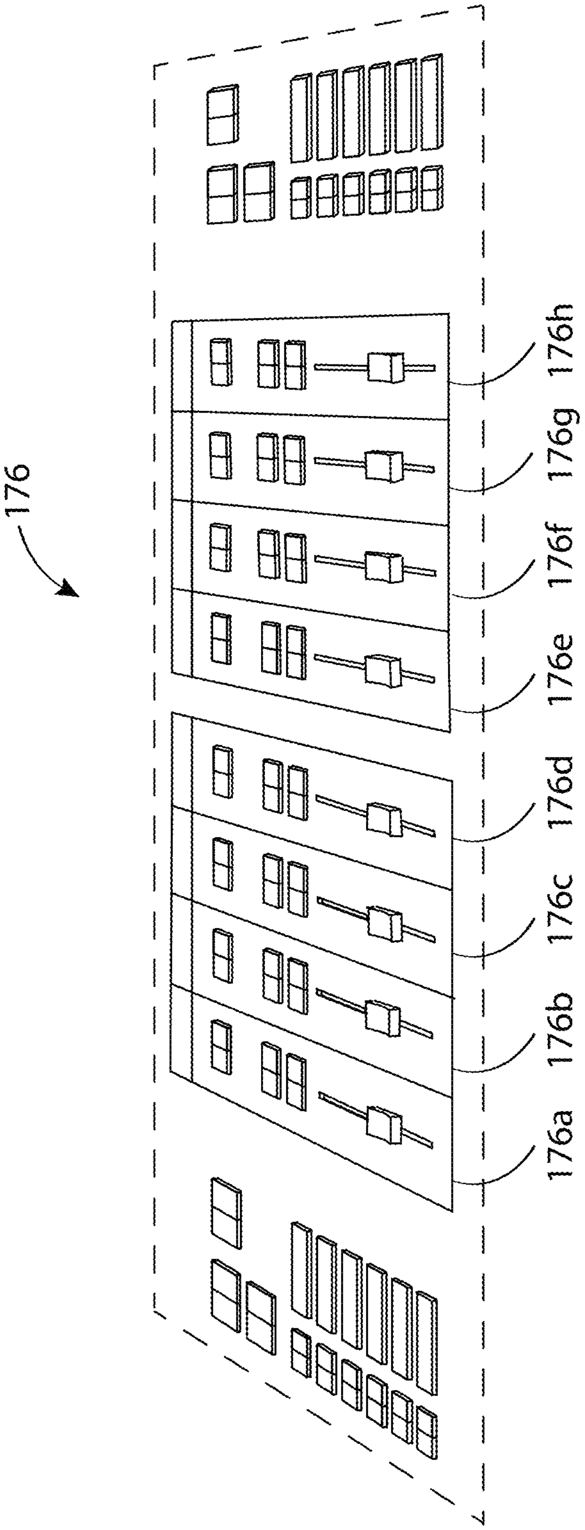
FIG. 22 illustrates an enlarged portion of the front-of-house mixer from FIG. 21.

FIG. 22 shows an enlarged portion of the front-of-house mixer 176 of FIG. 21, called out in FIG. 21 by reference designator 22 and surrounded by dashed lines. Continuing to refer to FIG. 22, in this example, the time-synchronized vocal backing track is routed to mixer channel 176*a* and the live vocal signal is routed to mixer channel 176*b*. This allows the front-of-house mix engineer to choose between using the time-synchronized vocal backing track or the live vocal signal. In addition, other signals such as the guitar or drums are routed to other mixer channels. For example, the guitar can be routed to mixer channel 176*c*, while the drums can be routed to mixer channels 176*d*, 176*e*, 176*f*, 176*g*, 176*h*. Referring to FIG. 21, the audience hears the resulting mix routed to audio amplifiers 178 and speakers 179.

The vocal backing track synchronization unit 175 may optionally capture performance-specific nuances or prosody, and adjust the prerecorded vocal backing track to reflect these nuances. Prosody nuances can include, but are not limited to, pitch, vibrato, intonation, stress, and loudness (intensity). For example, if the vocalist sings softly, the vocal backing track synchronization unit 175 may optionally capture this and adjust the signal level and signal envelope of the corresponding vocal elements in the prerecorded vocal backing track to reflect this.

Figure 23:
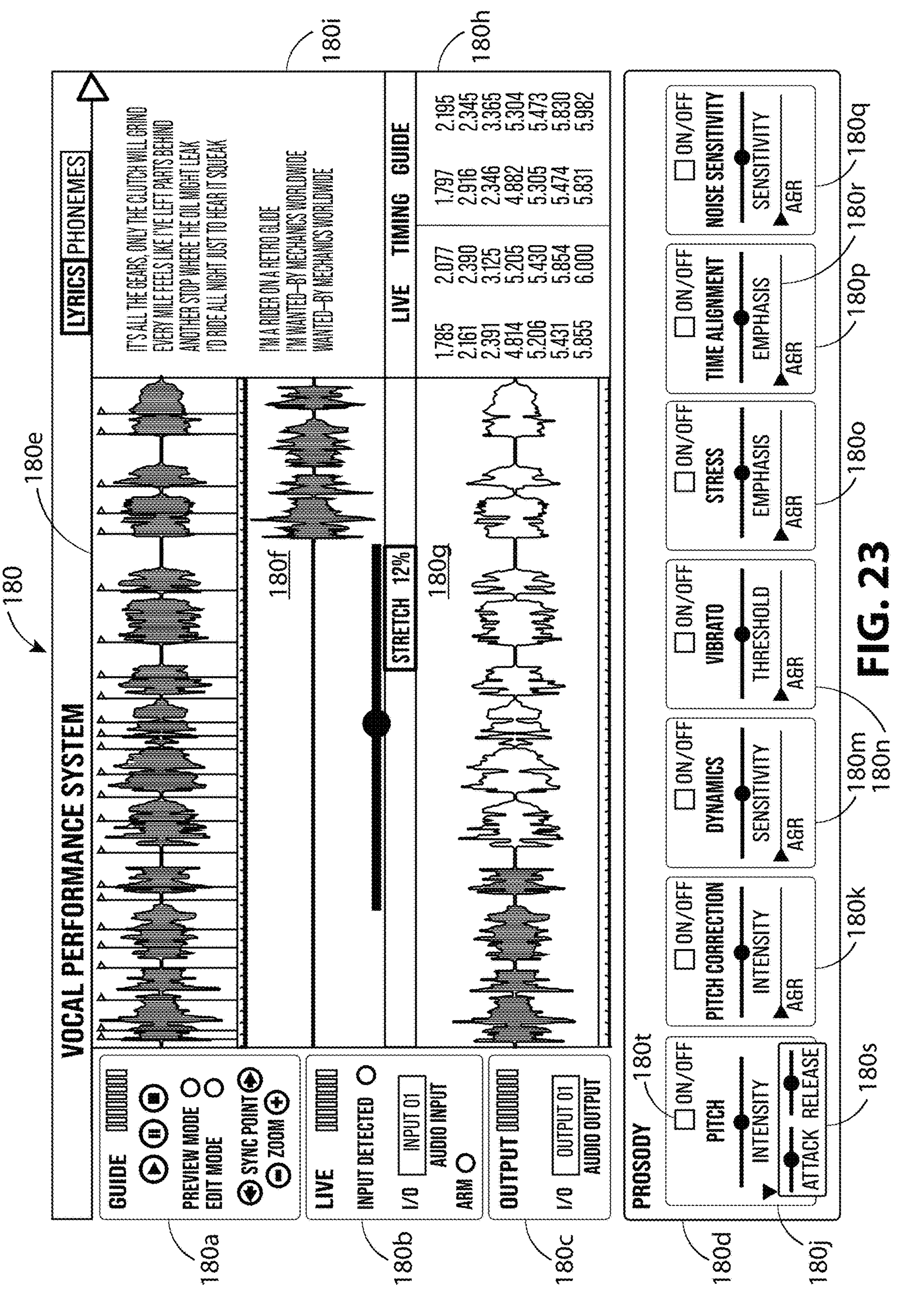
FIGS. 23 and 24 show a typical control interface for the phoneme extraction unit as it might be displayed on an external computer, with FIG. 23 displaying lyrics in English, and FIG. 24 displaying lyrics in phonemes, using the International Phonetic Alphabet or IPA.
Figure 24:
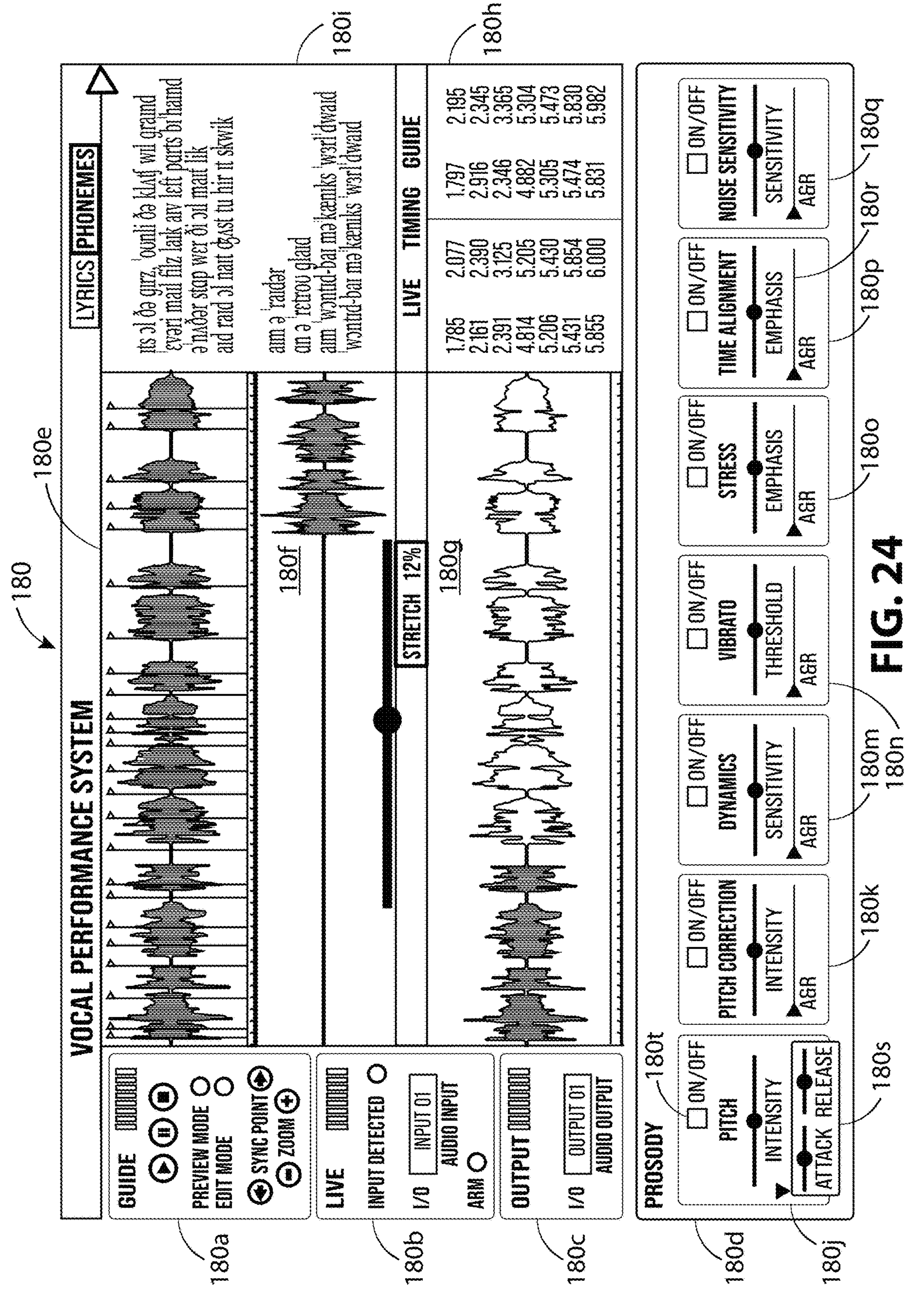

FIGS. 23 and 24 show a user control interface 180 for the vocal backing track synchronization unit 175 of FIG. 21 that may control both time alignment and prosody factors. The user control interface, as illustrated, is an example of what might be displayed on the external computer 169 of FIG. 21. In FIGS. 23 and 24, the user control interface 180 may include a backing track control section 180*a*, live input monitoring 180*b*, output monitoring 180*c*, prosody control section 180*d*, and a visual waveform display of the live vocal waveform 180*e*, the guide track wave 180*f*, and edited guide track waveform 180*g*. The user control interface 180 may also include timing display 180*h* that shows live vs. guide track timing for each phoneme. The user control interface 180 may also include a lyric-phoneme display 180*i*. FIG. 23 shows the lyric-phoneme display 180*i* displaying lyrics. FIG. 24 shows the lyric-phoneme display 180*i* displaying the phonemes that correspond to the lyrics. The phonemes are shown displayed using the International Phonetic Alphabet (IPA) for the English language.

The prosody control section 180*d* may control the systems sensitivity to various prosody factors as well as time alignment sensitivity. As an example, prosody control section 180*d* in FIGS. 23 and 24 include the following sections: pitch sensitivity section 180*j*, pitch correction section 180*k*, dynamics sensitivity section 180*m*, vibrato section 180*n*, stress section 180*o*, time alignment section 180*p*, and noise sensitivity section 180*q*. Each of these sections includes a primary control, an attack-release control, and an on-off switch. The attack-release control determines the speed at which the prerecorded vocal backing track responds to the onset (attack) and ending (release) of any deviation in the live vocal performance as compared to the prerecorded vocal backing track. As illustrated in the example of FIGS. 23 and 24, in the resting position the attack-release control may appear as an arrow and horizontal line with the designation A&R. As an example, the attack-release control 180*r* for the time alignment section 180*p* is shown in its resting position. When the attack-release control is being adjusted, it may appear as a drop-down, and displays the attack and release controls. For example, the attack-release control 180*s* is shown in its ready-to-adjust position. The on-off switch switches the system control of that prosody factor on or off. An example of on-off switch is on-off switch 180*t* for the pitch sensitivity section 180*j*. The primary controls will be described in more detail in the following paragraphs.

The intensity control of the pitch sensitivity section 180*j*, adjusts how finely the prerecorded vocal backing track responds to changes in pitch from the live vocal performance. Lower sensitivity ignores minor pitch fluctuations and focuses on more substantial pitch movements. Higher sensitivity captures subtle pitch changes.

The intensity control of the pitch correction section 180*k*, governs how strongly pitch correction is applied. The dynamics sensitivity section 180*m* controls how the prerecorded vocal backing track responds to changes in volume or loudness from the live vocal performance. A low setting of the sensitivity control reacts to only significant loudness changes while a high setting reacts even to slight variations.

The vibrato section 180*n* controls how the prerecorded vocal backing track responds to vibrato in the live vocal performance. The threshold control adjusts the sensitivity to the vibrato's rate (speed) and depth (amount of pitch variation).

The stress section 180*o* controls the emphasis of accented phonemes or stressed syllables. The emphasis slider sets how strongly the prerecorded vocal backing track is adjusted in response to accented phonemes in the live vocal performance.

The time alignment section 180*p* adjusts how the prerecorded vocal backing track responds to timing mismatches between the live vocal performance and the prerecorded vocal backing track. The emphasis control adjusts how aggressively the prerecorded vocal backing track is time-synchronized to match the live vocal performance. With the emphasis slider centered, the prerecorded vocal backing track is adjusted to match the timing of the live vocal performance. With the slider to the left, the prerecorded vocal backing track is shifted earlier than the live vocal performance, to create a "laid-back" feel. With the slider to the right of center, the prerecorded vocal backing track is shifted forward to create a "pushed" feel or to compensate for latency.

The noise sensitivity section 180*q* determines how strictly the system filters out background noise, such as the vocalist's breathing. Low sensitivity is more tolerant of ambient noise and may occasionally misrepresent this as part of the live vocal performance. High sensitivity aggressively filters noise but at the risk at filtering vocal nuances.

Figure 25:
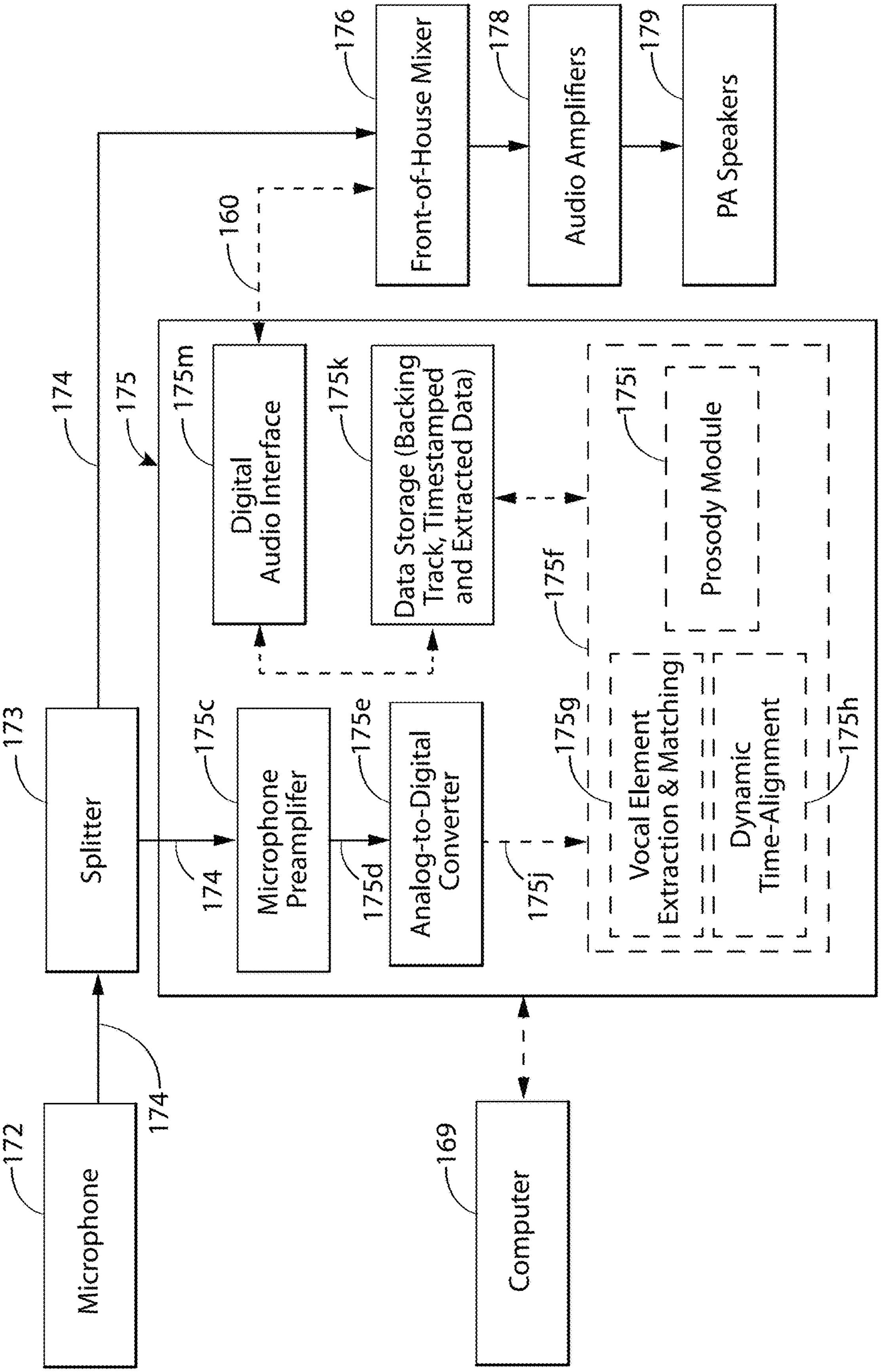
FIG. 25 illustrates a simplified block diagram that approximately corresponds to FIG. 21.

FIG. 25 shows a professional live use case block diagram that approximately corresponds to FIG. 21. For clarity, conceptual blocks within FIG. 25 are shown in wider-spaced dashed lines. Digital signal paths are shown in narrower-spaced dashed lines. Referring to FIG. 25, the live vocal signal 174 from the microphone 172, may optionally feed a signal splitter 173. The signal splitter 173 splits the live vocal signal 174 with one branch of the live vocal signal 174 feeding the vocal backing track synchronization unit 175, and the other branch feeding an input channel of the front-of-house mixer 176. In this example, the front-of-house mixer 176 may be a digital live sound mixer suitable for major touring acts playing in large venues. Examples of front-of-house mixers include, but are not limited to, Solid State Logic (SSL) L500 Plus, DigiCo SD7, Soundcraft Vi3000, or Yamaha Rivage PM5. The live vocal signal 174 feeding the front-of-house mixer 176, would typically pass through a microphone preamplifier followed by analog-to-digital converters within the front-of-house mixer 176. The live vocal signal 174 entering the vocal backing track synchronization unit 175 may feed a microphone preamplifier 175*c*. The amplified microphone signal 175*d* that results, would feed an analog-to-digital converter 175*e*. The digitized output 175*j* of the analog-to-digital converter 175*e* enters a vocal element processing module 175*f*.

The vocal element processing module 175*f* identifies and extracts vocal elements, such as phonemes, vector embeddings, or vocal audio spectra, and their time positions from the live vocal performance. It then matches these vocal elements to corresponding vocal elements extracted from the prerecorded vocal backing track. It adjusts the timing of the vocal elements within the prerecorded vocal backing track to match the timing of corresponding vocal elements in the live vocal performance. The vocal element processing module 175*f* may include one or more modules, or processes, to accomplish this. For example, it may include a vocal element extraction-matching module 175*g* and a dynamic time alignment module 175*h*. The vocal element extraction-matching module 175*g* identifies and extracts vocal elements such as phonemes, vector embeddings, or vocal audio spectra, and their temporal positions from the live vocal performance. It matches these to corresponding time-stamped vocal elements extracted from the prerecorded vocal backing track. As previously discussed, the prerecorded vocal backing track, along with the time stamped vocal element file, or files, generated during the preprocessing phase, may be stored within a data storage device 175*k* within the vocal backing track synchronization unit 175. This device may be a hard drive, a solid-state drive or SSD, or may be memory, such as DRAM or ECC RAM.

The dynamic time alignment module 175*h* dynamically time-aligns the prerecorded vocal backing track to match the timing of the vocal elements extracted from the live vocal performance. The dynamic time alignment module 175*h* may accomplish this, by temporally compressing or expanding vocal elements in the prerecorded vocal backing track that are matched with the vocal elements extracted from the live vocal performance. This time compression and expansion may be facilitated by software modules such as Zplane Élastique, Dirac Time Stretching, Zynaptiq ZTX, or Audiokinetic Wwise.

The vocal element processing module 175*f* may also identify prosody factors from the live vocal performance and use these to manipulate prosody factors in the prerecorded vocal backing track. The prosody factors extracted from the prerecorded vocal backing track, may be preloaded, and stored in data storage device 175*k* along with the extracted vocal element timing table. The extent and range of how the prosody factors are applied to the prerecorded vocal backing track can be controlled by a user interface, to be modified within a preset range. An example of a user interface that limits the dynamic control of the prerecorded vocal backing track to within preset ranges is the prosody control section 180*d* of FIGS. 23 and 24.

Continuing to refer to FIG. 25, the user interface may reside internally within the vocal backing track synchronization unit 175 or within an external device, such as external computer 169. The vocal element processing module 175*f* may include, for example, one or more of a prosody module 175*i* that performs prosody analysis on the raw audio from the live vocal performance. A neural network model may be used to detect pitch, vibrato, amplitude, or other prosody factors in parallel with the vocal element extraction process. This will be discussed in more detail for FIGS. 27 and 28.

Continuing to refer to FIG. 25, the resulting time-synchronized, and optionally prosody-adjusted, prerecorded vocal backing track, may be transmitted to the front-of-house mixer 176 via a digital audio interface 175*m* as digital signal 160. This may optionally be routed to the front-of-house mixer 176 as an analog signal via an optional digital-to-analog converter (not shown). As previously discussed, the live vocal signal and adjusted prerecorded vocal backing track may be routed through separate mixer channels. The front-of-house engineer may then choose to send the live vocal signal or the adjusted vocal backing track, or a mixture of both, to the audience via the audio amplifiers 178 and speakers 179.

Figure 26:
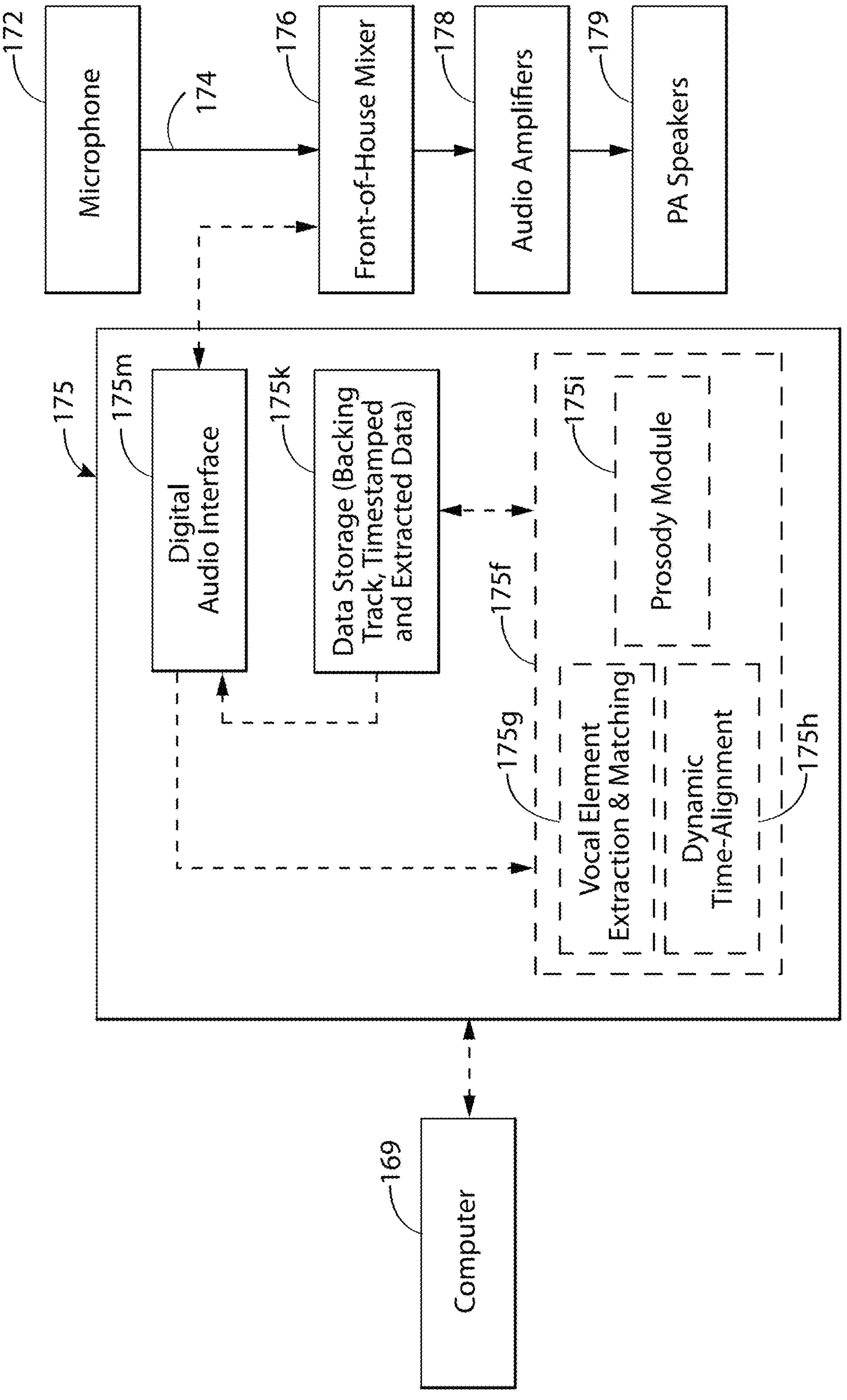
FIG. 26 illustrates an alternative simplified block diagram for a touring band using the vocal backing track synchronization unit during a live performance.

FIG. 26 shows an alternative professional live use case block diagram. For clarity, conceptual blocks within FIG. 25 are shown in wider-spaced dashed lines. Digital signal paths are shown in narrower-spaced dashed lines. In this example, the live vocal signal 174 from the microphone 172 feeds the front-of-house mixer 176. As in the previous example, the front-of-house mixer 176 may be a digital mixer. A microphone preamplifier within the front-of-house mixer, or optionally before the front-of-house mixer, amplifies the microphone signal. The resulting amplified microphone signal feeds an analog-to-digital converter where it is converted, by analog-to-digital conversion, to a digital signal that represents the live vocal signal. The resulting digitized live vocal signal may be transmitted to the vocal backing track synchronization unit 175 via a multichannel digital audio interface such as MADI or AES67. The vocal backing track synchronization unit 175 may receive the digitized live vocal signal via a digital audio interface 175*m*. The digital audio interface 175*m* may transmit the digitized live vocal signal to the vocal element processing module 175*f*. The vocal element processing module 175*f* may include a vocal element extraction-matching module 175*g*, dynamic time alignment module 175*h*, and prosody module 175*i*, and data storage device 175*k* that may be structured and function as described for FIG. 25. Continuing to refer to FIG. 26, the resulting time-synchronized, and optionally prosody-adjusted, prerecorded vocal backing track may be streamed from data storage device 175*k*, or from system memory, to the front-of-house mixer 176 via a digital audio interface 175*m*. Alternatively, the signal may be sent to the front-of-house mixer 176 as an analog signal via an optional digital-to-analog converter (not shown). The front-of-house mixer 176 sends the time-synchronized prerecorded vocal backing track to the audio amplifiers 178 and speakers 179. The vocal backing track synchronization unit 175 may be optionally controlled by an external computer 169.

Figure 27:
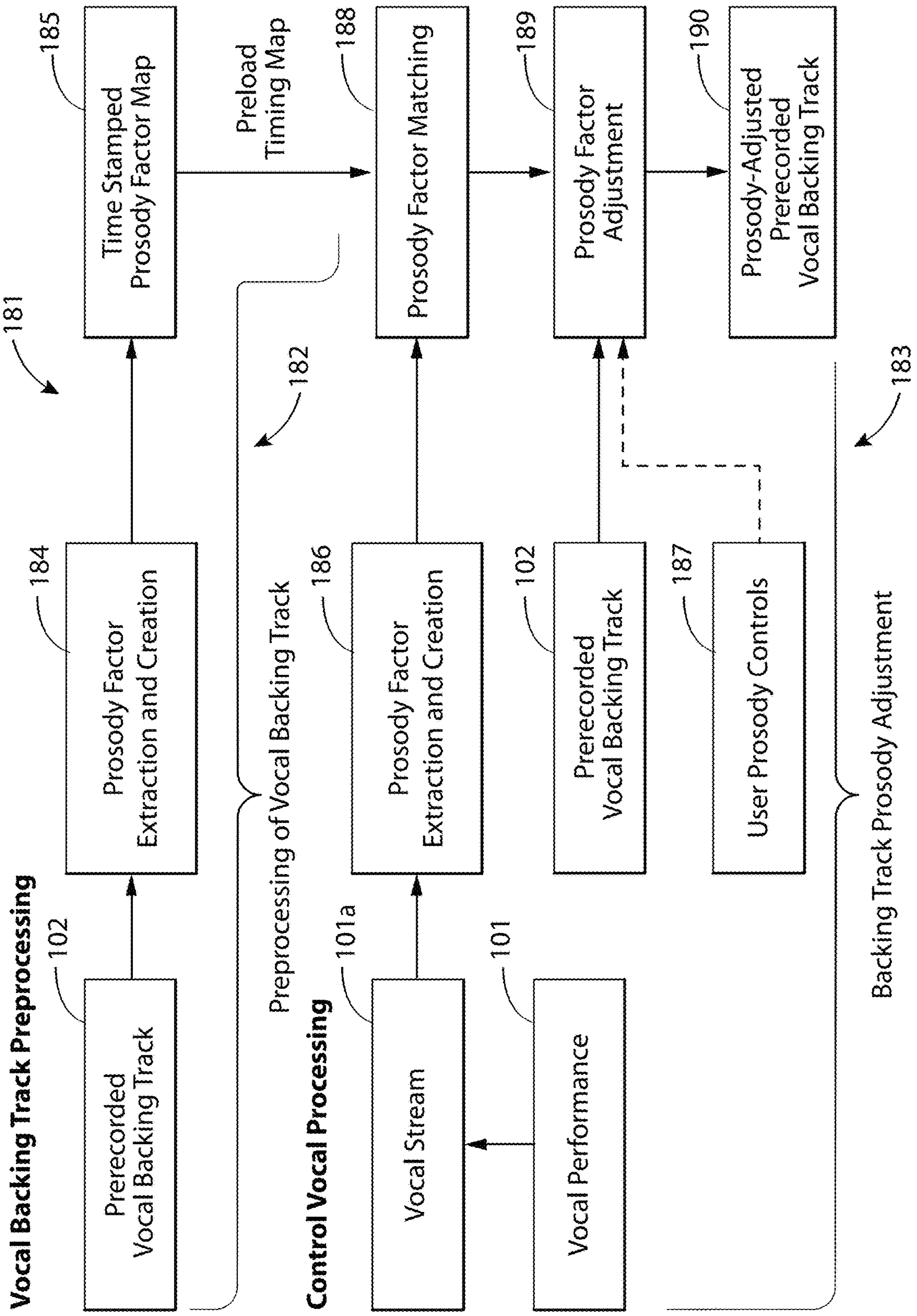
FIG. 27 illustrates a conceptual overview of the preprocessing phase, and control vocal processing phase, for creating a prosody factor-adjusted prerecorded vocal backing track.
Figure 28:
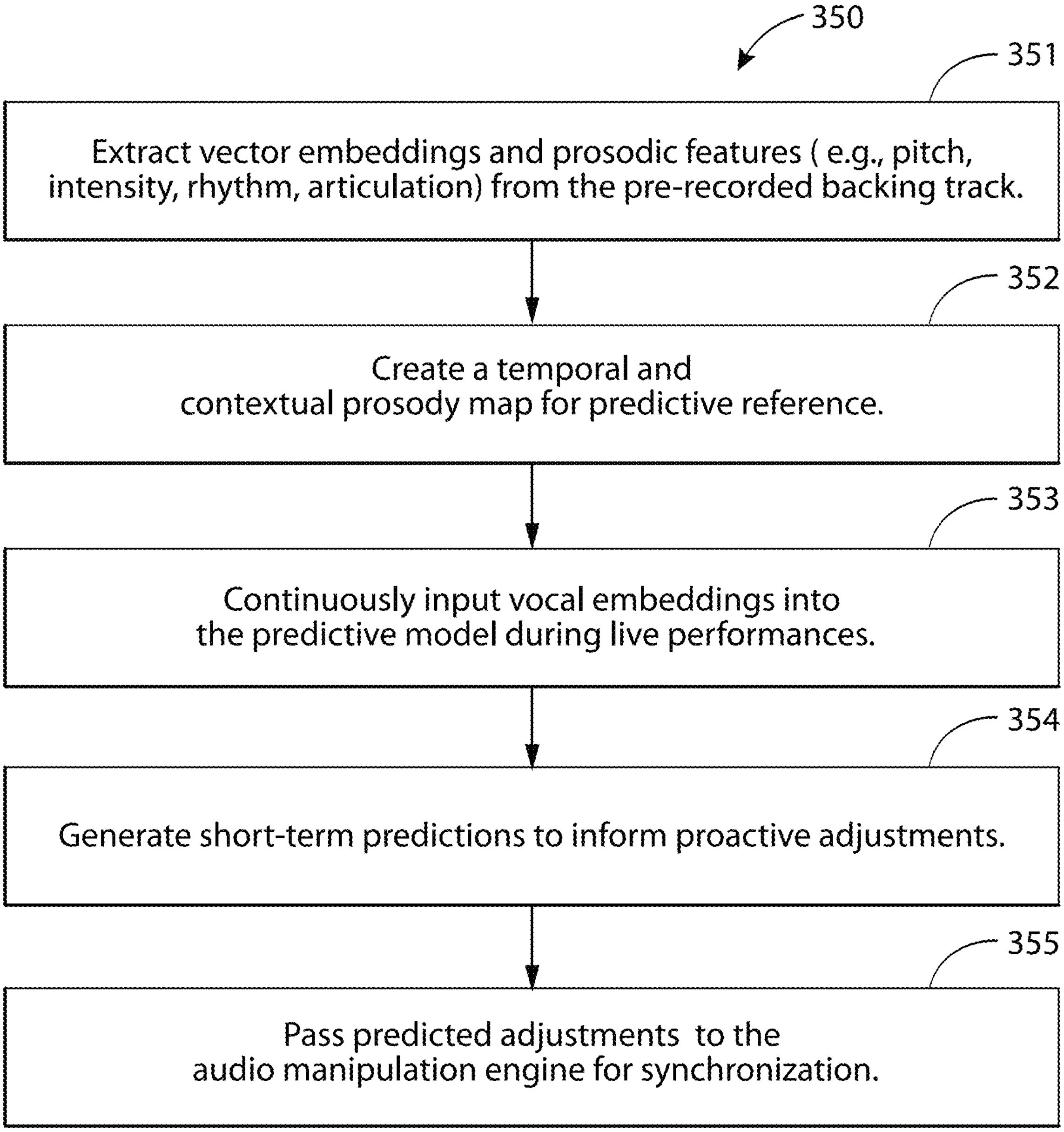
FIG. 28 illustrates a flow chart outlining a process associated with the conceptual overview of FIG. 27.

FIG. 27 illustrates a conceptual overview 181 of the preprocessing phase 182 and the control vocal processing phase 183 for creating a prosody-adjusted prerecorded vocal backing track 190. FIG. 28 illustrates a flow chart 350 outlining a process associated with the conceptual overview of FIG. 27. In the description below, functional blocks or structural elements refer to FIG. 27. Steps refer to FIG. 28. Referring to FIGS. 27 and 28, in step 351, in the preprocessing phase 182, before the the vocal performance, vector embeddings and prosody factors, such as pitch, vibrato, dynamics (volume), and stress, may be extracted from the prerecorded vocal backing track 102 using the prosody extraction engine 184. Referring to step 352, the prosody extraction engine 184 creates a timestamped/contextual prosody-factor map 185. The timestamped/contextual prosody-factor map 185 may be preloaded before the control vocal processing phase 183.

In step 353, during the control vocal processing phase 183, vocal elements, such as vector embeddings, or alternatively feature vectors, are extracted using the prosody extraction engine 186 from the vocal stream 101*a*. The resultant vector embeddings, or more generally the resultant vocal elements, are continuously loaded, in frames, into the predictive model in prosody factor matching 188. This may occur in realtime. As a non-limiting example, the frame can be 20-milliseconds. If step 353 is being processed in a neural audio codec latent feature space, then the frame may be a latent frame from the neural audio codec latent feature space. In step 354, the resulting extracted vector embeddings, or more generally, resulting extracted vocal elements are loaded into a predictive model, for example prosody factor matching 188. Prosody factor matching 188 generates short-term predictions to forecast alignment of the resulting extracted vocal elements in a time interval ahead of a current frame position. In a neural audio codec latent feature space, the current frame position refers to the current frame position of the latent frame. As a non-limiting example, forecast alignment of the resulting vocal element may occur in a time interval 50-200 milliseconds ahead, to inform proactive prosody parameter adjustments. In step 355, these predictions from the forecast alignment are passed into the prosody factor adjuster 189, that synchronize and adjust the prosody factors of the prerecorded vocal backing track 102 to match the vocal stream 101*a*, and therefore, the vocal performance 101. The result, is prosody-adjusted prerecorded vocal backing track 190. The control vocal processing phase 183 may optionally take place in realtime. For example, if the vocal performance 101 is a live vocal performance, what the audience will hear is a prosody-adjusted prerecorded vocal backing track that includes nuances and timing of the live vocal performance.

The prosody parameters are adjusted within a preset range according to user input controls 187. The preset range affects the extent of which the prosody factor adjuster 189 adjusts various prosody factors in the prerecorded vocal backing track 102. This preset range may be adjusted for example, by the playback engineer or by the front-of-house engineer. In this example, if the vocalist sings off key, the backing track can be adjusted to reflect variation in the singer's pitch, but within a more acceptable and pleasing range. As another example, the vocalist may opt to put more or less emphasis on a particular part, singing louder or softer. In this example, loudness, or dynamic parameters (attack and release of the signal envelope) of the prerecorded vocal backing track can be adjusted according to a preset range. For a live performance, the preset range may be adjusted, for example, by the playback engineer or by the front-of-house engineer.

Figure 29:
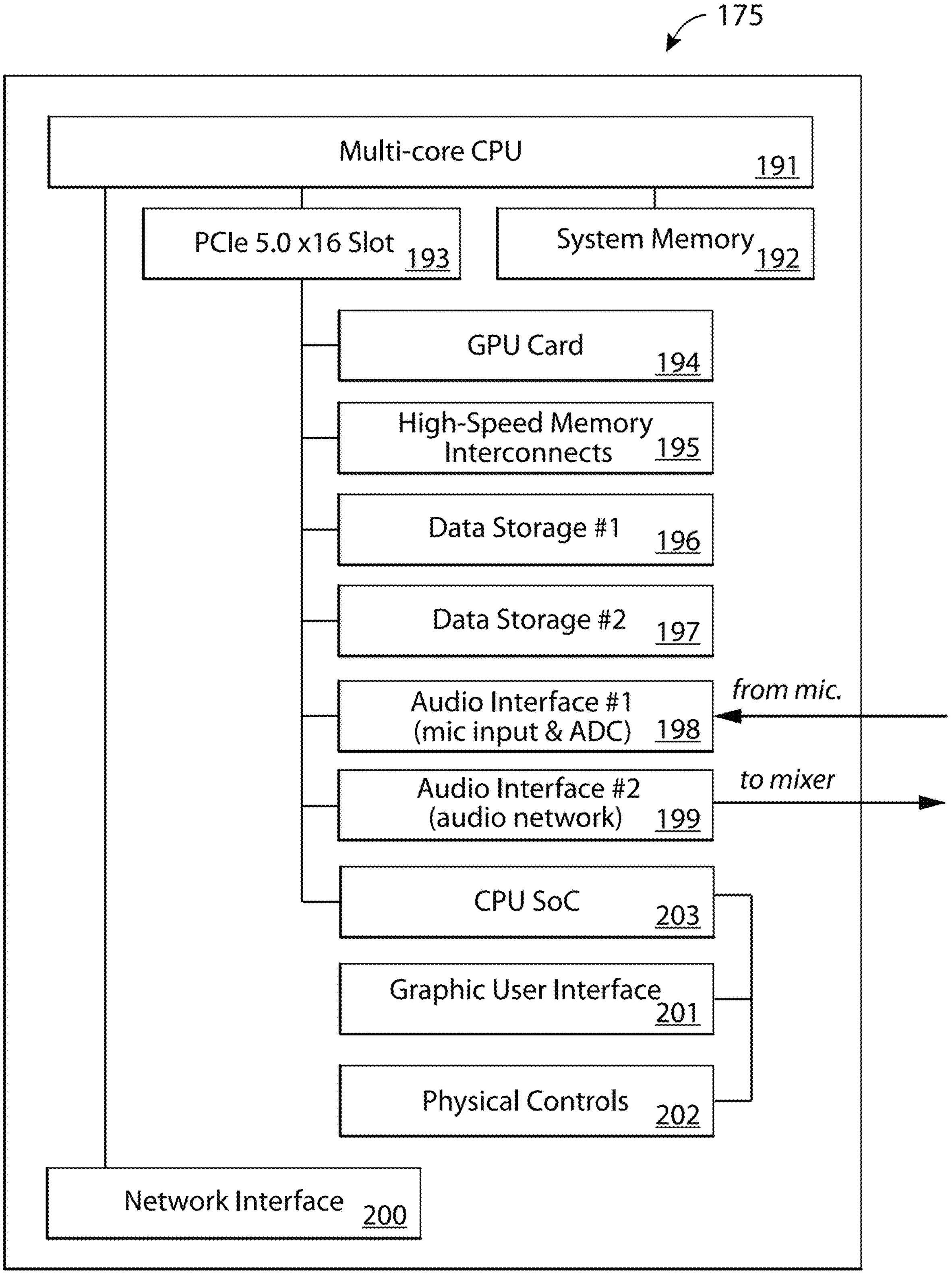
FIGS. 29 and 30 illustrate examples of hardware implementation of the vocal backing track synchronization unit, with FIG. 30 illustrating a hardware-specific example of FIG. 29.
Figure 30:
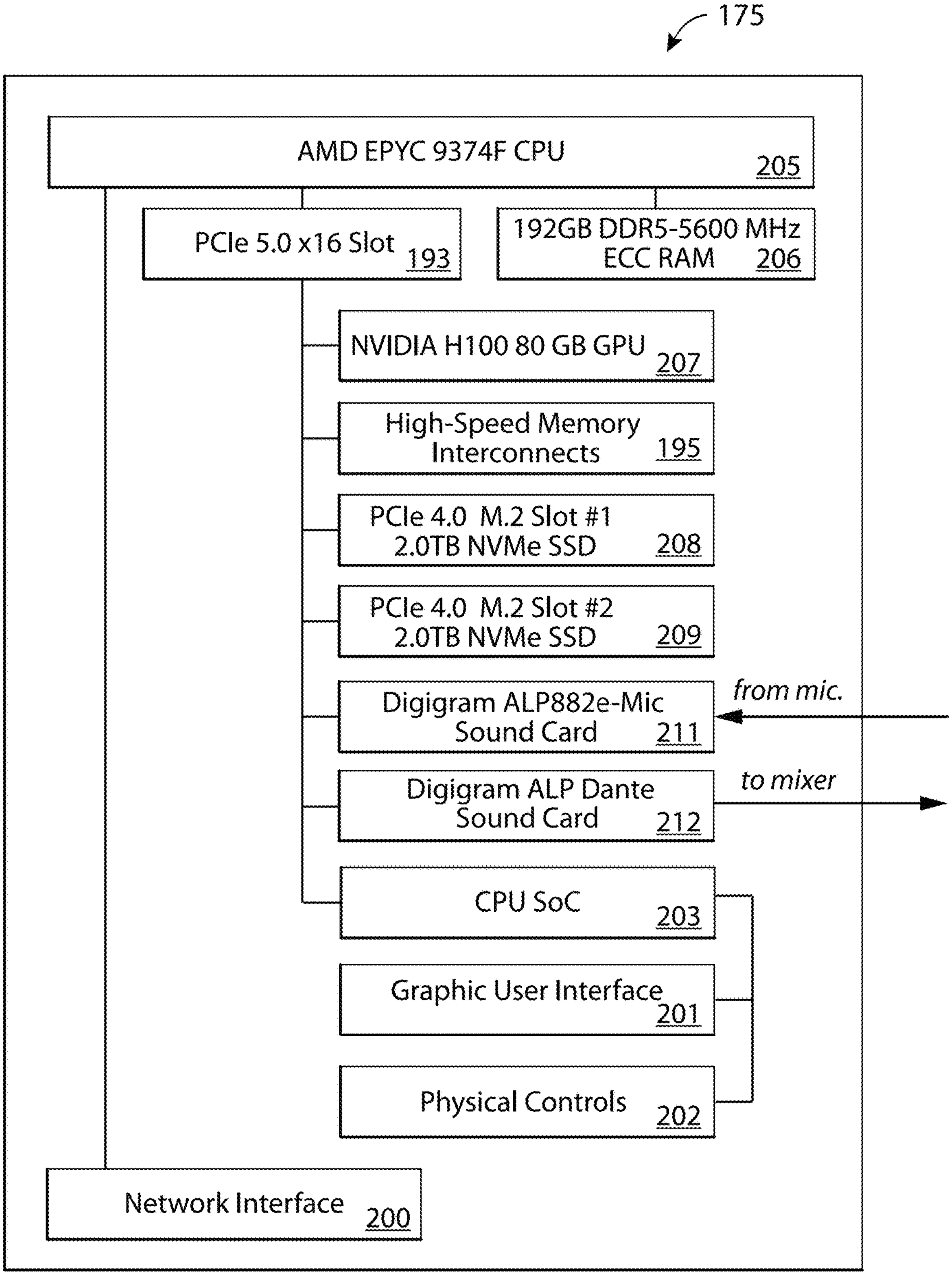

FIGS. 29 and 30 illustrate non-limiting examples of a hardware implementation of the vocal backing track synchronization unit 175. FIG. 30 illustrates a hardware-specific example of FIG. 29. This hardware implementation is designed to ensure that the phoneme identification, extraction, matching, and time-synchronization of the live vocal performance to the prerecorded vocal backing track may take place in realtime. Referring to FIG. 29, the vocal backing track synchronization unit 175 may include a multi-core CPU 191, system memory 192 tied to the multi-core CPU 191, and slots for peripherals, such as a PCI slots 193. The PCI slots 193, may connect to a Graphics Processing Unit (GPU), GPU 194, high-speed memory interconnects 195, general data storage 196, and general data storage 197. The general data storage 196 and general data storage 197 is illustrated in as a solid-state drive or SSD. Analog and digital audio signals may enter and exit the system via an audio interface or multiple audio interfaces, for example, audio interface 198 and audio interface 199. The audio interface 198 and audio interface 199 may be in the form of PCI cards that communicate with the multi-core CPU 191 via the PCI slots 193. In this example, audio interface 198 includes microphone and line-level inputs, and analog-to-digital converters. Audio interface 199, as illustrated, includes audio network interface such as AES67 or MADI. The vocal backing track synchronization unit 175 may include a network interface 200, such as USB, Bluetooth, Wi-Fi, or Ethernet, for communication with external peripheral devices, such as an external computer. The network interface typically communicates directly with the multi-core CPU 191. The vocal backing track synchronization unit 175 may also include a built-in graphic user interface 201 and physical controls 202, which are both optional. The built-in graphic user interface 201 and physical controls 202 may be connected to an optional system-on-a-chip, such as SoC CPU 203. The SoC CPU 203 may reside on the motherboard or be on a PCI card. The built-in graphic user interface 201 may be, for example, an LCD display, OLED display, or other graphic display suitable for the environment found in a professional live sound venue. The built-in graphic user interface 201 may be a simple display or a touchscreen. The physical controls 202 can be knobs connected to encoders or potentiometers. They may also include push buttons or toggles. The physical controls may optionally include haptic feedback.

The multi-core CPU 191 should be capable of performing the vocal element identification, extraction, matching, and time-synchronization, as previously described. The analog-to-digital converter within the audio interface 198 should have conversion latency sufficiently low enough as to not impact the overall performance of the system. Similarly, the general data storage 196 and general data storage 197 should have read/write and throughput speeds as to not impact the system performance and maintain system latency to realtime.

FIG. 30 illustrates an example of a specific hardware implementation of the vocal backing track synchronization unit 175 of FIG. 29 with an example of suitable hardware components. Referring to FIG. 30, an example of a multi-core CPU capable of this is the AMD EPYC-9374F CPU 205. The AMD EPYC-9374F is optimized for machine-learning algorithms. Other possible multi-core CPUs suitable for these tasks may include versions of the AMD Threadripper, or the Intel Xeon Gold 6448Y. The system memory 206 is illustrated as 192 GB DDR5 5600 MHz ECC RAM, which should have sufficient speed and size to stream and extract the phonemes from the live vocal stream and stream and time-align the prerecorded vocal backing track. It should also have sufficient speed and size to preform prosody analysis on the live vocal stream, and dynamically control one or more prosody parameters of the prerecorded vocal backing track.

The GPU card 207 is illustrated as a NVIDA H100 80 GB GPU. The general data storage 208 and general data storage 209 are illustrated as 2 TB NVMe solid-state drives. The size and performance of these solid-state drives, or SSDs, should be sufficient to store the prerecorded vocal backing track, store software such as ContentVec or Wave2Vec 2.0 for the vocal element identification, extraction, and matching, store software such as Zplane Élastique for time-compression expansion, and store the operating system, such as Ubuntu Linux. They also have sufficient speed to operate in the demanding professional environment of live sound venues. The audio interface 211 and the audio interface 212 are illustrated as a Digigram ALP882e-Mic sound card, and a Digigram ALP Dante Sound card, respectively. The Digigram ALP882e-Mic includes features suitable for a professional live audio environment, such as balanced analog microphone inputs with digitally adjustable microphone gain. It also includes other features suitable for professional live venue applications such as analog-to-digital and digital-to-analog conversion at 24 bits and 192 kHz, and PCM data formats up to 32-bit floating point. The Digigram ALP Dante sound card is a network audio card and includes support for AES67 and AES3 protocols. The PCI slots 193, high-speed memory interconnects 195, network interface 200, built-in graphic user interface 201, physical controls 202, and the SoC CPU 203, may be as discussed for FIG. 29.

Referring to FIGS. 29 and 30, the system may process either PCM audio streams or neural codec streams. In neural codec-based implementations (e.g., SoundStream, Encodec), the processor may operate directly in the latent feature space, reducing I/O bandwidth and memory requirements while maintaining alignment accuracy.

Figure 31:
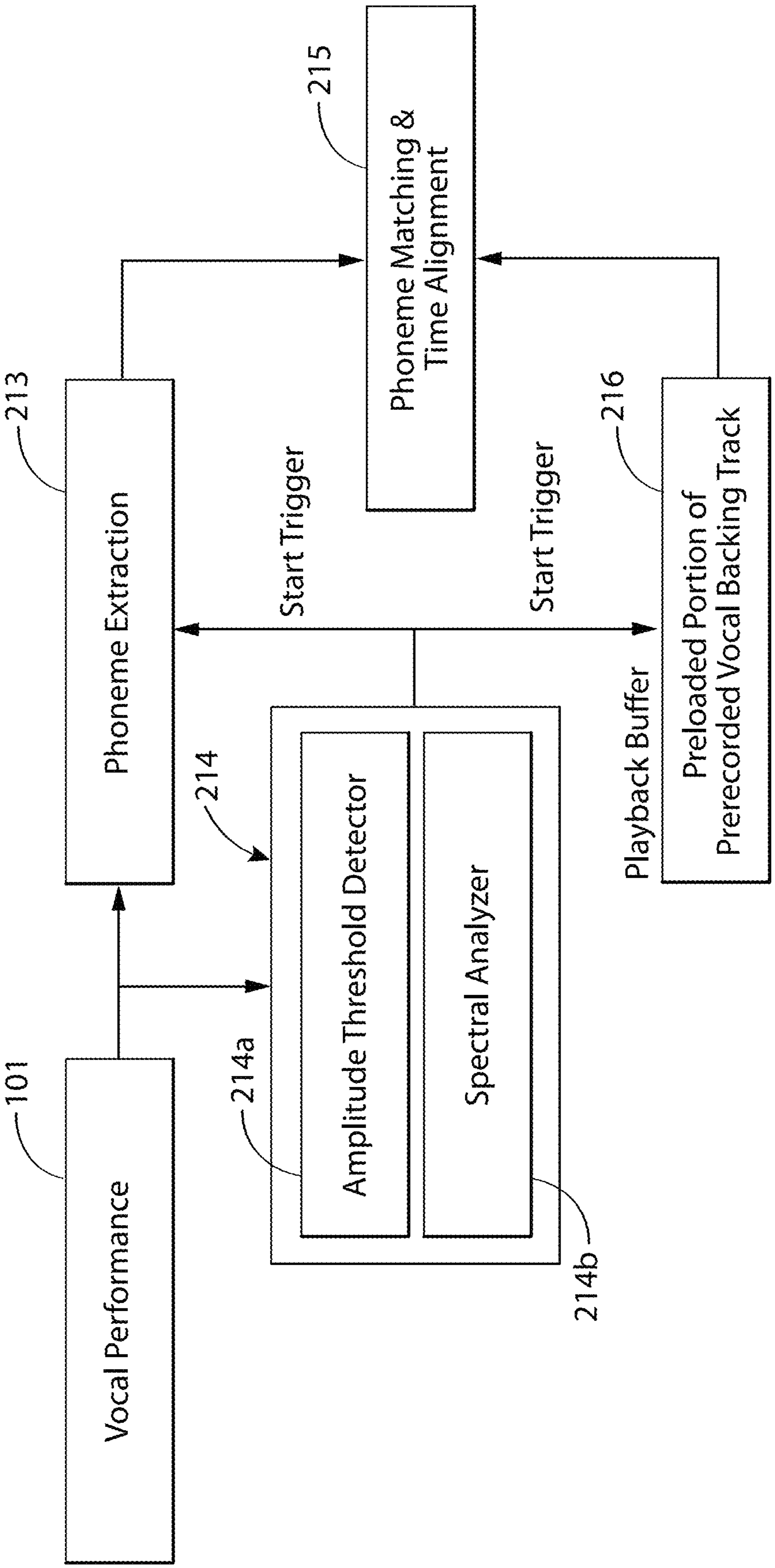
FIG. 31 illustrates a block diagram of a mechanism for accelerating the vocal element extraction process from the vocal performance, by detecting the start of the vocal stream that modifies the prerecorded vocal backing track.

The Inventor noted, that there are situations where it is known in advance, which songs, and portions of songs, in the prerecorded vocal backing track might be used, to enhance or replace a live vocal performance. The Inventor discovered that he might be able to leverage this knowledge to reduce latency during the vocal element and matching process. FIG. 31 illustrates a block diagram that leverages this advanced knowledge to accelerate vocal element extraction and matching process. The mechanism detects the start point of the live vocal performance for a given section. Since what is being sung during that section is already known, the start point detector can be used to trigger the start of the prerecorded vocal backing track. The processing burden of vocal element detection and matching is reduced because the prerecorded vocal backing track is approximately prealigned with the live vocal performance. This reduces latency, because it reduces the initial overhead of the vocal element identification and extraction process. In the example in FIG. 31, the vocal elements may include phonemes. In this case, phoneme identification and extraction can work from a smaller subset of phonemes. This subset of phonemes is much smaller than the entire syllabary of phonemes and therefore reduces processing burden.

Referring to FIG. 31, the vocal performance 101 is monitored by the start point detector 214. The start point detector 214 sends a start trigger signal for the phoneme extraction module 213 to begin phoneme identification and extraction. The start trigger signal is also sent to the playback buffer 216, where the corresponding portion of the prerecorded vocal backing track is stored. This playback buffer may be stored in flash memory or a solid-state drive, but is typically stored in working memory or system memory, such as ECC RAM. The phoneme matching and time alignment module 215 temporally aligns the playback buffer 216 to the phoneme extraction module 213. The initial alignment is much faster because the live vocal performance and prerecorded vocal backing track are already partially aligned from the start.

FIG. 31 illustrates two mechanisms for detecting the start point. These include amplitude detection and spectral detection. The start point detector 214 includes both an amplitude threshold detector **214*a* and a spectral analyzer 214*b*. The amplitude threshold detector 214*a* and a spectral analyzer 214*b***, may be used either alone or in combination.

Figure 32:
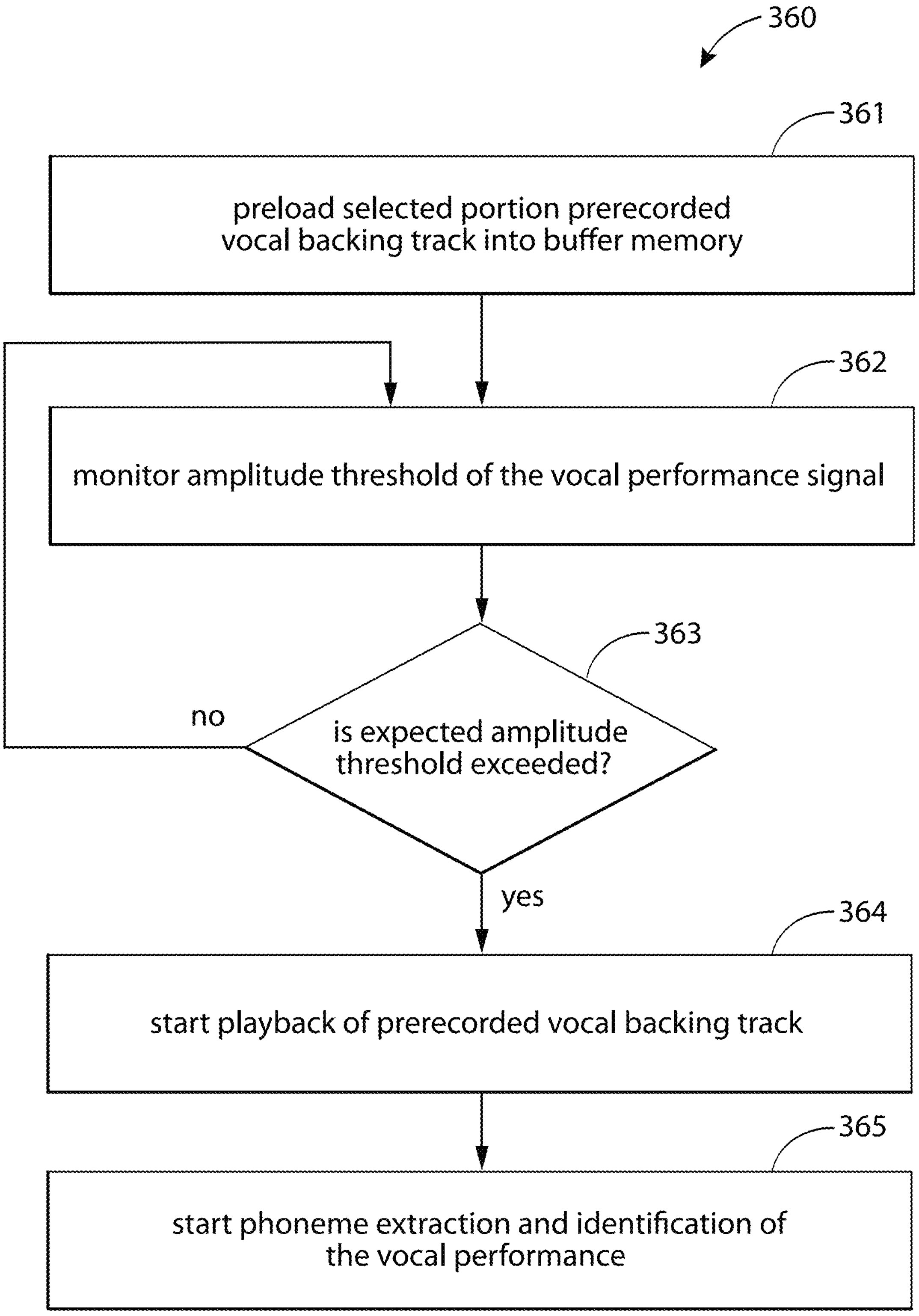
FIG. 32 illustrates a flow chart showing typical steps for detecting the start of the vocal stream, by using amplitude threshold analysis.
Figure 33:
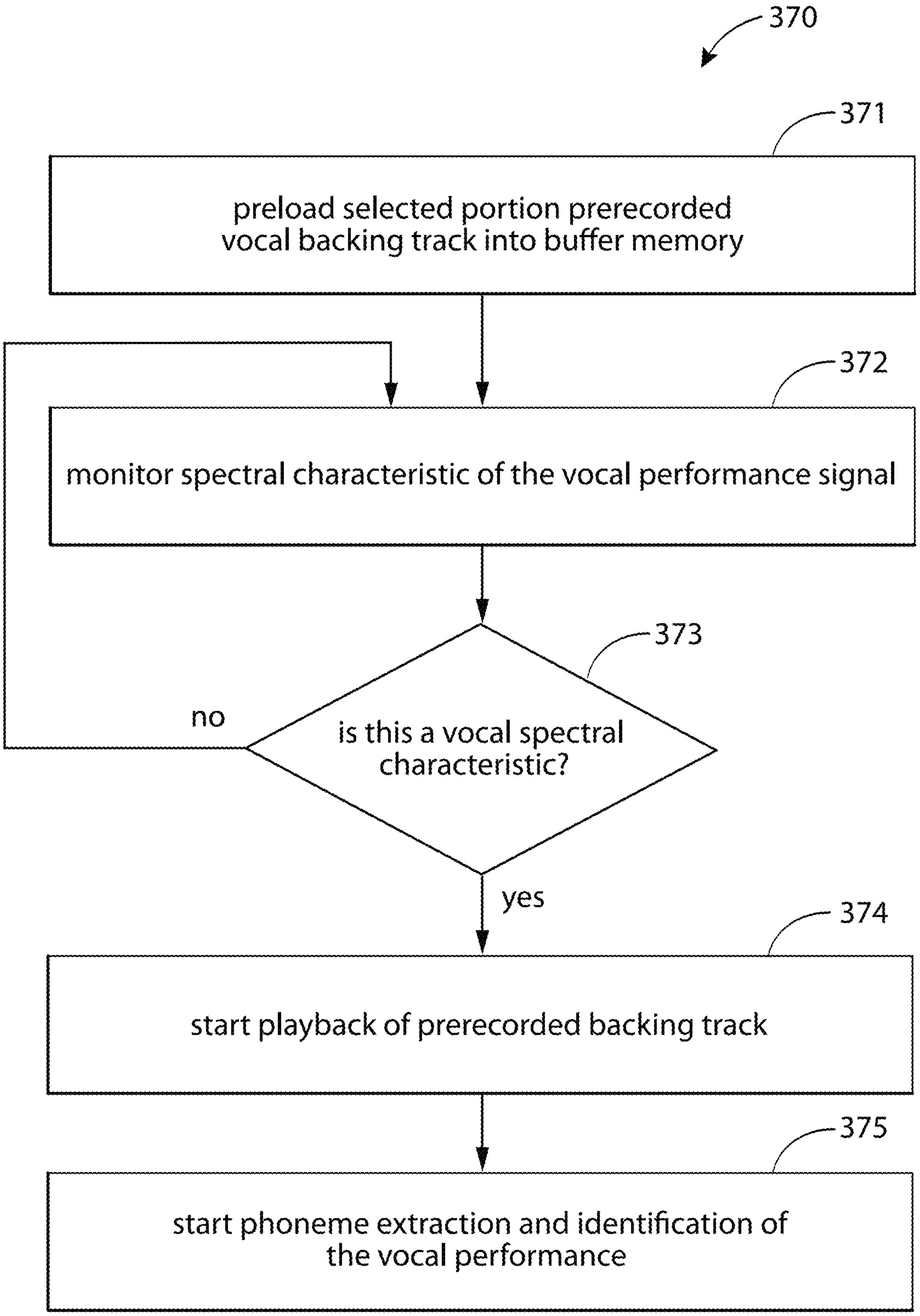
FIG. 33 illustrates a flow chart showing typical steps for detecting the start of the vocal stream, by analyzing the spectral characteristics of the vocal performance.

FIG. 32 illustrates a flow chart 360, which shows typical steps for detecting the start of the vocal stream, by using amplitude threshold analysis. FIG. 33 illustrates a flow chart 370, with typical steps for detecting the start of the vocal stream, by analyzing the spectral characteristics of the vocal performance. Referring to FIG. 32, in step 361, a selected portion of the prerecorded vocal backing track is preloaded into a playback buffer. As previously described, this playback buffer is typically system memory, or working memory, such as DRAM or ECC RAM. In step 362, the amplitude of the vocal performance is monitored until it surpasses a preset amplitude. The amplitude is chosen of what would be typical of the relative start note amplitude for the expected vocal performance. A typical amplitude threshold used to detect the onset of a vocal stream is approximately −30 dBFS, which is sufficiently above typical ambient noise floors (usually around −45 dBFS to −60 dBFS). This ensures reliable triggering upon actual vocal entry while minimizing false detections due to background noise or minor signal fluctuations. In step 363, if the amplitude threshold is not exceeded, the monitoring process is continued. If amplitude threshold is exceeded, then in step 364, the system starts playback of the prerecorded vocal backing track. In step 365, the system will simultaneously start the phoneme extraction and identification process.

One of the challenges with using a threshold detector is possible sensitivity to background noise or noise spikes. This can be reduced by using frequency limiting filters (for example a lowpass filter), but this does not eliminate the problem. FIG. 33 uses spectral analysis to detect the start of the vocal performance. While the example is given for phonemes, it could also apply to vector embeddings. Referring to FIG. 33, in step 371, a selected portion of the prerecorded vocal backing track is preloaded into a playback buffer, as was described for FIG. 32. In step 372, the spectral content of the vocal performance signal is monitored until it matches the range of spectral content expected from a human voice. Typical spectral criteria for detecting vocal onset include identifying stable harmonic spectral peaks within the fundamental vocal frequency range of approximately 80-1,000 Hz, with harmonic overtones exhibiting at least a 10-15 dB peak-to-floor energy contrast. Additionally, spectral stability of this harmonic structure over at least 30-50 milliseconds ensures reliable vocal onset detection, minimizing false positives from transient noise. In step 373, if the spectral content is not within the spectral range of a human voice, the monitoring process continues. If the spectral content is within the spectral range of a human voice, then in step 374, the system starts playback of the prerecorded vocal backing track. In step 375, the system will simultaneously start the phoneme extraction and identification process. The spectral content can be derived using an FFT, which has relatively low-latency. However, an FFT is not as fast as amplitude threshold detection. A hybrid approach may overcome the disadvantages of both.

Figure 34:
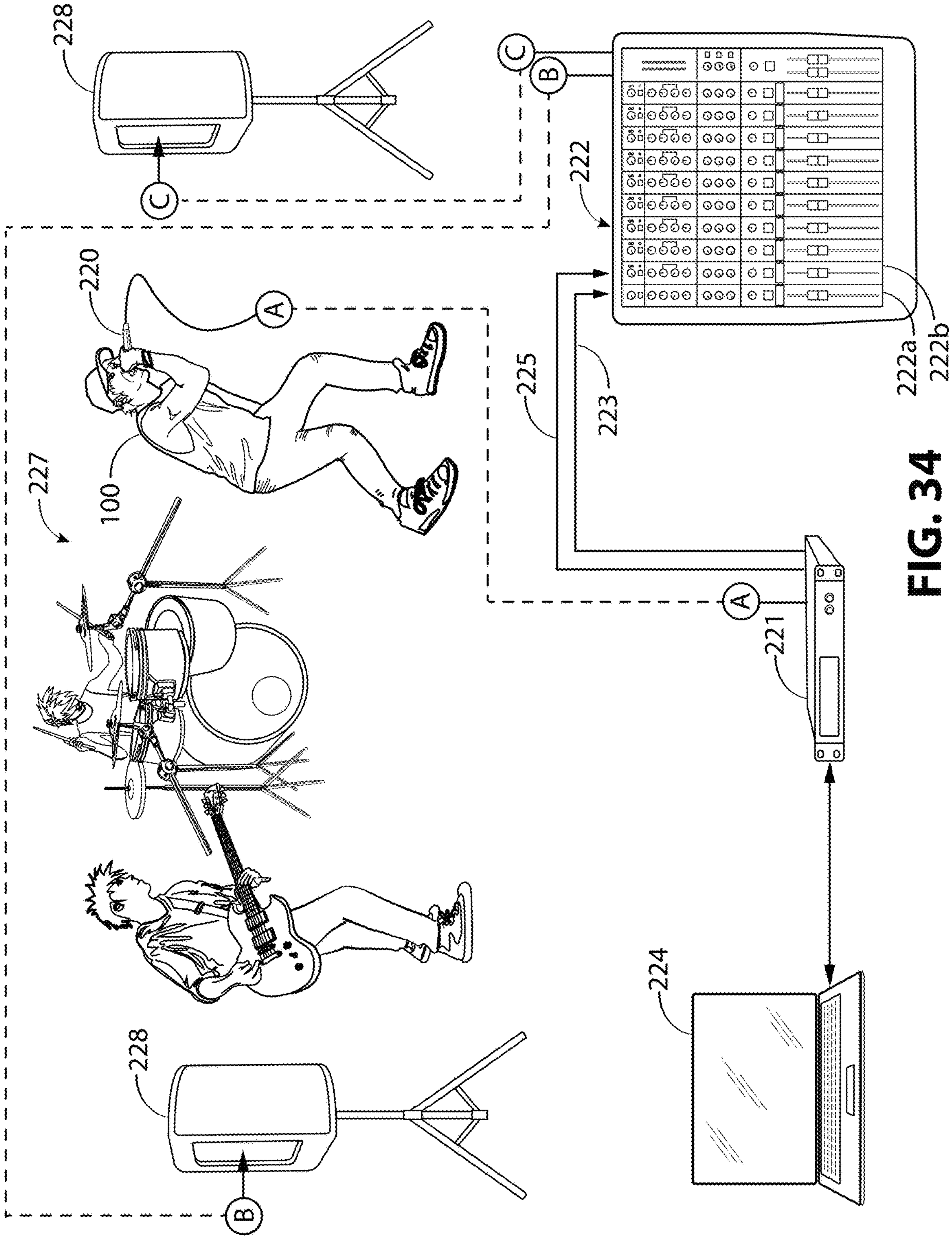
FIG. 34 illustrates an alternative live use case.

Using the start point detector as described for FIGS. 31-33, may reduce processor overhead sufficiently to allow the vocal element extraction and synchronization system 110 to be used in less critical realtime applications where cost is an important consideration. Examples of less critical realtime applications might include prosumer use, parties, or small live venues. It may also be used in non-realtime applications to reduce processor overhead. FIG. 34 illustrates a typical small venue live use case. In FIG. 34, the vocalist 100 sings into a microphone 220. The vocalist's live performance may be transmitted to a microphone preamplifier converter 221, which includes one or more microphone preamplifiers and analog-to-digital converters. The live vocal signal is also sent from the microphone preamplifier converter 221 to a live sound mixer 222. In FIG. 34, the live sound mixer 222 is illustrated as an analog mixer. In this example, the microphone preamplifier may send an amplified live vocal signal 223 to a line-level input within channel **222*a* of the live sound mixer 222. The microphone preamplifier converter 221 sends a digitalized version of the live vocal signal to an external computer 224. This may be sent by computer protocol such as Ethernet, or USB3. The external computer 224 preforms the start point detection, phoneme extraction of the live vocal performance, and time alignment of the prerecorded vocal backing track to the live vocal performance. The resulting time-synchronized backing track is sent to the microphone preamplifier converter 221 where it is converted to an analog signal via a digital-to-analog converter. The time-synchronized backing track signal 225 is sent to a line-level input within mixer channel 222***b* of the live sound mixer 222. Signals from the other band members, also feed the live sound mixer 222. The sound engineer could feed the performance of the band members 227 to the mixer output, which feeds the PA speakers 228. This may include the live vocal performance signal, the time-synchronized back track signal, or a mixture of the two. In this example, it is assumed that either the live sound mixer 222 or the PA speakers 228 have built-in amplifiers. Letters "B" and "C," within circles, represent the signal connection between the live sound mixer 222 and PA speakers 228. Letter "A" within a circle represents the signal connection between the microphone 220 and the microphone preamplifier converter 221. The vocal element extraction-synchronization software 229 is stored on a tangible medium, such as DRAM, solid-state drive, or hard drive. The tangible medium includes instructions that direct at least one processor within the external computer 224 to identify, extract, and match the vocal elements from the live vocal performance to the prerecorded vocal backing track. The instructions also direct the processor or processors, to time-synchronize the prerecorded vocal backing track to the live vocal performance in realtime. The computer may include one or more processors, or one or more multi-core processors capable of performing this task. For example, the Apple M4 Pro, M4 Max, or M4 Ultra may be capable of performing this function, especially if coupled with the start detection routine discussed in FIGS. 31-33.

Figure 35:
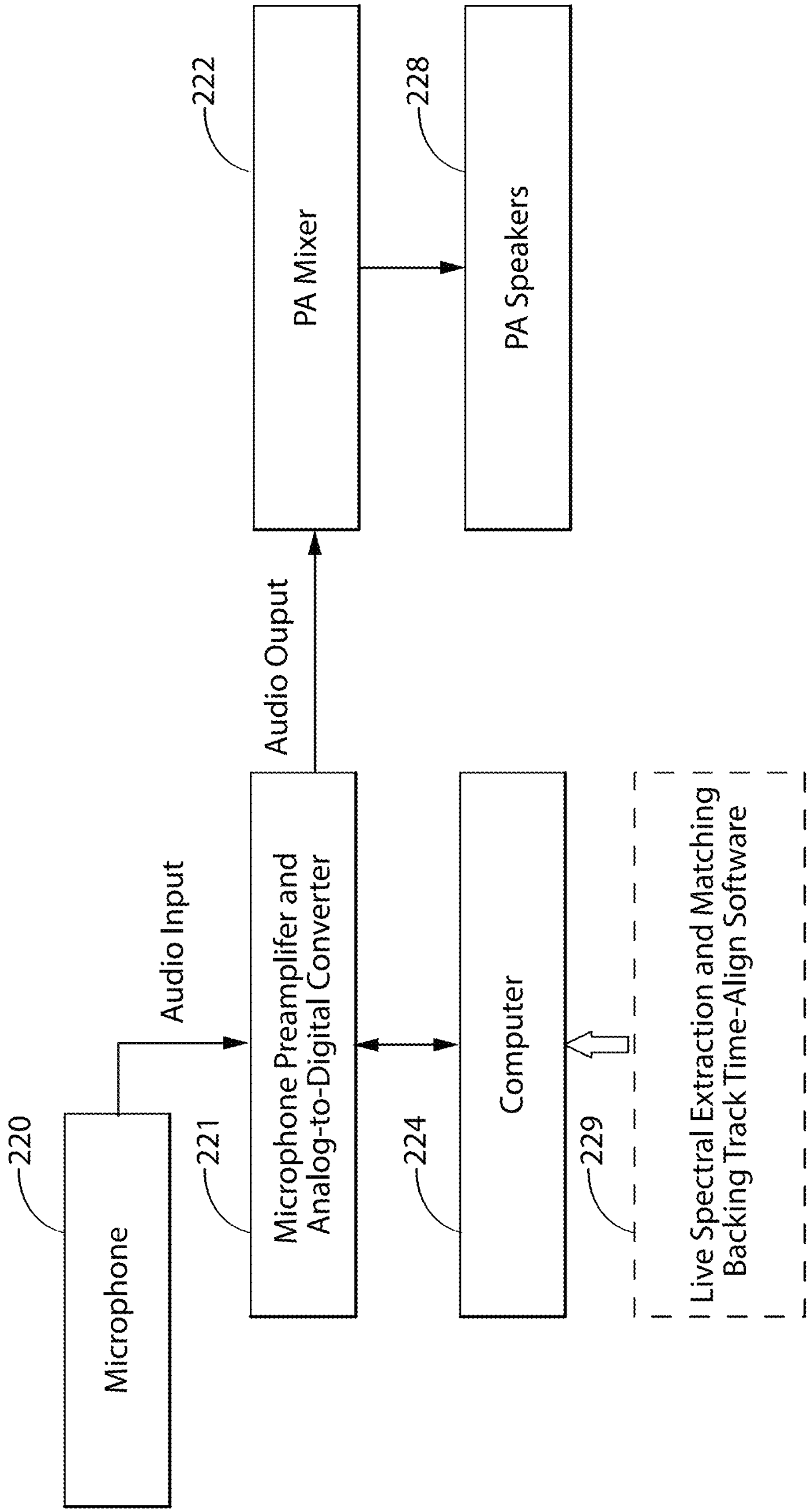
FIG. 35 illustrates a block diagram of the alternative live use case of FIG. 34.
Figure 36:
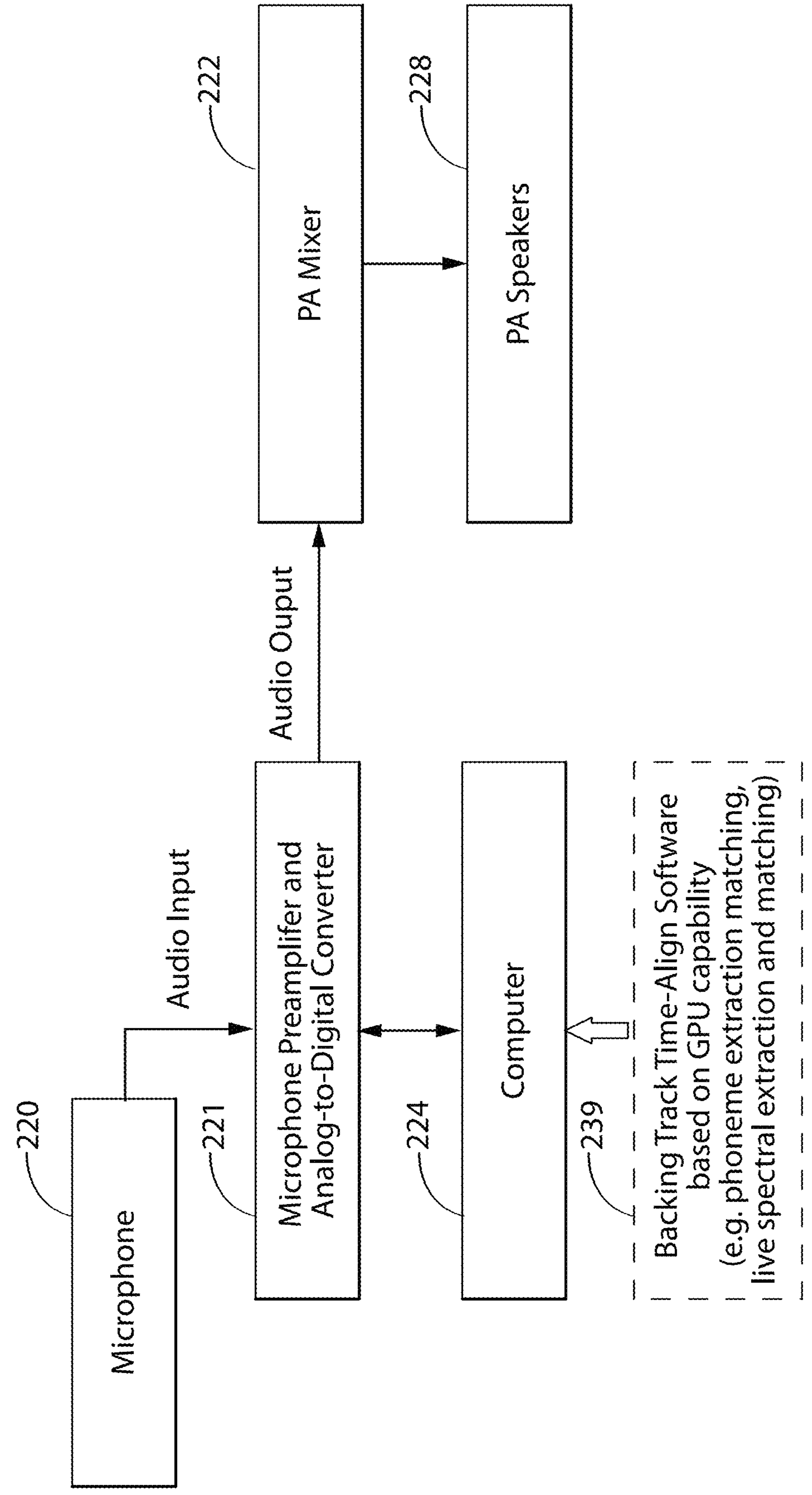
FIG. 36 illustrates a simplified block diagram of the alternative live use case of FIG. 34, where the software runs the vocal element extraction and matching process, based on the computer's hardware capability.

Vector Embedding extraction and synchronization, as well as phoneme extraction and synchronization, in realtime, typically require a computer with GPUs suitable for machine-learning calculations. There may be notebook and desktop computers available that have the required GPU capability. Spectral Analysis, such as FFT appear to be less accurate than phoneme or vector embeddings extraction. However, they are less GPU intensive. FIGS. 35 and 36 illustrate a block diagram that approximates the live use case of FIG. 34, with the microphone 220, microphone preamplifier converter 221, live sound mixer 222, external computer 224, and PA speakers 228, as previously described. In FIG. 35, the external computer 224 includes vocal element extraction-synchronization software 229 that may function as described for FIG. 34 and may include start point detection. In FIG. 36, the external computer 224 includes vocal element extraction-synchronization software 239 that may also detect system capabilities, such as GPU, CPU, or memory. Based on the computer's capabilities, the software will select the appropriate vocal element identification, matching, and synchronization routine. For example, if the system had sufficient GPU, CPU, and memory, the system would load software routines that use phonemes or vector embeddings. If the system had sufficient CPU and memory but not GPU capability, it might automatically load and run software routines that use vocal audio spectra.

The vocal element extraction and synchronization system can also be used for intentionally delayed, or "deferred live," broadcasting of television or live streaming of video with audio that includes a vocalist. Live broadcast television often uses deferred live broadcast to censor out profanity. This is known in the broadcast industry as the "seven second delay" but is not limited to seven seconds. For example, it may be as little as five seconds or could be thirty seconds or longer. Live broadcast engineers could, during the delay period, use the vocal element extraction and synchronization system to fix errors in the vocal performance, by replacing portions of the live vocal performance with a prerecorded vocal backing track. The vocal element extraction and synchronization system may be connected in the delayed live vocal broadcast stream. If there is an error during the live vocal performance, the live broadcast engineer, or playback engineer, could quickly cue up the offending portion of the vocal performance, and begin the vocal element identification, extraction, matching and synchronization process. The process of identification, extraction, matching, and synchronization would be the same as previously described, except the delayed live vocal stream modifies the prerecorded vocal backing track.

Figure 37:
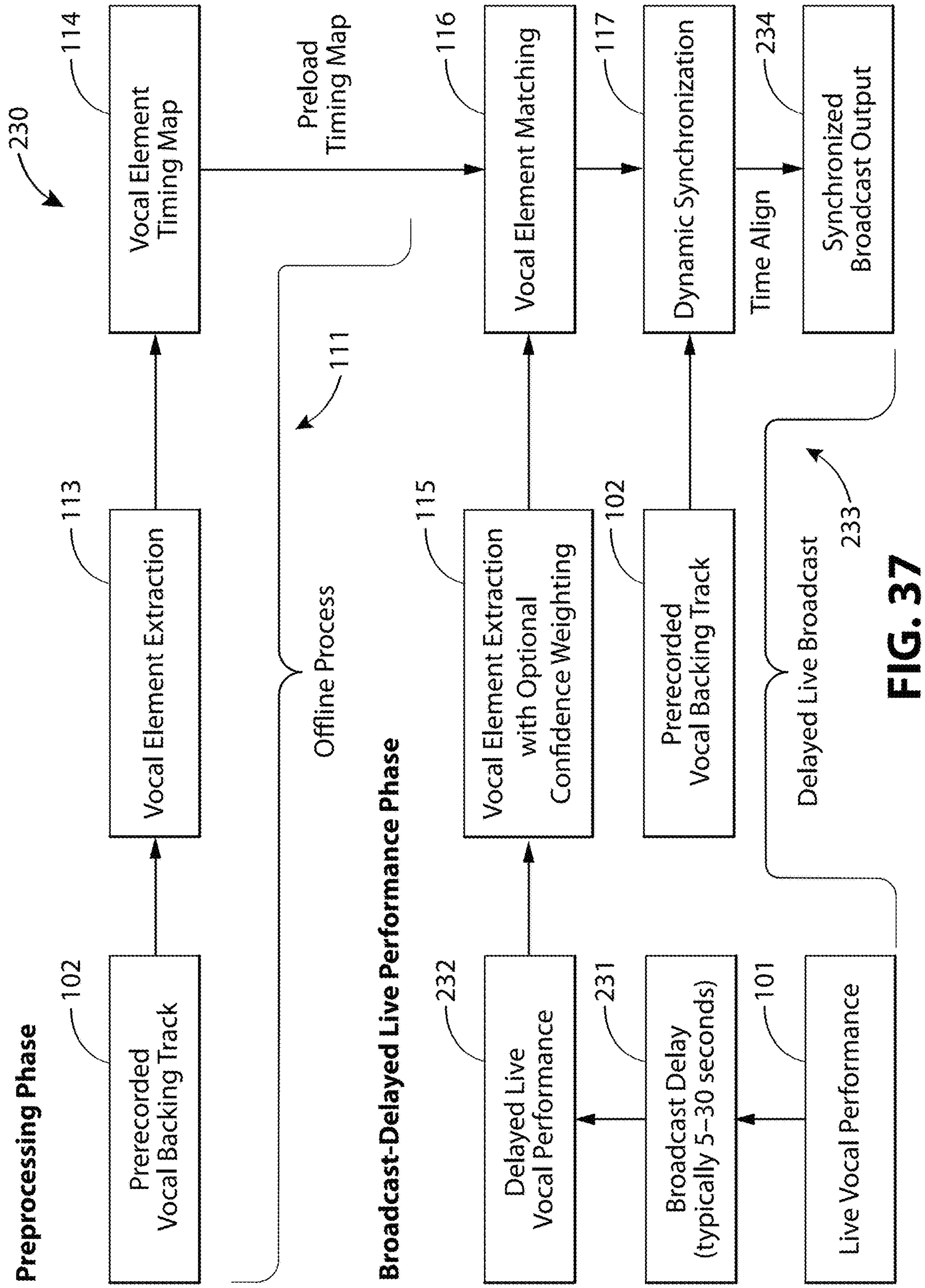
FIG. 37 illustrates a conceptual overview of the preprocessing phase and broadcast-delayed live performance phase of the vocal element extraction and synchronization system.

FIG. 37 illustrates a conceptual overview of the preprocessing phase 111, and broadcast-delayed live performance phase 233, of the vocal element extraction and synchronization system 230. Referring to FIG. 37, the vocal performance 101 is run through a broadcast delay 231. This broadcast delay 231, as stated above, is typically five to thirty seconds. This results in a delayed live performance signal 232. The delayed live performance signal is processed by vocal element extraction 115. The preprocessing phase 111, including the prerecorded vocal backing track 102, vocal element extraction 113, and time stamping backing track vocal elements, remains the same as previously described for FIG. 3. Vocal element matching 116 and the dynamic synchronization 117 in FIG. 37 function as previously described for FIG. 3, and results in a synchronized broadcast output 234.

Figure 38:
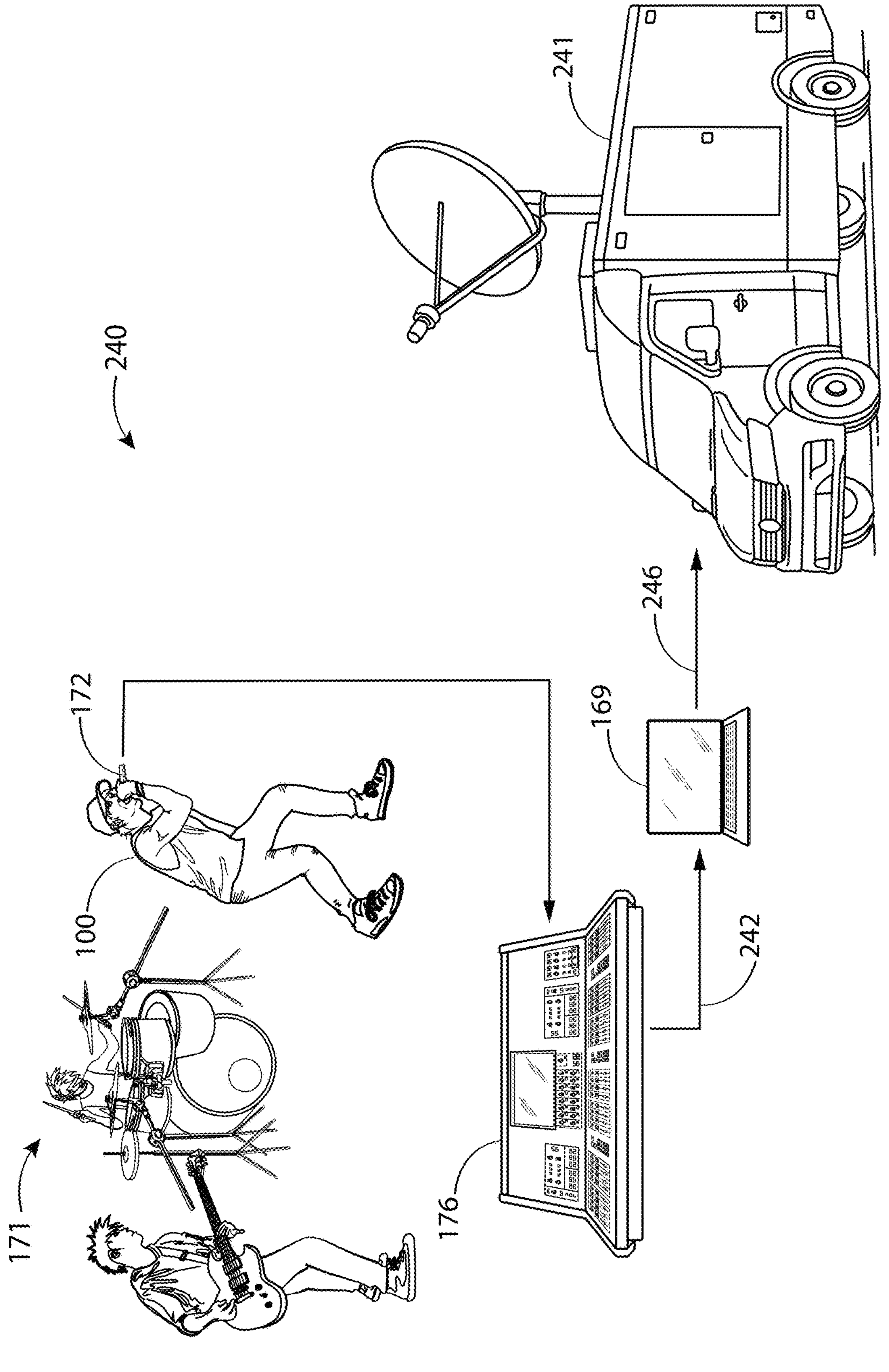
FIG. 38 illustrates an alternative use case where the live vocal performance may be transmitted for broadcast, for example, to a live broadcast truck at the venue or a local partner facility.

In some live performance scenarios, a live performance may be transmitted for broadcast, for example to a broadcast truck at the venue or to a local partner facility. Before a live broadcast, the prerecorded vocal backing track and the timestamped vocal elements extracted from the prerecorded vocal backing track may be stored on an edge infrastructure. Examples of edge infrastructure include content delivery network (CDN) nodes, a broadcast truck at the venue, or local systems at partner facilities. For example, FIG. 38 illustrates a band 171 playing at a live performance venue 240 with a broadcast truck 241 located at the live performance venue 240. In FIG. 38, the vocalist 100 sings into a microphone 172. The signal from the microphone 172 may be transmitted to a front-of-house mixer 176. Vocal elements may be extracted from a live vocal stream 242 using a dedicated device, as previously described, or by a computer with sufficient processing power to perform the task in realtime. For example, FIG. 38 illustrates the live vocal stream 242 being transmitted from the front-of-house mixer 176 to an external computer 169. The timing map feed 246 is transmitted from the computer or an intermediary network transmission device to the broadcast truck 241.

Figure 39:
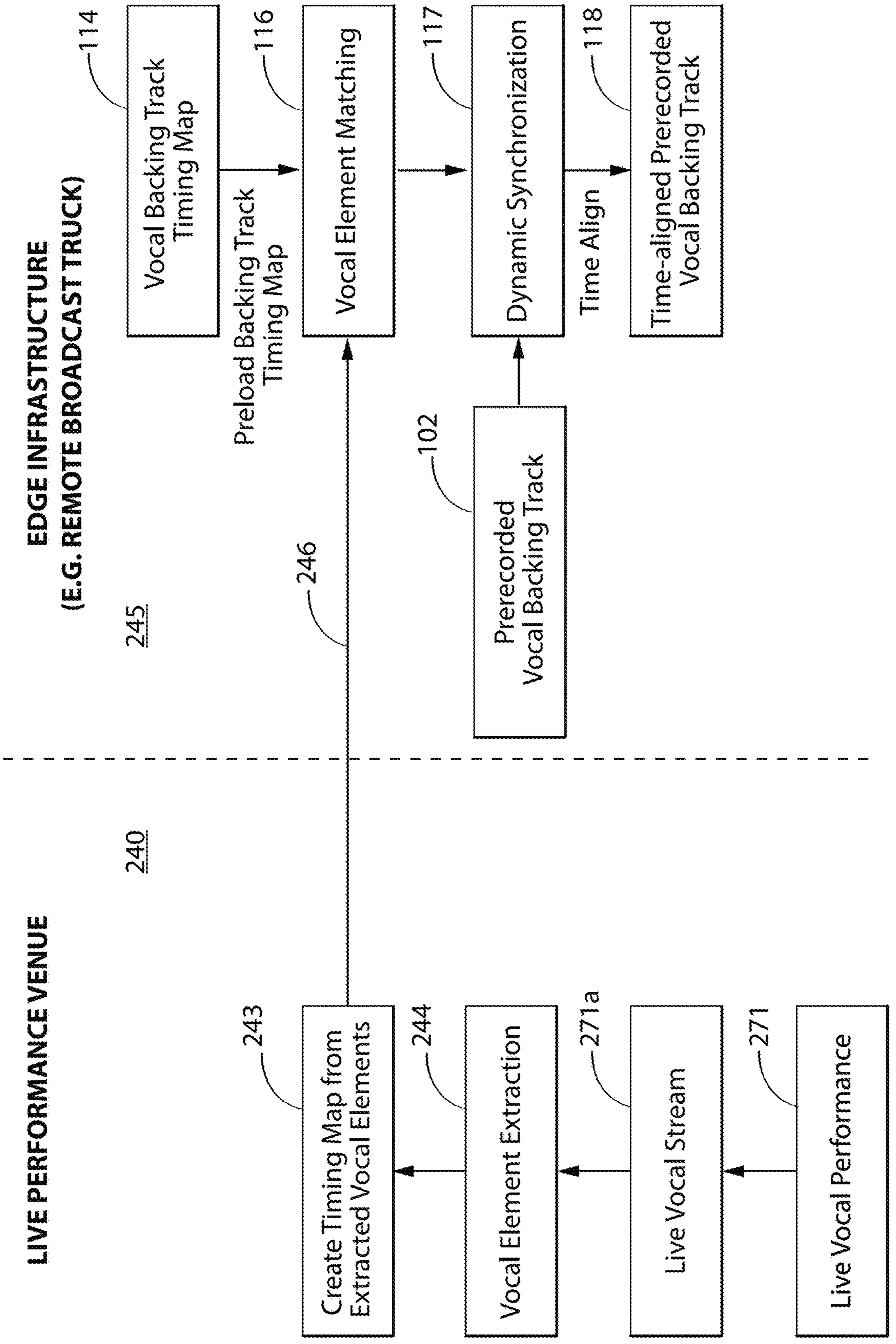
FIG. 39 illustrates a block diagram of FIG. 38.

Referring to FIG. 39, during the live vocal performance 271, extracted vocal elements 244 from the live vocal stream 271*a*, are used to generate a live vocal stream timing map 243. Examples of timing maps containing vocal elements and their time location is described in FIGS. 4-6. Continuing to refer to FIG. 39, the timing map feed 246 that includes the information contained within the live vocal stream timing map 243, may be sent in realtime to the edge infrastructure 245. For example, in FIG. 38, the timing map feed 246 may be transmitted from the external computer 169 to the broadcast truck 241. Referring back to FIG. 39, the timing map feed 246 includes time-stretch and compression instructions, which are applied to the prerecorded vocal backing track 102. For example, the information from the live vocal stream timing map 243 contained within the timing map feed 246 may be processed by vocal element matching 116. Vocal element matching 116 matches vocal elements from the live vocal stream timing map 243 to vocal elements contained within the backing track timing map 114. The backing track timing map 114 is generated from the prerecorded vocal backing track 102. Based on the time prediction from vocal element matching 116, dynamic synchronization 117 may dynamically time-stretch or compress the prerecorded vocal backing track 102 to match the timing of the live vocal stream 271*a*. This results in a dynamically controlled prerecorded vocal backing track 118 that is time-synchronized to the live vocal stream 271*a*, and therefore, the live vocal performance 271. This process of identifying the vocal elements from the live vocal stream 271*a*, matching the vocal elements to the timestamped vocal elements within the backing track timing map 114, adjusting the timing of the prerecorded vocal backing track 102, and the resulting dynamically controlled prerecorded vocal backing track, occurs in realtime.

The live vocal stream timing map 243 may be compact, allowing it to be transmitted in realtime over the network. This may eliminate the need, in some circumstances, to transmit large audio files during the event, and minimizes latency. The prerecorded vocal backing track may be prepositioned manually or as described for FIGS. 31-33, to further reduce latency. Note that in FIG. 39, the edge infrastructure 245 is delineated from the live performance venue 240 and may be remotely located from the live performance venue as discussed above. As shown in FIG. 38, the broadcast truck 241, which may represent the edge infrastructure 245 of FIG. 39, may alternatively be located at the live performance venue.

Figure 40:
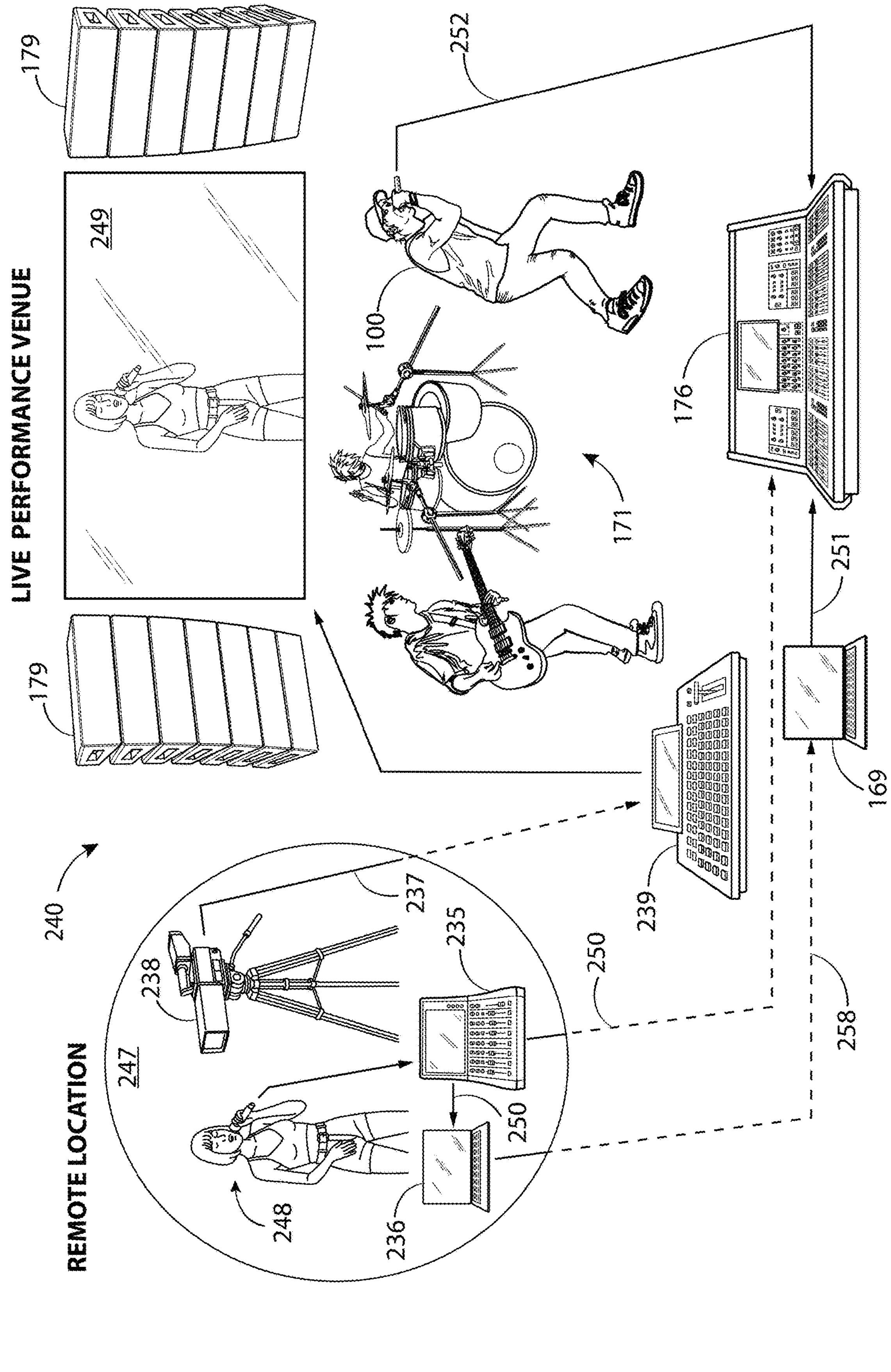
FIG. 40 illustrates an alternative use case where a vocalist performs live from a remote location away from the live performance venue.
Figure 41:
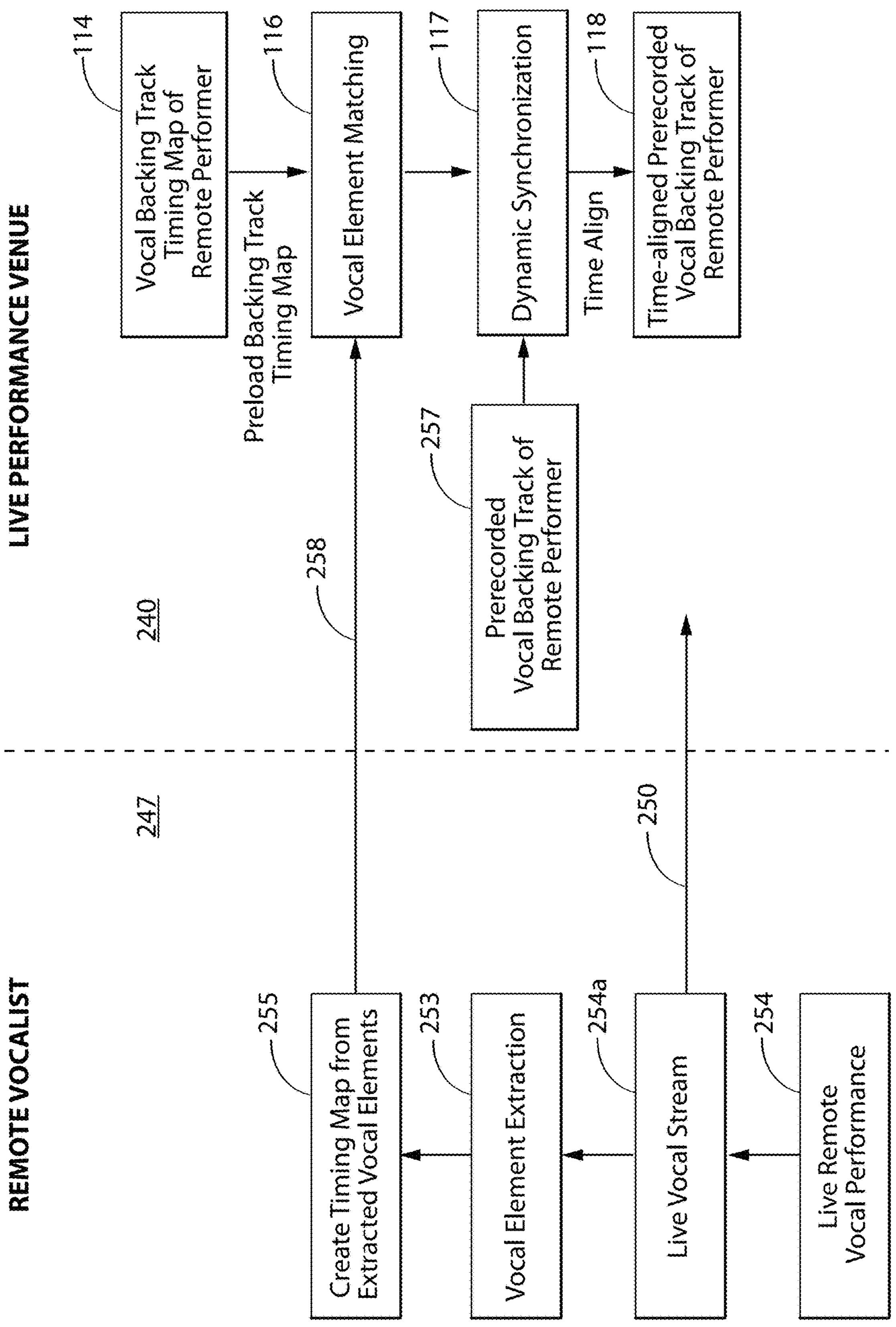
FIG. 41 illustrates a block diagram of FIG. 40, where the temporal alignment map is produced at the remote location.

Referring to FIG. 40, in another example, a vocalist may perform live from remote location 247 away from the live performance venue 240. For example, a guest vocalist 248 might be broadcast over an audio and video feed, and show on a screen 249 at the live performance venue 240 to surprise the audience. The live vocal feed 250 of the guest vocalist 248 may be transmitted in real time over a professional audio-over-IP protocol (for example, AES67, ST-2110, or Dante). In FIG. 40, the live vocal feed 250 may be fed to the front-of-house mixer 176 at the live performance venue 240, via a digital broadcast mixer 235 located at the remote location 247. The live vocal feed 250 could alternatively originate from a digital audio conversion device, or a broadcast network device. The live vocal feed 250 is represented by a dashed line to designate that it is coming from the remote location 247. In the example of FIG. 40, the digital broadcast mixer 235 may also send the live vocal feed 250 to an external computer 236, also located at the remote location 247. The external computer 236, or optionally a standalone device, extracts vocal elements from the live vocal stream of the guest vocalist 248 and creates the live vocal stream timing map 255 (FIG. 41). The live vocal stream timing map 255 may be transmitted via the timing map feed 258 to the live performance venue 240. An external computer 169 at the live performance venue 240 may receive the timing map feed 258. Software and hardware within the external computer 169 use the information from the live vocal stream timing map 255 to create a time-aligned vocal backing track 251 to the live vocal stream of the guest vocalist 248. The time-aligned vocal backing track 251 is fed to the front-of-house mixer 176 and played back to the audience via the speakers 179. The video feed 237 from a video camera 238, any video capture device, capturing the performance of the guest vocalist 248 is transmitted to the live performance venue 240. The video feed is typically fed through a video switcher 259 located at the live performance venue 240. The video of the guest vocalist 248 may be projected on a screen 249 as previously discussed. The time-aligned vocal backing track 251 is aligned to the lip movement and body nuance of the guest vocalist's video performance because the live vocal stream timing map 255 aligns the prerecorded vocal backing track to the guest vocalist's actual singing.

Because the remote location 247 transmits both the live vocal feed 250 and the timing map feed 258 to the live performance venue 240, the playback engineer, or the front-of-house engineer, could then choose between playing the time-aligned vocal backing track 251 or the live vocal feed 250 to the audience, as required.

In addition, the vocalist 100 of the band 171 playing at the live performance venue 240 may also sing to his own prerecorded vocal backing track, if needed. The vocal feed 252 of the vocalist 100 may also be used as a control signal to time-align his prerecorded vocal backing track.

Figure 42:
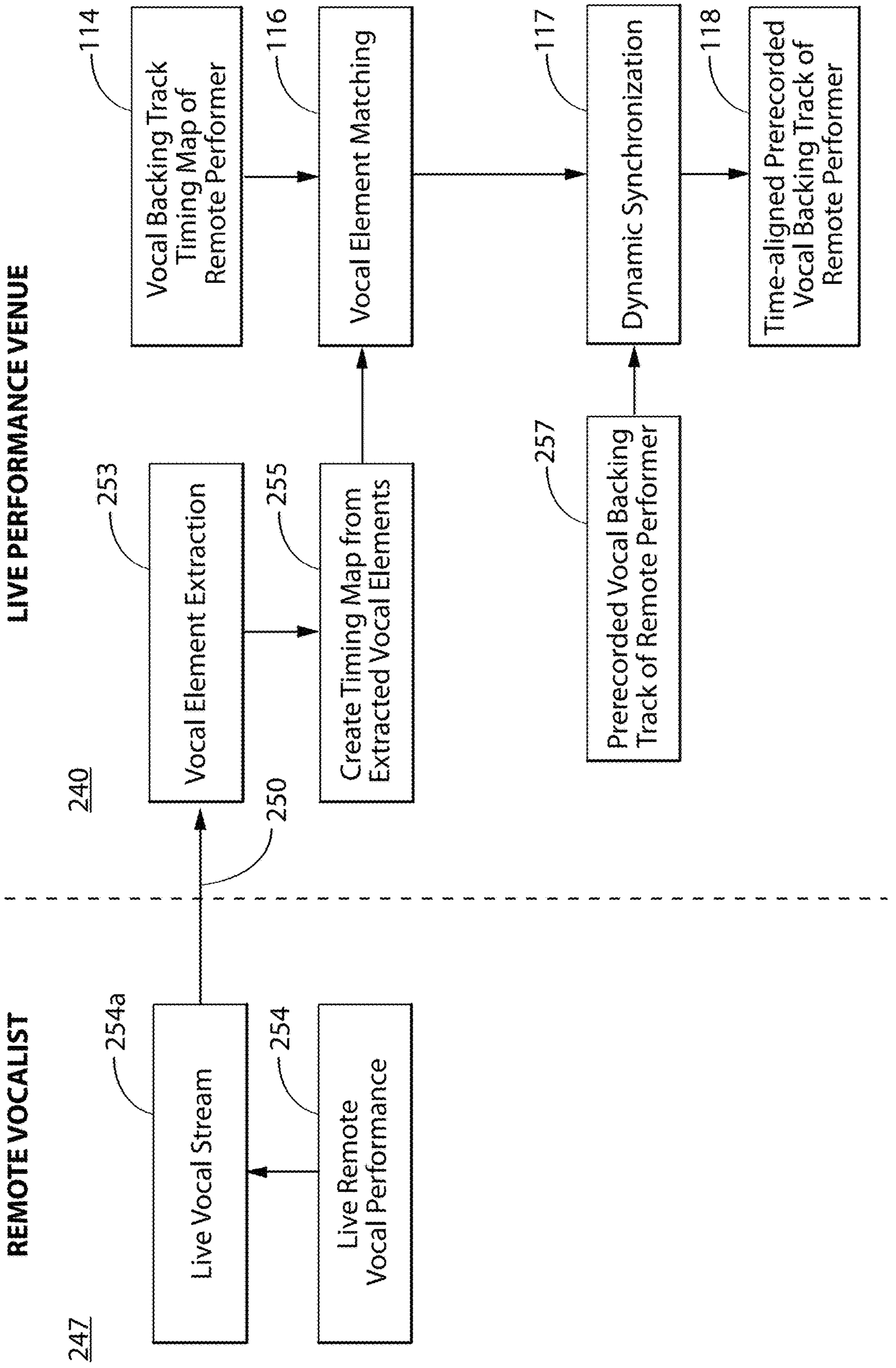
FIG. 42 illustrates a block diagram of FIG. 40, where the temporal alignment map is produced at the live venue.

Referring to FIGS. 41 and 42, a vocal element extraction algorithm 253, extracts vocal elements from the live remote vocal stream 254*a*, to create a live vocal stream timing map 255 from the extracted vocal elements. The live remote vocal stream 254*a* digitally represents the live remote performance 254. The live vocal stream timing map 255 may be processed by vocal element matching 116. Vocal element matching 116 matches the live vocal stream timing map 255 to the backing track timing map 114 produced from the prerecorded vocal backing track 257 of the remote performer. Based on the time prediction from vocal element matching 116, dynamic synchronization 117 may dynamically time-stretch or compress the prerecorded vocal backing track 257 of the remote performer to match the timing of the live remote performance 254. This results in a dynamically controlled prerecorded vocal backing track 118 that is synchronized to the live audio and video performance of the guest vocalist 248 of FIG. 40. The resulting dynamically controlled rerecorded vocal backing track may be output to the audience. Continuing to refer to FIGS. 41 and 42, the prerecorded vocal backing track 257 of the guest vocalist 248 may be produced, as previously described for FIG. 3.

As described for FIG. 40, referring to FIG. 41, the vocal element extraction algorithm 253 and the live vocal stream timing map 255 may be carried out in realtime at the remote location 247. A timing map feed 258 that includes the information contained within the live vocal stream timing map 255 may be received by the live performance venue 240. The vocal element matching 116, dynamic synchronization 117, and the dynamic controlling of the dynamically controlled prerecorded vocal backing track 118 may be carried out at the live performance venue 240, in realtime. Using the live vocal stream timing map 255 from the remote location 247 and transmitting it to the live performance venue 240 is advantageous. It is compact compared to the live remote vocal stream and therefore creates less bandwidth demands on the remote network and produces less transmission delay. Note that as discussed for FIG. 40, the live vocal feed 250 may optionally also be transmitted to the live performance venue 240 along with the live vocal stream timing map 255. This allows the playback engineer or the front-of-house engineer to choose between the time-aligned vocal backing track 251 and the live vocal feed 250.

There are circumstances where it is desirable to create the live vocal stream timing map 255 at the live performance venue 240. For, example, the software or suitable hardware may not be available at the remote location 247 to produce the live vocal stream timing map 255. FIG. 42, illustrates the vocal element extraction algorithm 253 and live vocal stream timing map 255 creation being located at the live performance venue 240. In FIG. 42, the live vocal feed 250 is transmitted from the remote location 247 to the live performance venue 240. Vocal elements are extracted from the live vocal feed 250 by the vocal element extraction algorithm 253. A live vocal stream timing map 255 is created from the extracted vocal element. In FIG. 42, this takes place at the live performance venue 240 in realtime.

Figure 43:
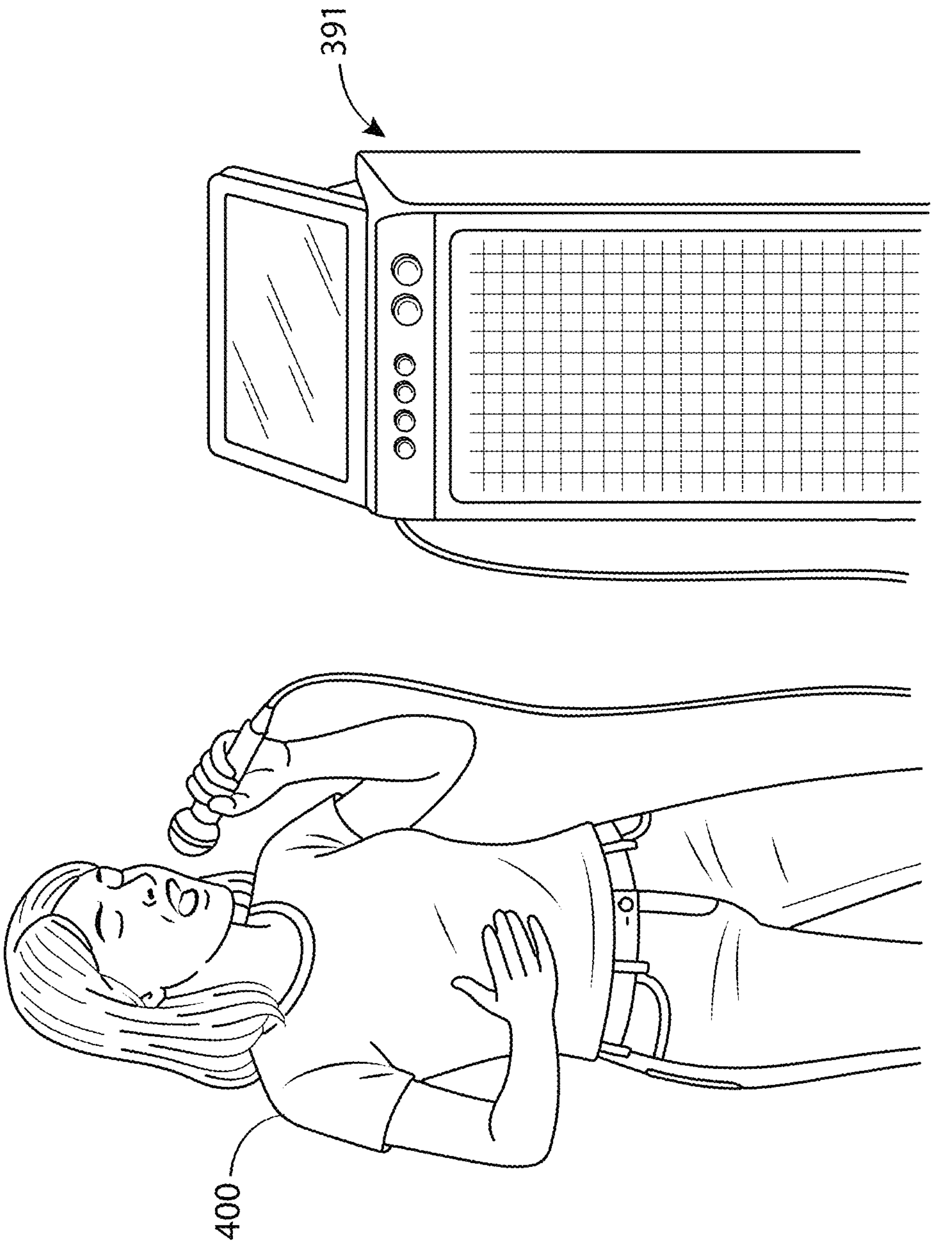
FIG. 43 illustrates an example of a second vocalist's vocal performance being used as the control vocal, to drive timing adjustments to a vocal backing track of a first vocalist's performance, in the form of an interactive karaoke machine.

Referring to FIG. 43, a second vocalist 400, such as a fan, may sing vocals of a first vocalist's songs on an interactive music platform 391. The interactive music platform 391 may be, for example and as illustrated, a Karaoke machine. It may alternatively be software running on a mobile device or computer. The interactive music platform 391 may include provisions, such as hardware and software, to allow the vocal performance of the second vocalist 400 to control the timing of the prerecorded vocal backing track of the first vocalist, in realtime. Likewise, the interactive music platform 391 may include provisions, such as hardware and software, to allow the performance of the second vocalist 400 to control prosody factors of the prerecorded vocal backing track of the first vocalist, in realtime.

Figure 44:
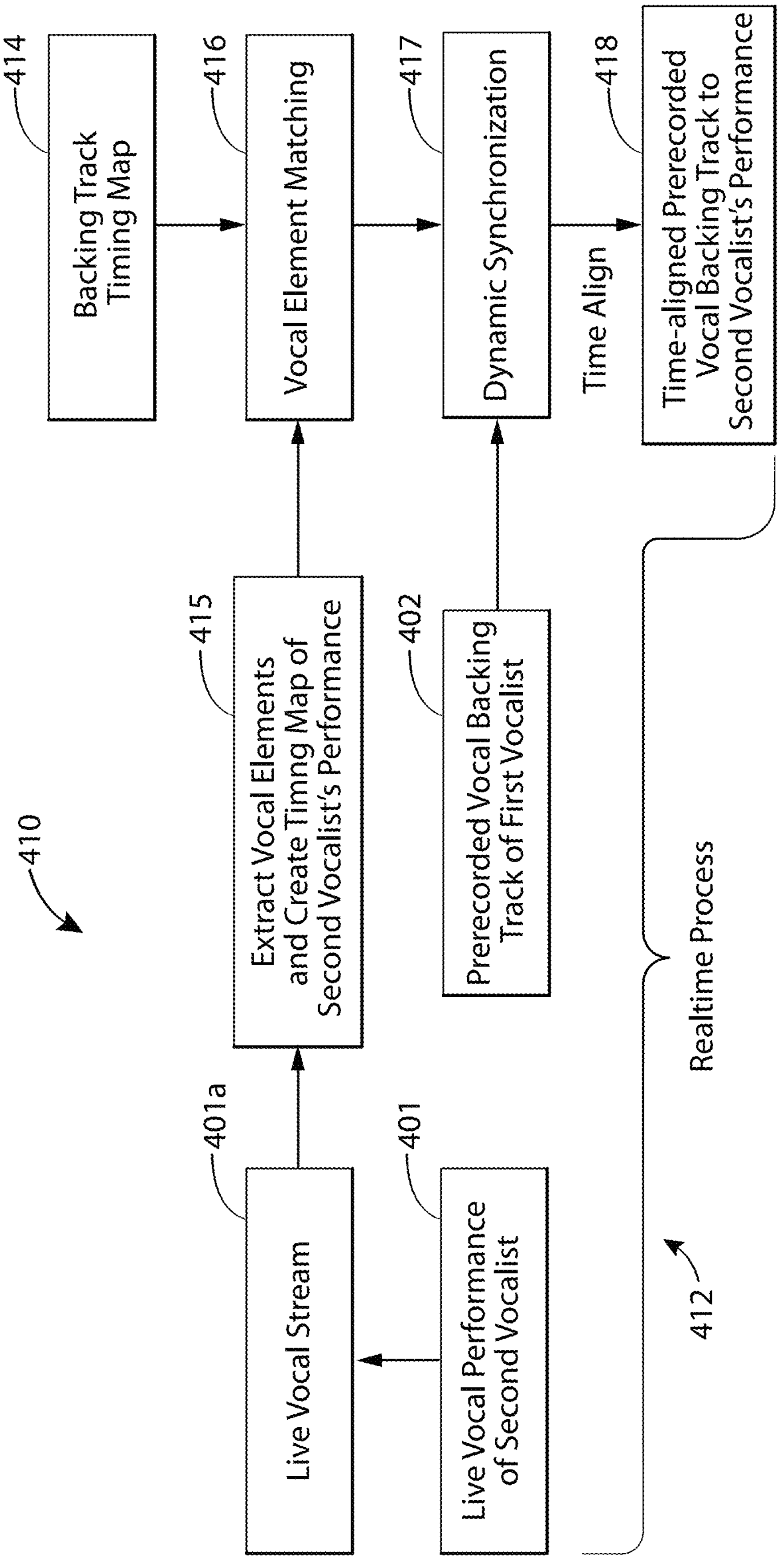
FIG. 44 illustrates a block diagram of FIG. 43.

FIG. 44 illustrates a block diagram 410 of an example of how the live performance of the second vocalist might control the prerecorded vocal backing track 402 of a first vocalist. As an example, a fan may perform the vocals of a professional artist's song. The second vocalist's, or fan's, vocal performance is used as the control vocal to drive timing adjustments to the first vocalist's prerecorded vocal backing track. This reverses the conventional direction of alignment. In a conventional scenario, such as performing conventional Karaoke, the second vocalist's performance follow the artist's prerecorded vocal backing track. The prerecorded vocal backing track is removed from the output played back to the audience. In contrast, using the methods, system, and devices of this disclosure, the second vocalist's live vocal performance is as a control input to modify the timing of the prerecorded vocal backing track of the first vocalist.

Continuing to refer to FIG. 44, a vocal element extraction/timing map creation algorithm 415 extract vocal elements from the live vocal stream 401*a* of the second vocalist. The resulting live vocal performance timing map is used to control the playback of the prerecorded vocal backing track 402. Vocal element matching 416 matches the vocal elements from the live vocal performance timing map to the backing track timing map 414. Dynamic synchronization 417 adjusts the timing of the prerecorded vocal backing track 402 in realtime to the timing of the matched vocal elements. This results in a time-aligned prerecorded vocal backing track 418 that is synchronized to live vocal stream 401*a* of the live vocal performance 401.

Figure 45:
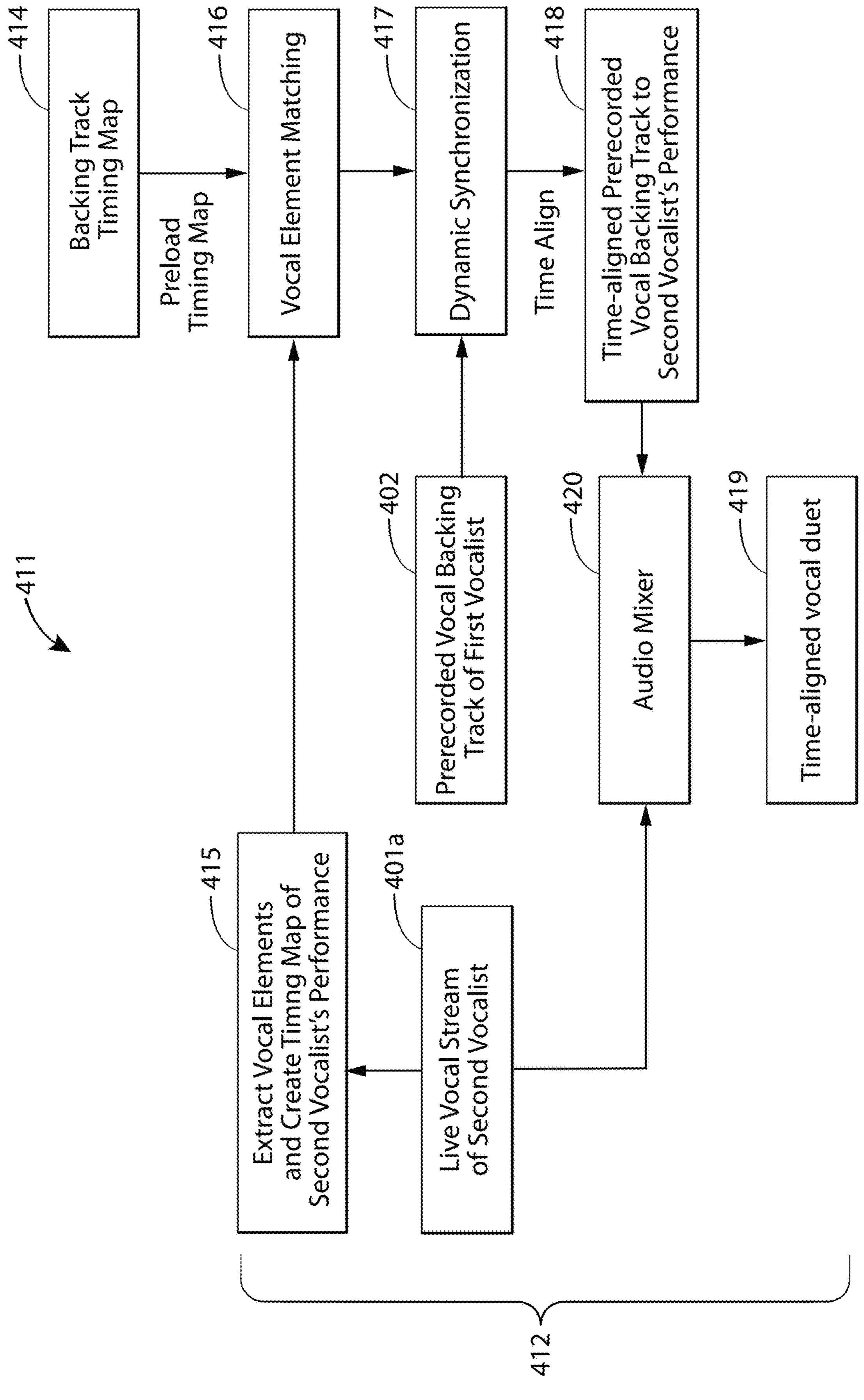
FIG. 45 illustrates a block diagram of FIG. 44, where the second vocalist's live vocal performance may be used to produce a duet with the prerecorded vocal backing track of the first vocalist.

Referring the block diagram 411 of FIG. 45, the second vocalist's live vocal performance may be used to produce a duet with the prerecorded vocal backing track of the first vocalist. As described above, the live vocal stream 401*a* of the second vocalist modifies the timing of the prerecorded vocal backing track 402 of the first vocalist using vocal element extraction/timing map creation algorithm 415, backing track timing map 414, vocal element matching 416, and dynamic synchronization 417. In this scenario, the live vocal stream 401*a* is mixed with the time-aligned prerecorded vocal backing track 418, to produce a time-aligned vocal duet 419. The time-aligned prerecorded vocal backing track 418 and live vocal stream 401*a* may be mixed together using an audio mixer 420. The audio mixer 420 may be implemented in hardware or software. In one instance, the relative level between the live vocal stream 401*a* and the time-aligned prerecorded vocal backing track 418 may be set to a predetermined ratio, or mix. In another instance, the relative level between the live vocal stream 401*a* and the time-aligned prerecorded vocal backing track 418 may be adjustable. Alternatively, the system or software may allow the user to choose between fixed audio mix levels or adjustable audio mix levels.

Figure 46:
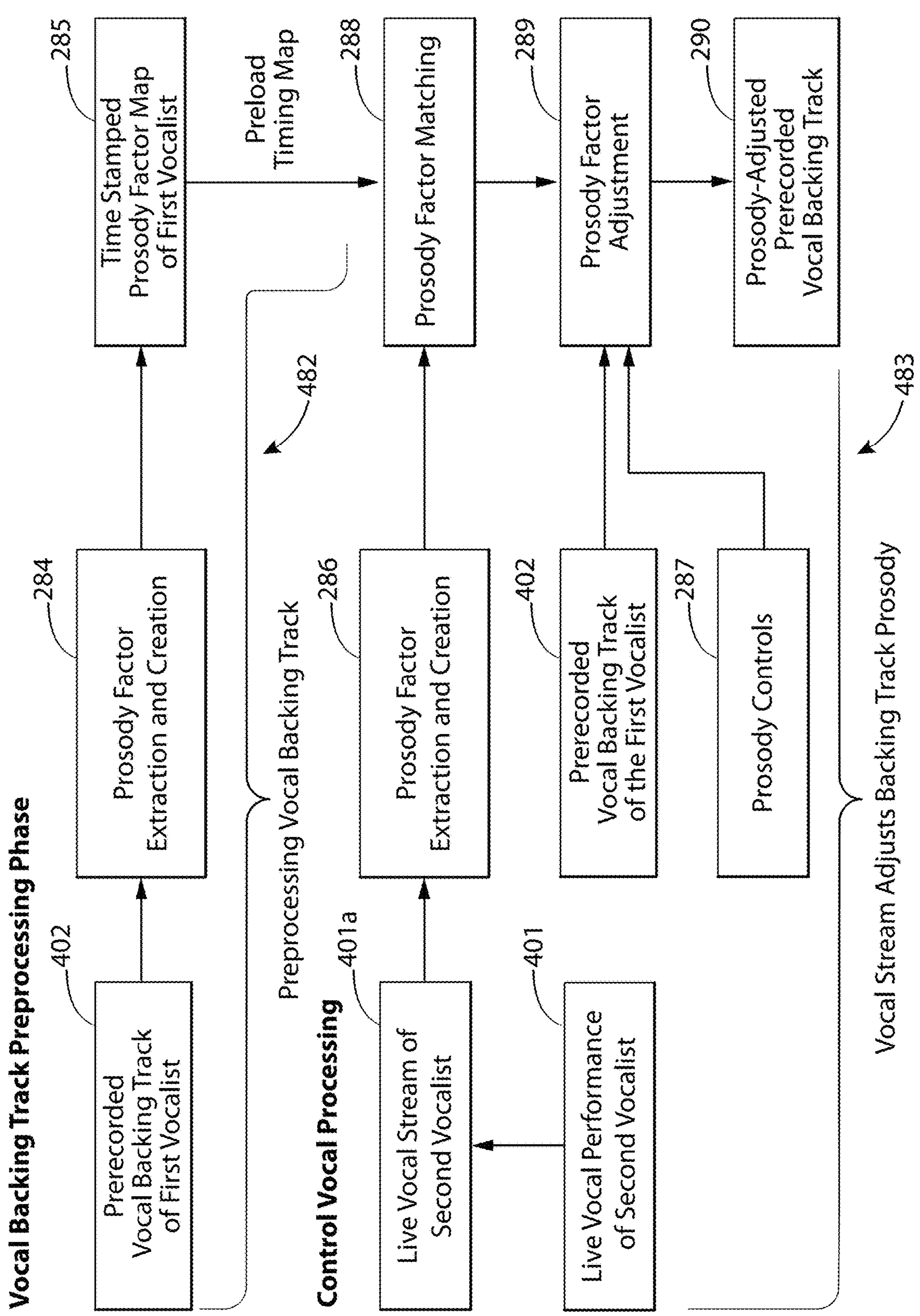
FIG. 46 illustrates a block diagram of FIG. 44, where the second vocalist's live vocal performance may be used to adjust prosody factors of the artist's prerecorded vocal backing track.

Referring to FIG. 46, the live vocal stream 401*a* of the live vocal performance 401 of the second vocalist may also be used to adjust prosody factors of the original vocalist's performance on the prerecorded vocal backing track 402. This results in an output where only the artist's voice (i.e., the first vocalist) is heard, but with timing and phrasing following the second vocalist's performance. The prosody extraction algorithm 284, and the contextual prosody-factor map 285 of the preprocessing phase 482 may function in the same manner as their counterparts of FIG. 27. The prosody factor extraction algorithm 286, the user input controls 287, prosody factor matching 288, and the prosody factor adjustment algorithm 289 of the control vocal processing phase 483 of FIG. 46, may function in the same manner as their counterparts of the control vocal processing phase 183 of FIG. 27. The prosody-adjusted prerecorded vocal backing track 290 that results from the control vocal processing phase 483, may be processed in realtime.

The Inventor's systems, devices, and methods may be applied to scenarios where time aligning a vocal performance or adjusting prosody factors do not necessarily need to be carried out in realtime.

Figure 47:
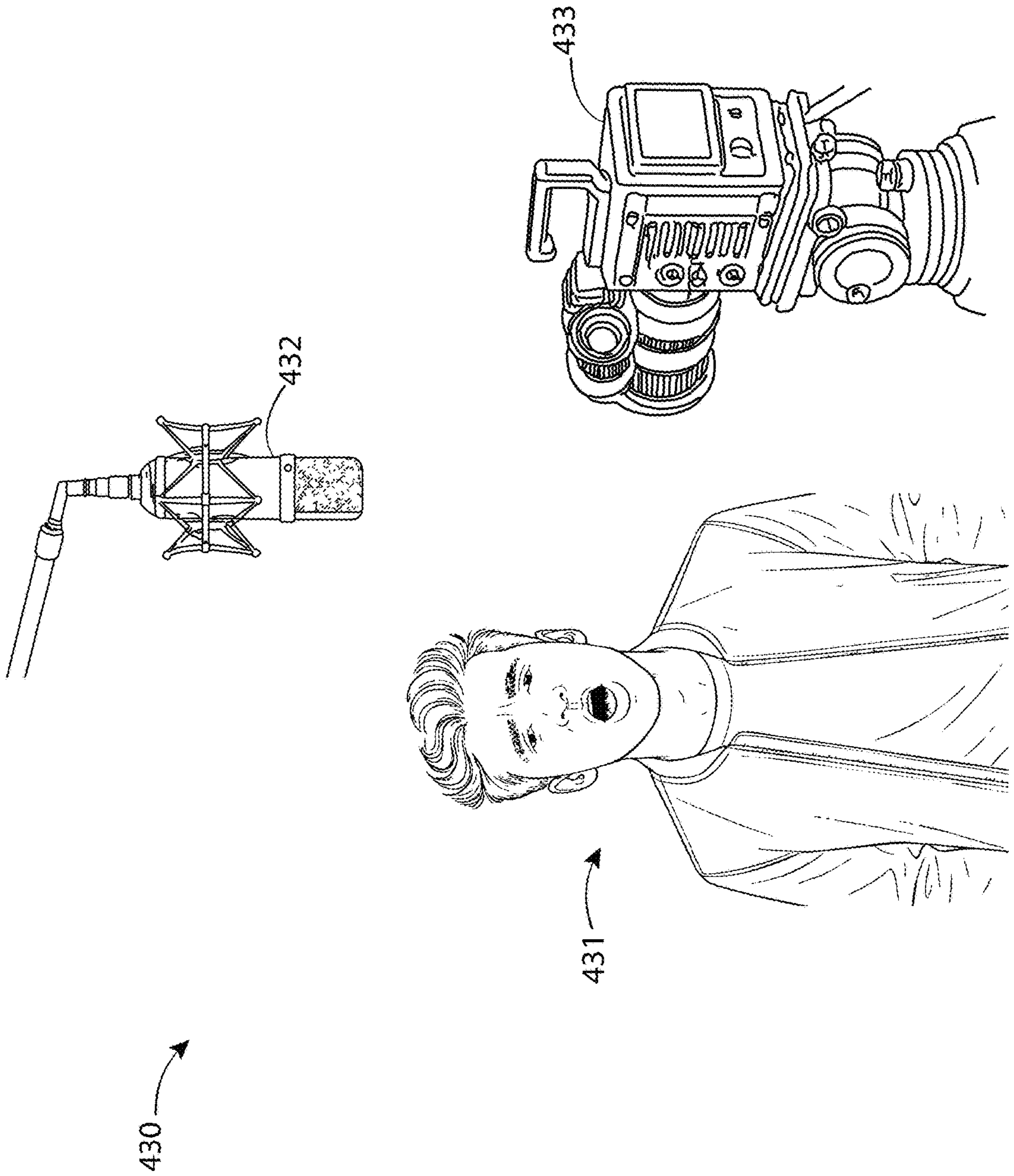
FIGS. 47-49 illustrates dynamically controlling the timing or prosody factors of the prerecorded vocal backing track, using the vocal elements extracted from a performer's vocal performance in motion picture, television, or music video, where
Figure 48:
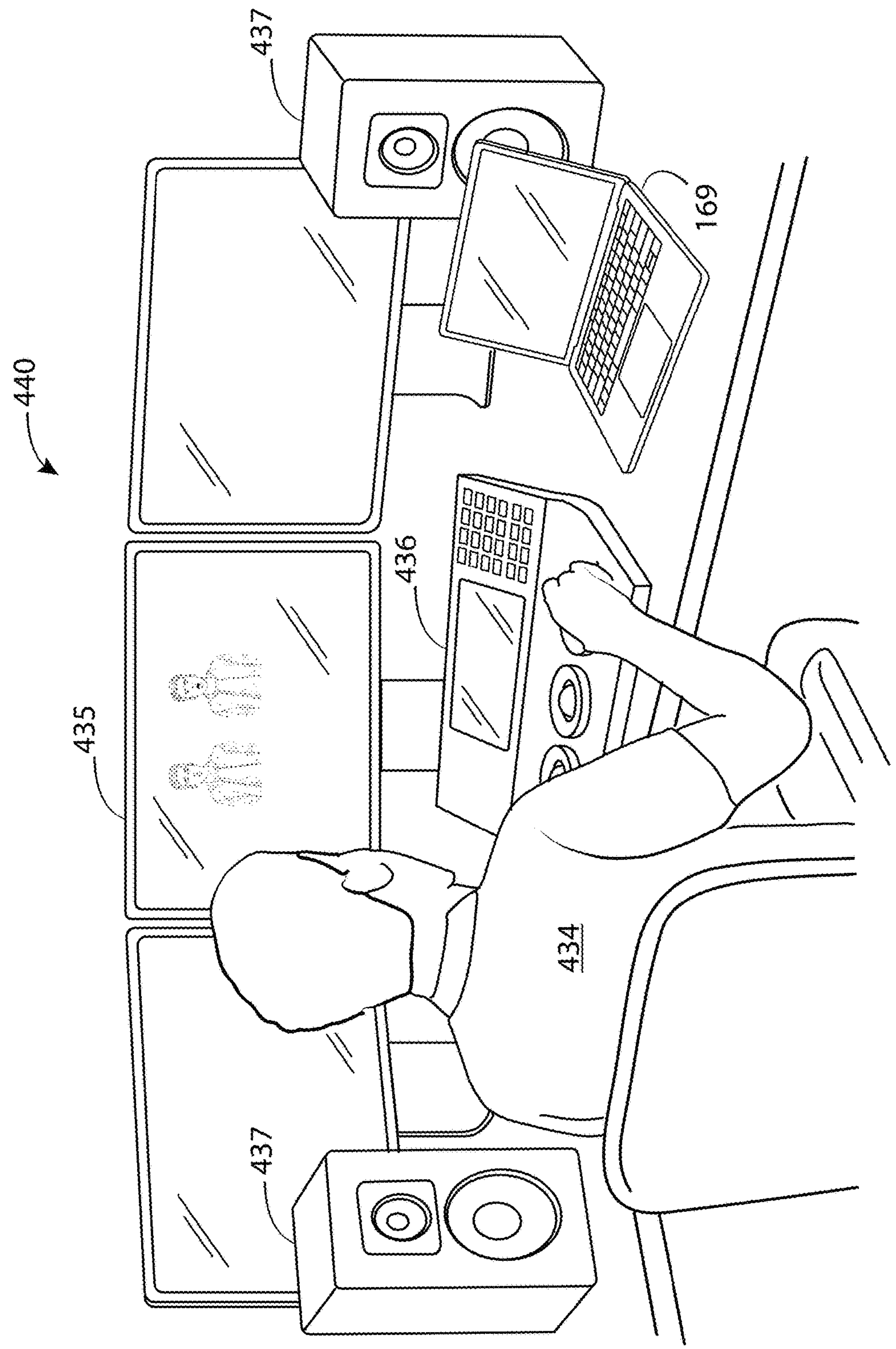

An example where the Inventor's systems, devices, and methods need not be carried out in realtime is in motion pictures, recorded television shows, or music videos. The Inventor's systems, devices, and methods preserves the vocal performance of the performer in the motion picture, television show, or music video by dynamically controlling the timing, and optionally, prosody factors, of the prerecorded vocal backing track using the vocal elements extracted from the vocalist's performance. FIG. 47 illustrates a set 430, with a performer 431 singing to a prerecorded vocal backing track. The set 430, may be, for example, a movie set, a television, or a music video set, or on location. The performer's singing and actions are recorded by a microphone 432 and a video camera 433, respectively. The performer's singing and actions are recorded concurrently. Note that the microphone 432 could be a standalone microphone, or could be built into the video camera or other client device capable of capturing video. Vocal elements are extracted from the audio recording and a timing map is created. This can take place on the set 430. Referring to FIG. 48, the timing map may be created during post production, for example, in a video editing suite 440 using an external computer or standalone device. The resulting performer's timing map may be used to control the prerecorded vocal track. In FIG. 48, one or more external computers, such as external computer 169, or a combination of external computers and standalone devices, may be used to control the timing and prosody factors of the prerecorded vocal backing track. This results in audio that is lip synchronized to the motion picture or video, without manipulation of video or video timing. A controller, such as audio/video editing controller 436, may include software and controls to control the prosody factors or prerecorded vocal backing track timing. The audio may be played back through monitor speakers 437, headphones, or other sound reproduction devices.

Figure 49:
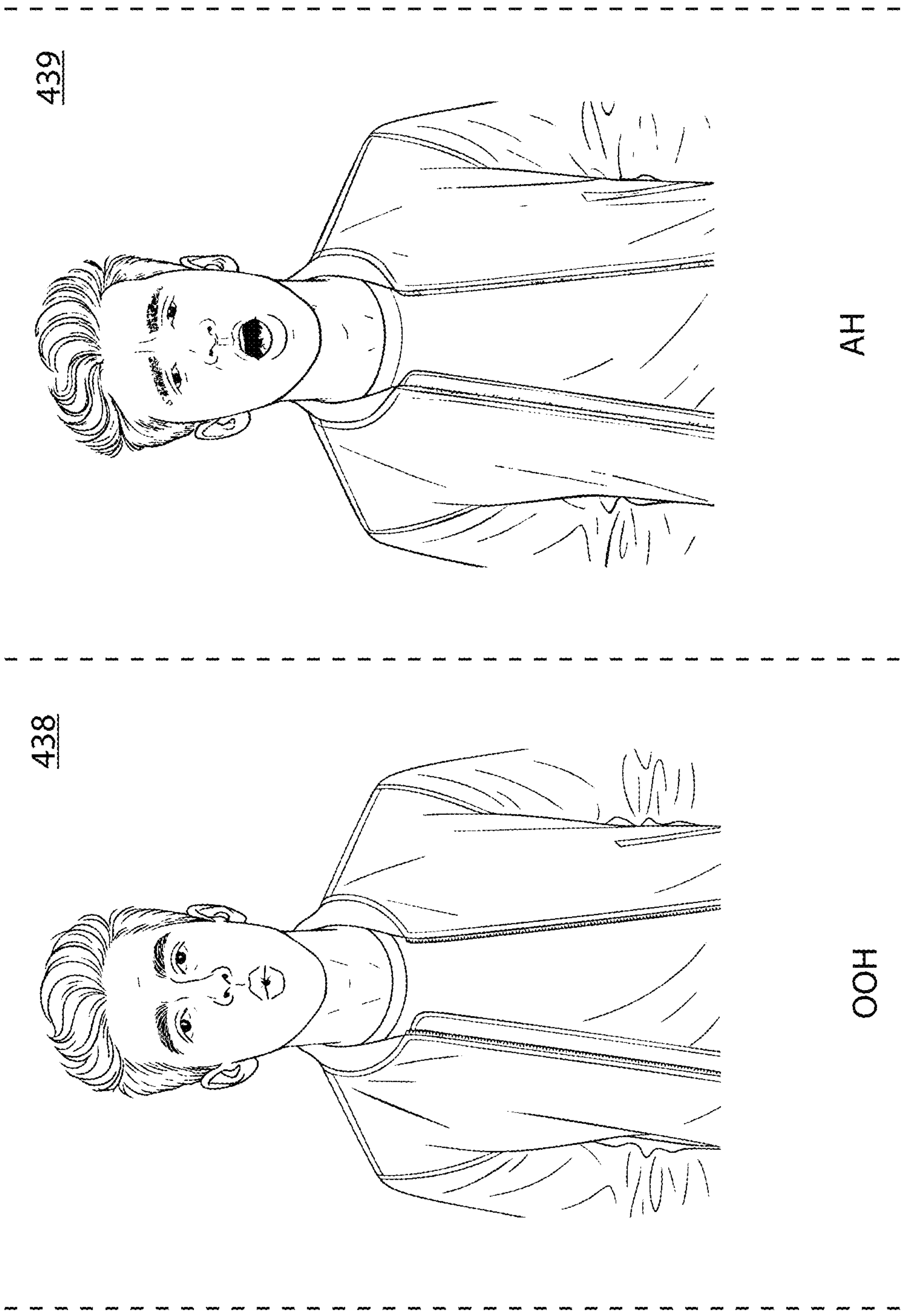

FIG. 49, shows an example of the sung phrases, "ooh" and "ah," with the prerecorded vocal back track synchronized to the audio and video captured on the set 430 in FIG. 47 and taken from a screen 435 of the video editor 434 of FIG. 48. The lip movement of the first frame 438 and the second frame 439 are in sync with the prerecorded backing track because the lip movement corresponds to the vocal performance captured on the set 430 in FIG. 47 and used to control the timing of the prerecorded vocal backing track.

Figure 50:
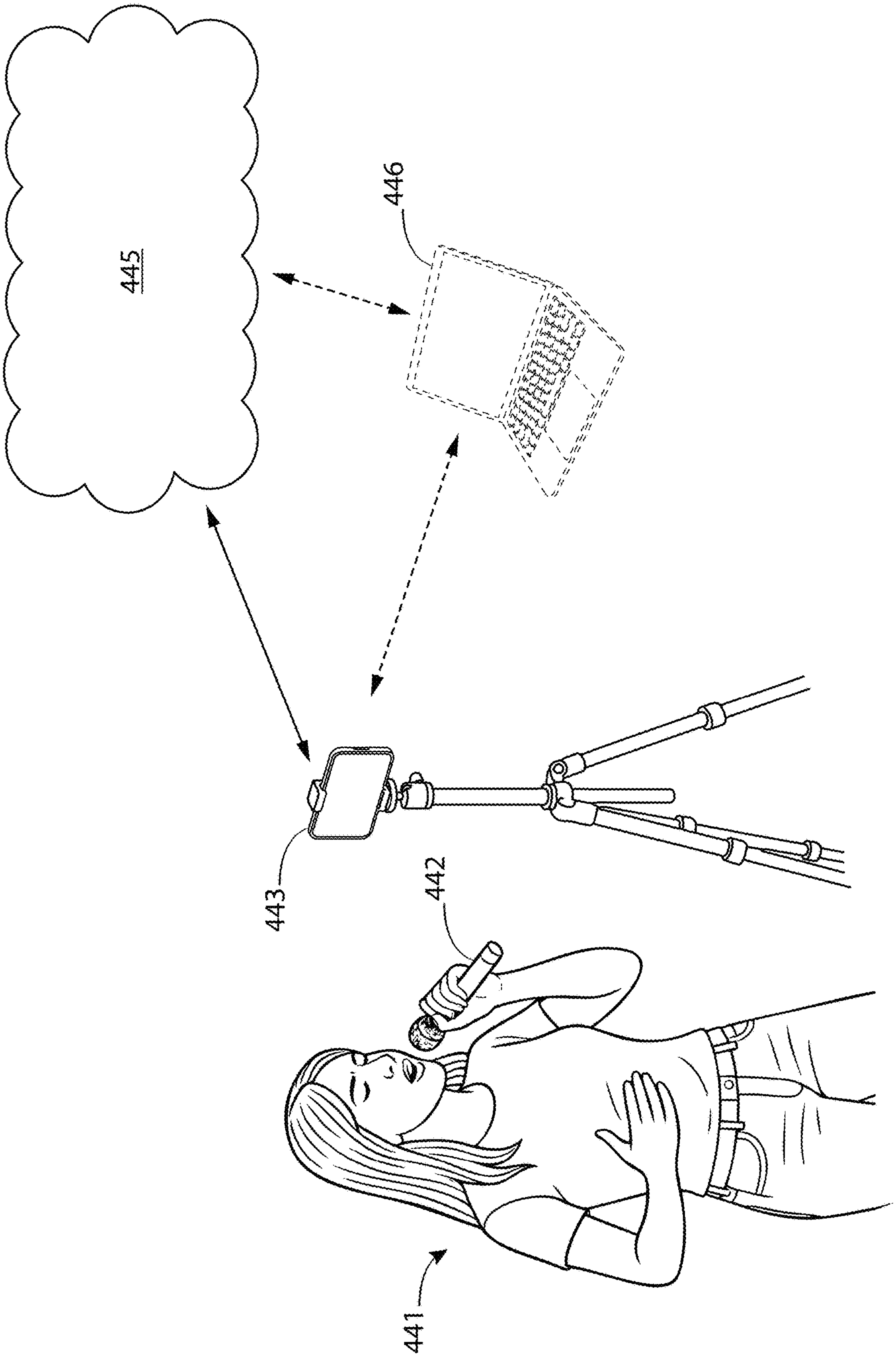
FIG. 50 illustrates the principle of FIGS. 47-49 applied to a fan or content creator, using uploaded audio and video to control the timing or prosody factors of a prerecorded vocal backing track, using a cloud-based platform that enables fans to record covers of popular songs using official backing tracks.

Referring to FIG. 50, using the same principle as described above, a fan 441 or other content creator, could record audio and video of themselves concurrently, singing into a microphone 442 while being video recorded on a client device, such as a mobile device 443 or video camera. Other examples of client devices include a tablet computer, desktop computer, or notebook computer. The microphone 442 could be a standalone-microphone as shown, or could be a microphone or other audio-receiving transducer built into the mobile device 443, camera, or other client device. Their performance may be uploaded directly from the mobile device 443 or optionally from a computer 446 or another client device to a cloud-based platform 445. The cloud-based platform 445 is typically a cloud-based service, such as YouTube, Vimeo, or TikTok. It may be any online service or cloud-based platform that enables fans to record covers of popular songs using official backing tracks.

The uploaded file is processed as a control vocal input and is used to control the timing or prosody factors of a prerecorded vocal backing track to match the fan or content creator's performance. For example, a fan could record a video of their performing a cover of an artist's prerecorded vocal track. A music cover tool, using aspects of the Inventor's systems, methods, or devices, could synchronize or modify prosody factors of the artist's prerecorded vocal track to the fan's vocal performance. After the prerecorded vocal backing track is time-aligned to the fan's vocal performance, the system, or software, may export a video file with audio containing the original artist's prerecorded vocal backing track, time-aligned to the fan's vocal performance. Likewise, the audio file may be prosody factor adjusted to match some of the fan's unique articulation of the original artist's performance. The resulting video file may be uploaded to the cloud-based platform 445. In one scenario, the process of time aligning and prosody factor adjustment may take place on a client device, such as the mobile device 443 or a computer 446, using an app or software that follows the principles discussed within this disclosure. In another scenario, the process could take place on the cloud-based platform, or other remote server, via an app on the computer 446 or mobile device 443. In yet another scenario, the process of producing the finished synchronized video could take place using software on the cloud-based platform 445 itself.

Alternatively, rather than uploading the file to the platform, the fan or content creator could stream their video and audio performance directly from the mobile device 443 or computer 446 to the cloud-based platform 445. In this example, extraction of vocal elements and creating a timing map from those vocal elements can take place on the cloud-based platform 445.

In instances where audio files are uploaded separate from the video, the uploaded audio files may be uploaded using PCM format. Alternatively, the uploaded audio may be encoded and transmitted in a neural audio codec format, such as SoundStream or Encodec, to reduce bandwidth. Vocal element extraction and timing map creation may then occur directly in the codec latent space on the cloud platform, avoiding the need to decode to PCM.

Figure 51:
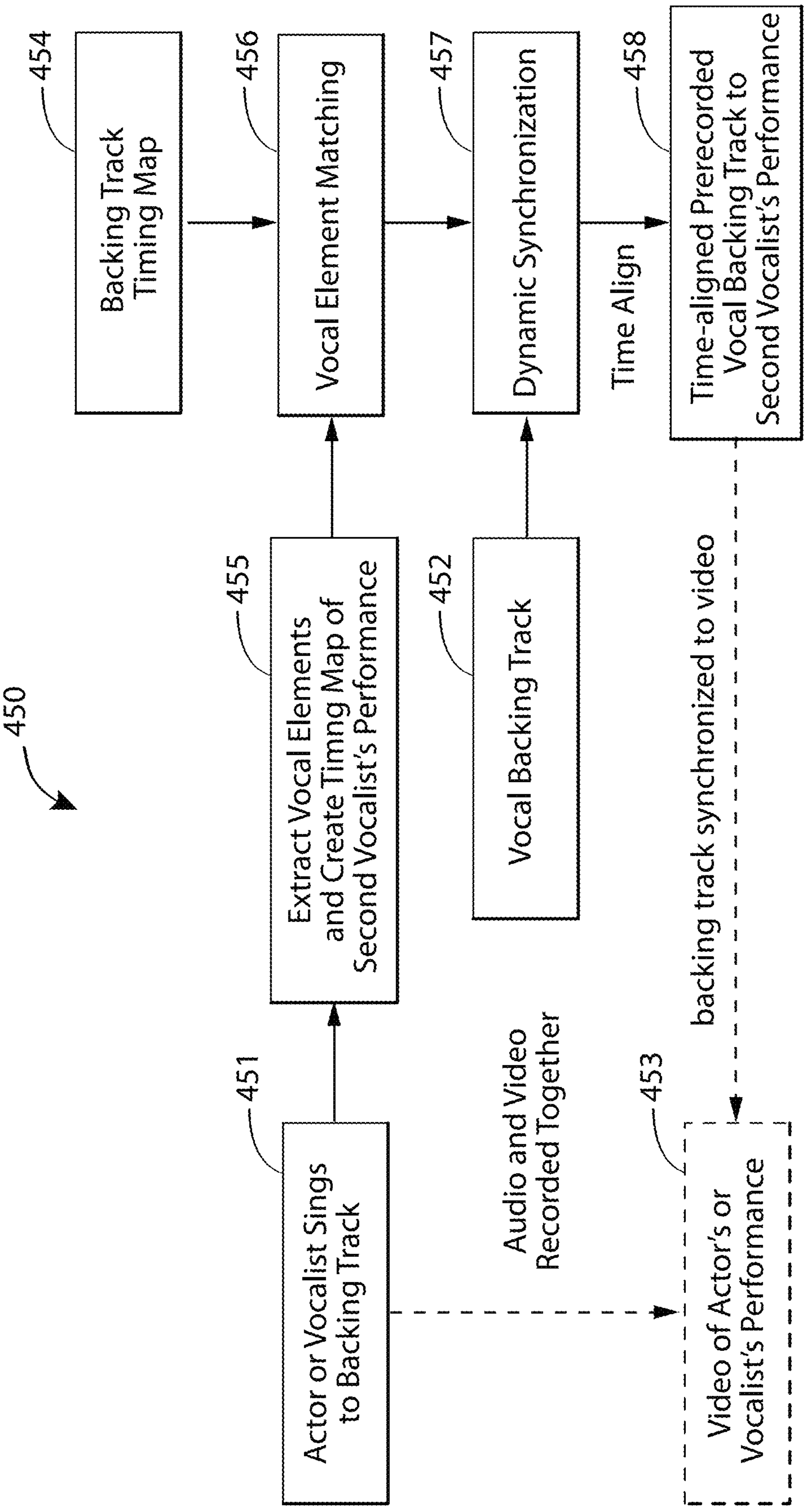
FIGS. 51 and 52 illustrate block diagrams associated with FIGS. 47-50 where a performer's audio performance is used to control the timing and the prosody factors, respectively, of the prerecorded vocal backing track.

FIG. 51 illustrates a block diagram 450 associated with FIGS. 47-50 for controlling the timing of the prerecorded vocal backing track 452 by a performer's vocal performance 451. The performer's vocal performance 451 is captured concurrently with the performer's video performance 453. A vocal element extraction/timing map creation algorithm 455 extracts vocal elements from the performer's vocal performance 451. The resulting vocal performance timing map is used to control the playback of the prerecorded vocal backing track 452. A vocal element matching algorithm 456 matches the vocal elements from the vocal performance timing map to the backing track timing map 454. The dynamic synchronization algorithm 457 adjusts the timing of the prerecorded vocal backing track 452 to the timing of the matched vocal elements from the performer's vocal performance 451. This results in a time-aligned prerecorded vocal backing track 458 that is synchronized to the vocal stream of the performer's vocal performance 451. Because the performer's video performance 453 represents a visual record of the performer's vocal performance 451 (i.e. the audio and video are recording of the same event and are captured concurrently), they are by nature synchronized. Because the time-aligned prerecorded vocal backing track 458 is time-aligned to the performer's vocal performance 451, the time-aligned prerecorded vocal backing track 458 is time aligned to the performer's video performance 453.

Figure 52:
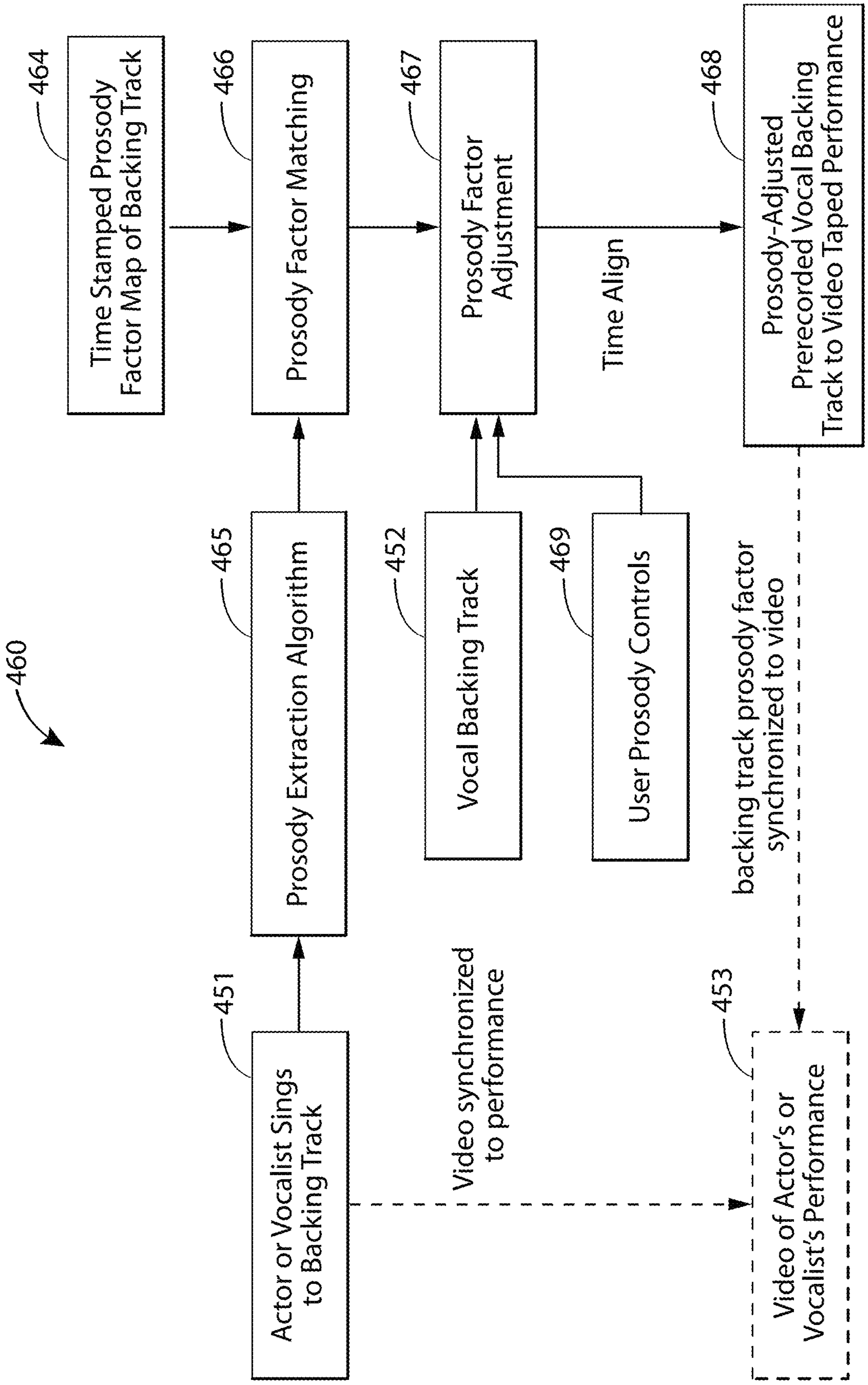

FIG. 52 illustrates a block diagram 460 associated with FIGS. 47-50 where the performer's vocal performance 451 is used to control prosody factors of the prerecorded vocal backing track 452. FIG. 52 applies the more general case of FIG. 27. In FIG. 52 the time stamp backing track prosody factor map 464 may be produced in the same way as described for contextual prosody-factor map 285 of FIG. 27. In FIG. 52, prosody factor extraction algorithm 465, prosody factor matching 466, prosody factor adjustment algorithm 467, prosody-adjusted prerecorded vocal backing track 468, and user input controls 469, may function in the same manner as their counterparts of FIG. 27. The prosody-adjusted prerecorded vocal backing track 468 results from controlling the prosody factors of the prerecorded vocal backing track 452 by the vocal stream of performer's vocal performance 451. Because it adds expressiveness to the prerecorded vocal backing track 452, it better reflects the expressiveness captured visually in the performer's video performance 453.

A prerecorded vocal backing track could be time synchronized or prosody-factor adjusted from a synthetically generated voice. A synthetically generated voice, with specified timing or voice prosody could be used to adjust or correct audio recordings in a recording studio environment or in post-production. For persons with vocal disabilities, but with control over a synthetically generated voice, the Inventor's systems, methods, and devices described herein could use the person's synthetic voice to control the timing and prosody of a prerecorded vocal backing track. A robot with synthetic vocal capabilities could use their voice to control the timing or prosody of a prerecorded vocal backing track.

Figure 53:
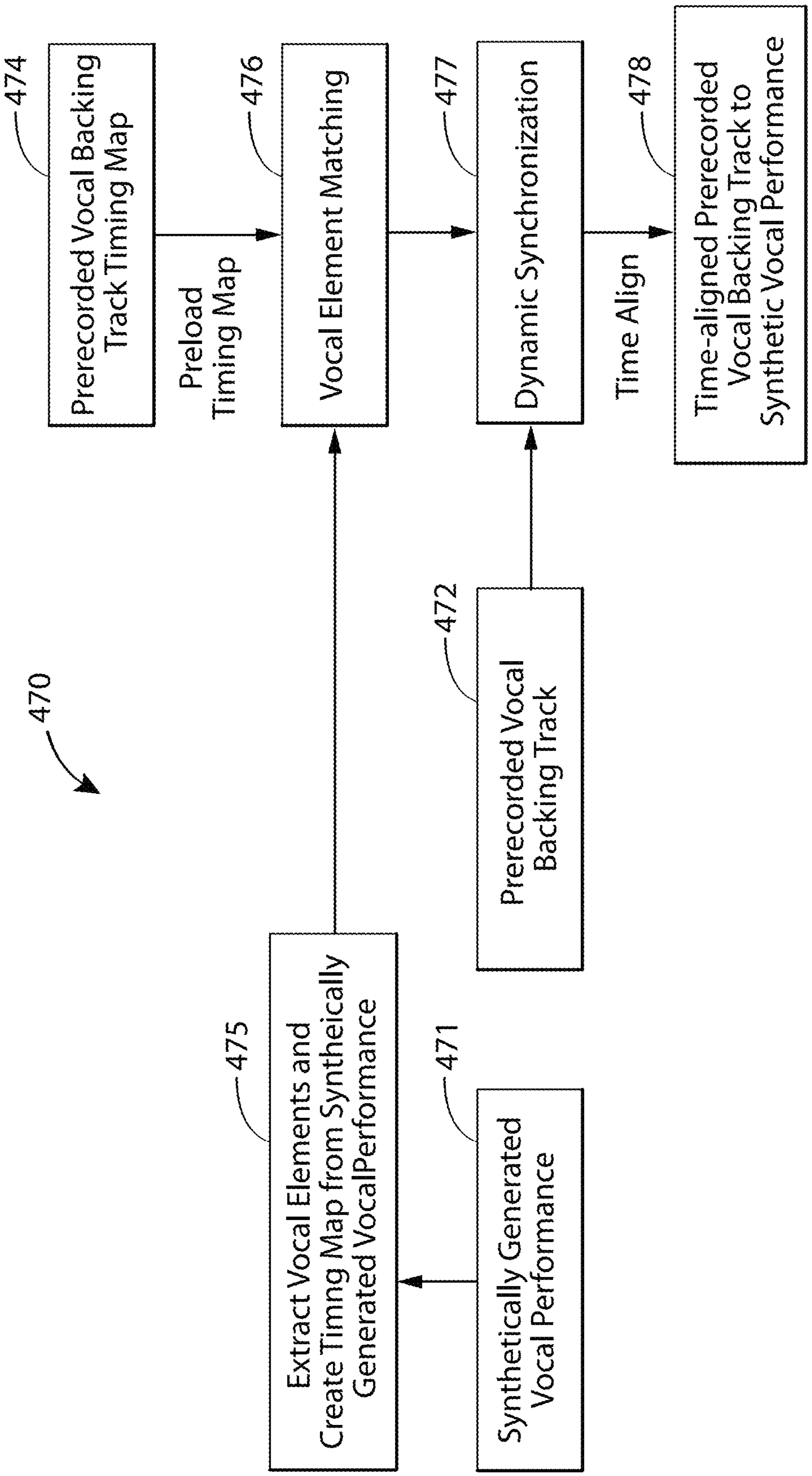
FIGS. 53 and 54 illustrate block diagrams where a synthetically generated voice is used to control the timing and prosody factors, respectively, of a prerecorded vocal backing track.
Figure 54:
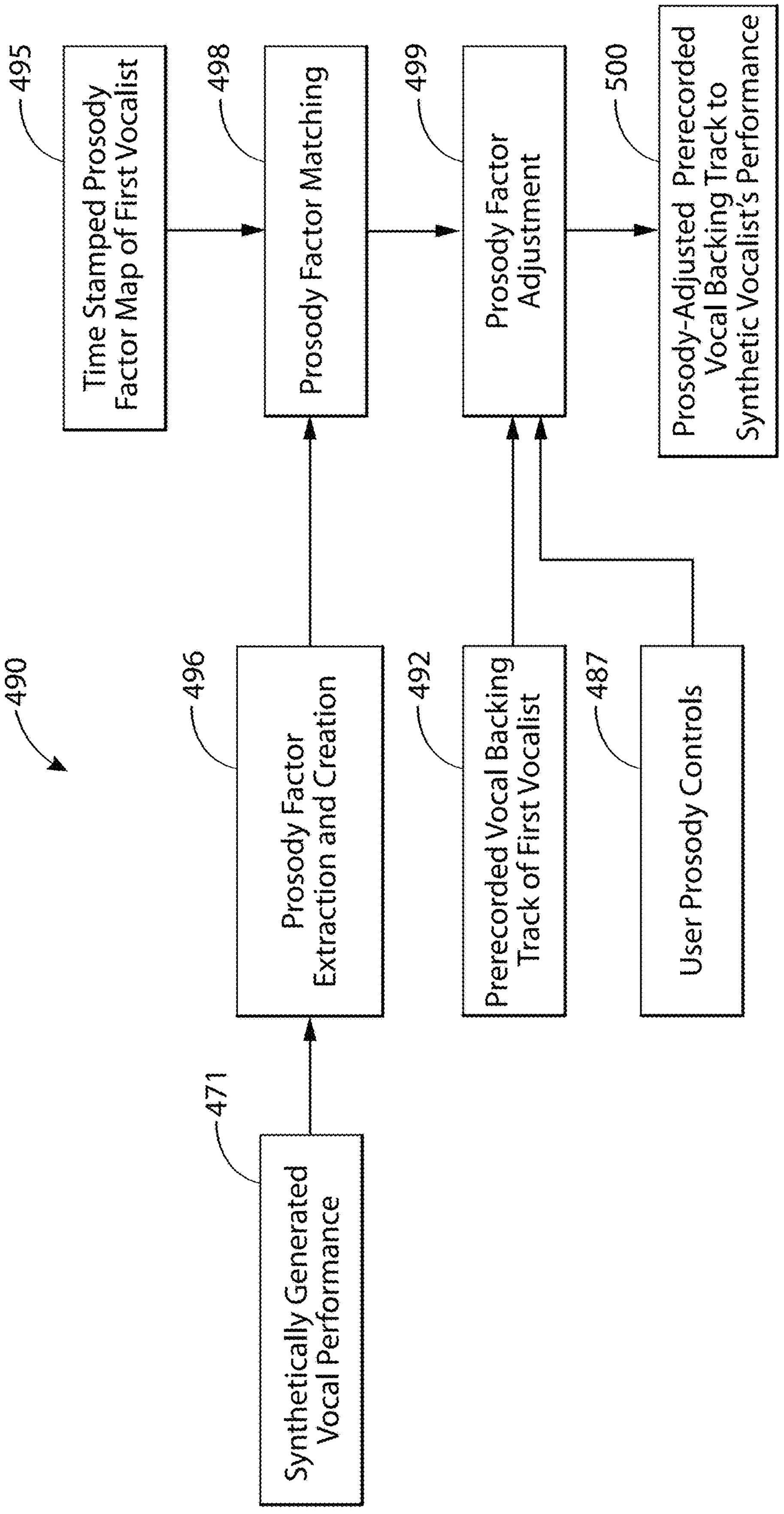

FIGS. 53 and 54 illustrate block diagrams where a synthetically generated voice is used to control the timing and prosody factors, respectively, of a prerecorded vocal backing track. Referring to the block diagram 470 of FIG. 53, the alignment of the prerecorded vocal backing track 472 with the vocal stream is the same as described for FIG. 3 except here, the vocal stream results from a synthetically generated vocal performance 471. Vocal element extraction/timing map creation algorithm 475, vocal element timing map 474, vocal element matching 476, dynamic synchronization 477, and the dynamically controlled prerecorded vocal backing track 478 function and interact the same as their counterpart algorithms in FIG. 3. Referring to the block diagram 490 of FIG. 54, the time stamp backing track prosody factor map 495 may be produced in the same way as described for contextual prosody-factor map 185 of FIG. 27. In FIG. 54, the prerecorded vocal backing track 492, the prosody factor extraction algorithm 496, prosody factor matching 498, the prosody factor adjustment algorithm 499, and the user input controls 487, as well as the prosody-adjusted prerecorded backing track 500 that results may function in the same manner as their counterparts of FIG. 27. In FIG. 54, prosody factor matching is controlled by the synthetically generated vocal performance 471.

CONCLUSION AND VARIATIONS

The Summary, Detailed Description, and figures describe a system, device, and method using vocal element extraction and synchronization to enhance vocal performance. This disclosure provides examples of devices, components, and configurations to help the reader understand the described general principles. The following are examples of variations and combinations of different components, structures, and features that still adhere to the general principles.

Steps or methods performed by "a processor," may be performed by at least one processor, but may be distributed among multiple processors. For example, the process of identifying and extracting vocal elements, such as phonemes, vector embeddings, or vocal audio spectra, may be performed by a single processor, or a multiple core processor, or may be distributed in parallel or serially across more than one processor. The following are a non-exhaustive set of examples. The backing track alignment phase and preprocessing phase within each of the FIGS. 3, 8, 10, 14, 16, may be performed by a single processor, a multi-core processor, or distributed across multiple processors. Likewise, various steps or processes within each of the FIGS. 3, 8, 10, 14, and 16, as well as similar processes on other figures may be performed by a single processor, a multi-core processor, or distributed across multiple processors. These multiple processors may be enclosed within one enclosure or device or distributed among multiple devices. Likewise, step 302, 303, 304 of FIG. 7, may be performed by a single processor or multi-core processor, but it may also be distributed across several processors within single or multiple devices. These multiple processors may be enclosed within one enclosure or device or distributed among multiple devices.

Streaming and time-aligning the prerecorded vocal backing track to a vocal stream can be accomplished by a single-core CPU or multi-core CPU used to identify the vocal elements in the vocal stream. Streaming and time-aligning the prerecorded vocal backing track to a vocal stream may be accomplished by separate CPUs. Likewise, the vocal element extraction and timing map creation algorithm may be executed by a single CPU, a multi-core CPU, or may be performed by separate CPUs. The vocal element extraction process can be separated from the timing map creation process or can be accomplished together as one process. Examples of the vocal element extraction and timing map creation algorithm include Vocal element extraction/timing map creation algorithm 415, 455, 475 of FIGS. 44, 51, 53, respectively. Controlling the gain of the microphone preamplifier within audio interface 198 of FIG. 29 may be accomplished by the multi-core CPU 191, the SoC CPU 203, a dedicated gain control device, or an external computer accessed via the network interface 200. The analog-to-digital conversion process may be controlled by a dedicated analog-to-digital converter. The analog-to-digital converter may be combined with a CPU, SoC CPU, field programable logic arrays (FPGA) or a combination device that includes an analog-to-digital and a digital-to-analog converter. The processor may be a microprocessor, a specialized processor optimized for machine-learning, a multi-core processor with internal memory, a multi-core processor with external memory, a digital signal processor (DSP), or a processor optimized for audio processing. The processor may be one processor or more than one processor that encompasses a combination of some or all of the above-mentioned processor types. Some or all of the processing tasks, audio conversion tasks, or digital audio communication, may alternatively be accomplished by a Field Programable Gate Array (FPGA) or other equivalent devices. Some or all of the digital audio communication tasks may alternatively be accomplished by dedicated integrated circuits.

The tangible medium that stores non-transitory computer-readable instructions that are read and executed by at least one or more processors, may be a memory device separate from the processor such as DRAM or EEC RAM. The tangible medium that stores the non-transitory computer-readable instructions may be a memory device integrated within the processor. The tangible medium that stores non-transitory computer-readable instructions may alternatively, or additionally, be a flash memory, a hard drive, an SSD, or other storage medium known in the art. The non-transitory computer-readable instructions may be stored in one tangible medium, and transferred to another tangible medium. For example, the non-transitory computer-readable instructions may be stored on a solid-state drive, such as general data storage 196 of FIG. 29 and transferred into system memory, such as system memory 192 of FIG. 29. All or part of the non-transitory computer-readable instructions may be transferred, stored, or distributed across multiple devices. For example, some of the non-transitory computer-readable instructions may be stored in memory executable by a first processor, and others may be stored in separate memory executable by a second processor. In another example, some of the non-transitory computer-readable instructions may be stored on a computer or mobile device, while others may be stored in a cloud-based platform.

The microphone preamplifier may be internal or external to the vocal backing track synchronization unit 175. Microphone preamplifier can be in a standalone unit. The microphone preamplifier may be combined with the analog-to-digital converter in a standalone unit, for example the microphone preamplifier converter 221 of FIG. 34. The microphone preamplifier may be inside the microphone. The combination of the microphone preamplifier and analog-to-digital converter may be inside the microphone. The microphone preamplifier or combination of microphone preamplifier and analog-to-digital converter may be inside a digital mixer, or a digital audio workstation. The microphone preamplifier may be within a mobile device, tablet, notebook computer, desktop computer, rackmount computer, or other computing device. The analog-to-digital computer may be within a mobile device, tablet, notebook computer, desktop computer, rackmount computer, or other computing device. The combination of microphone preamplifier may be within a mobile device, tablet, notebook computer, desktop computer, rackmount computer, or other computing device.

FIGS. 4, 5, and 6 illustrate examples of timestamped vocal elements in the form of timestamped phonemes, timestamped feature vectors, and timestamped vocal audio spectra, respectively. These can be stored in standalone files. They may also be appended to the prerecorded vocal backing track, for example as a header file. They can be stored and formatted in any appropriate manner that allows the vocal element extraction and synchronization system to process that data as described within this disclosure.

FIGS. 3, 8, 10-12, 14, 16, 27, 31, 37, 39, 41, 42, 44-46, and 51-54 include software-based conceptual blocks in order to aid the reader's understanding of the disclosed concepts. FIGS. 19, 20, 25, 26, 35, and 36 illustrate hardware elements with software conceptual blocks in dashed lines. Functions within these conceptual blocks may be combined or may be broken down into sub-blocks. For example, referring to FIG. 3, vocal element extraction 115 and vocal element matching 116 might both use the same software, such as ContentVec or Wave2Vec 2.0, and might be combined into one block. As another example, vocal element extraction/timing map creation algorithm 415 of FIG. 44 may be processed as a single software routine. It may be processed as two separate software routines: vocal element extraction and timing map creation. The same may be said for vocal element extraction/timing map creation algorithm 455, 475 of FIGS. 51, 53, respectively. It might be useful, for illustrative purposes, to express conceptual blocks as several sub-blocks, as in the case of FIG. 12. The point being, that the blocks and sub-blocks used throughout this disclosure are conceptual in nature and are presented to simplify explanation. The inventive concept is not limited to these blocks and sub-blocks.

Examples of software that may be suitable for some or all of the tasks associated with extracting phonemes or vector embeddings, creating vector embeddings, as well as timestamping the prerecorded vocal backing track, include ContentVec, Wave2Vec 2.0 (by Meta), HUBERT (by Meta), CMU Sphinx, Kaldi, DeepSpeech (Mozilla), Praat, Gentle Forced Aligner, and NVIDIA Nemo.

FIG. 3 discussed the general case of vocal elements. FIGS. 8, 10, and 14 showed specific examples of vocal elements: phonemes, vector embeddings, and vocal audio spectra, respectively. FIGS. 7, 9, 19, 20, 25, 26, 37, 39, 41, 42, 44, 45, and 51-53 also discuss vocal elements. The vocal elements of FIGS. 3, 7, 9, 19, 20, 25, 26, 37, 39, 41, 42, 44, 45, and 51-53, and any other use of the general expression, "vocal elements," unless otherwise indicated, may be a vocal element as broadly defined within the Definitions subsection of the Detailed Description section of this disclosure. The vocal elements may include two or more types of vocal elements. A first example of two or more types of vocal elements would be phonemes and vector embeddings. A second example of two or more types of vocal elements would be phonemes and vocal audio spectra. A third example of two or more types of vocal elements would be vector embeddings and vocal audio spectra. A fourth example of two or more types of vocal elements would be phonemes, vector embeddings, and vocal audio spectra. The two or more types of types of vocal elements could be used with or without confidence weighting. Dynamically controlling timing of the prerecorded vocal backing track may use two or more types of vocal elements extracted from the vocal performance, matched to corresponding timestamped two or more types of vocal elements, extracted from the prerecorded vocal backing track. For example, phonemes and vector embeddings could be extracted from the vocal performance. The phonemes extracted from the vocal performance could be matched to corresponding timestamped phonemes extracted from the prerecorded vocal backing track. At the same time, vector embeddings extracted from the vocal performance could be matched to corresponding timestamped vector embeddings extracted from the prerecorded vocal backing track.

While this description discussed three types of vocal elements, phonemes, vector embeddings, and vocal audio spectra, there are other types of vocal elements that could be used by following similar principles. For example, the vocal element extraction and synchronization system could use feature vectors. Feature vectors could be utilized in a similar manner as discussed for vector embeddings in FIG. 10.

The monitor speakers 166 in FIG. 18, the monitor speakers 437 of FIG. 48, and PA speakers 228 of FIG. 34 are assumed to be self-powered and include built-in audio amplifiers. Alternatively, any of the depicted self-powered speakers may be passive and be paired with external amplifiers. The live sound mixer 222 of FIG. 34 may be self-powered and be paired with passive speakers. In the case of self-powered speakers, the feed between the audio mixer or digital audio workstation may be analog or digital. In the case of passive speakers, the feed between the audio mixer or digital audio workstation and power amplifier may be analog or digital. The speakers 179 of FIGS. 21 and 40 are depicted as a pair of line-array speakers. This is to simplify illustration. A typical large-venue concert may include many clusters of line array speakers as well as sub-woofers. Typical line array speakers used in large venues include Clair Cohesion series CO-12. In addition, the speakers are not limited to line array speakers. FIG. 21 illustrates the speakers being fed by audio amplifiers 178. As with the speakers 179 the illustrated number of the audio amplifiers 178 is for illustration purposes. The number of audio amplifiers, as well as the number and type of speakers, may be readily determined by one skilled in the art of live sound system design. The speakers 179 may, alternatively, be active speakers (i.e., include built in amplifiers), eliminating the need for the audio amplifiers 178. An example of a self-powered speaker suitable for large venues is the Panther by Meyer Sound.

Note that while FIGS. 21 and 40 depicts a large-venue concert system, the vocal backing track synchronization unit 175 is not limited to such and may be used in live sound venues of any size. For example, a prosumer-level live sound mixer, digital audio workstation, or even a laptop computer, coupled with external audio converters, could be substituted for the front-of-house mixer 176. PA speakers 228, such as those illustrated in FIG. 31, may be substituted for the speakers 179 and audio amplifiers 178 in FIG. 21.

FIG. 48 depicts an example of video editing suite 440. The components shown are illustrative and not limiting. For example, the external computer 169 could be a desktop computer, notebook computer, rackmount computer, a dedicated editing device, or could even be cloud based. It could be combination of the above. The video editing controller 436 could be a standalone editor or a controller used to perform editing functions on the external computer 169. Alternatively, the audio and video editing may be performed on the external computer 169 without the video editing controller 436 or dedicated editing device. The audio time-alignment and prosody factor adjustment could take place in an audio post-production suite, or a combination audio and video post-production suite. Whether in the video editing suite 440, post production suite, or any other environment suitable for editing audio, the vocal element extraction and synchronization process could take place using any suitable device or combination of devices. As non-exhaustive examples, the vocal element extraction and synchronization process could take place using a standalone device as previously discussed, an external computer, a mobile device, cloud-based processing, or a combination of these.

While this disclosure discusses several advantages of using a neural audio codec latent feature space, it does not imply that the use of neural audio codecs and neural audio codec latent feature space should be used to the exclusion of the PCM domain. There are circumstances where using the PCM domain may be advantageous. For example, there are many audio hardware circuits as well as software routines that operate natively in the PCM domain. Which works best, or which other operating domain works best, is up to the reader's individual application. The inventive concept is not limited to either of the PCM domain or a neural audio codec latent feature space.

The variations described, the general principles taught, and undescribed variations, devices, and systems that encompass the general principles described in this disclosure, are within the claim's scope.

The invention claimed is:

1. A method, comprising:

identifying and extracting vocal elements from a vocal stream, by at least one of one or more processors, the vocal stream digitally representing a vocal performance;

dynamically controlling timing of a prerecorded vocal backing track using the vocal elements extracted from the vocal stream matched to timestamped vocal elements from the prerecorded vocal backing track by at least one of the one or more processors; and outputting a resulting dynamically controlled prerecorded vocal backing track that is time-synchronized to the vocal stream.

2. The method of claim 1, further comprising:

capturing the vocal performance to produce the vocal stream.

3. The method of claim 1, further comprising:

capturing the vocal performance using analog-to-digital conversion.

4. The method of claim 1, further comprising:

preprocessing the prerecorded vocal backing track before the vocal performance by identifying, extracting, and timestamping backing track vocal elements, creating the timestamped vocal elements.

5. The method of claim 1, wherein:

dynamically controlling the timing of the prerecorded vocal backing track includes using time compression and expansion of the prerecorded vocal backing track based on timing differences between the vocal elements extracted from the vocal stream and the timestamped vocal elements from the prerecorded vocal backing track.

6. The method of claim 1, wherein:

the timestamped vocal elements include timestamped phonemes;

the vocal elements include phonemes;

identifying and extracting the phonemes from the vocal stream; and dynamically controlling the timing of the prerecorded vocal backing track using the phonemes extracted from the vocal stream matched to the timestamped phonemes from the prerecorded vocal backing track.

7. The method of claim 1, wherein:

the timestamped vocal elements include timestamped vector embeddings;

the vocal elements include vector embeddings;

identifying and extracting the vector embeddings from the vocal stream; and dynamically controlling the timing of the prerecorded vocal backing track using the vector embeddings extracted from the vocal stream matched to the timestamped vector embeddings from the prerecorded vocal backing track.

8. The method of claim 1, wherein:

the timestamped vocal elements include timestamped vocal audio spectra;

the vocal elements include vocal audio spectra;

identifying and extracting the vocal audio spectra from the vocal stream; and dynamically controlling the timing of the prerecorded vocal backing track using the vocal audio spectra extracted from the vocal stream matched to the timestamped vocal audio spectra from the prerecorded vocal backing track.

9. The method of claim 1, wherein:

the timestamped vocal elements include timestamped two or more types of vocal elements;

the vocal elements include two or more types of vocal elements;

identifying and extracting the two or more types of vocal elements from the vocal stream; and dynamically controlling the timing of the prerecorded vocal backing track in using the two or more types of vocal elements extracted from the vocal stream matched to the timestamped two or more types of vocal elements from the prerecorded vocal backing track.

10. The method of claim 9, further comprising:

obtaining a confidence weight by comparing the two or more types of vocal elements to the timestamped two or more types of vocal elements by at least one of the one or more processors; and dynamically controlling the timing of the prerecorded vocal backing track based at least in part whether the confidence weight is above or below a predetermined confidence threshold by at least one of the one or more processors.

11. A system, comprising:

a tangible medium that includes non-transitory computer-readable instructions that, when applied to one or more processors, instructs the one or more processors to perform a method comprising:

(a) identifying and extracting vocal elements from a vocal stream by at least one of the one or more processors, the vocal stream digitally representing a vocal performance; and (b) dynamically controlling timing of a prerecorded vocal backing track using the vocal elements extracted from the vocal stream matched to timestamped vocal elements from the prerecorded vocal backing track by at least one of the one or more processors; and outputting a resulting dynamically controlled prerecorded vocal backing track in that is time-synchronized to the vocal stream.

12. The system of claim 11, further comprising:

the one or more processors.

13. The system of claim 11, further comprising:
the one or more processors; and
an analog-to-digital converter structured to digitally represent the vocal performance as the vocal stream.

14. The system of claim 11, wherein:
the tangible medium instructs at least one of the one or more processors to dynamically control the timing of the prerecorded vocal backing track using time compression and expansion of the prerecorded vocal backing track based on timing differences between the vocal elements extracted from the vocal stream and the timestamped vocal elements from the prerecorded vocal backing track.

15. The system of claim 11, wherein:
the timestamped vocal elements include timestamped phonemes;
the vocal elements include phonemes;
the tangible medium instructs at least one of the one or more processors to identify and extract the phonemes from the vocal stream; and
the tangible medium instructs at least one of the one or more processors to dynamically control the timing of the prerecorded vocal backing track using the phonemes extracted from the vocal stream matched to the timestamped phonemes from the prerecorded vocal backing track.

16. The system of claim 11, wherein:
the timestamped vocal elements include timestamped vector embeddings;
the vocal elements include vector embeddings; and
the tangible medium further instructs at least one of the one or more processors to dynamically controlling the timing of the prerecorded vocal backing track using the vector embeddings extracted from the vocal stream matched to timestamped vector embeddings from the prerecorded vocal backing track.

17. The system of claim 11, wherein:
the timestamped vocal elements include timestamped vocal audio spectra;
the vocal elements include vocal audio spectra; and
the tangible medium further instructs at least one of the one or more processors to dynamically controlling the timing of the prerecorded vocal backing track using the vocal audio spectra extracted from the vocal stream matched to timestamped vocal audio spectra from the prerecorded vocal backing track.

18. The system of claim 11, wherein:
the timestamped vocal elements include timestamped two or more types of vocal elements;
the vocal elements include two or more types of vocal elements; and
the tangible medium further instructs at least one of the one or more processors to dynamically control the timing of the prerecorded vocal backing track in using the two or more types of vocal elements matched to the timestamped two or more types of vocal elements from the prerecorded vocal backing track.

19. The system of claim 18, wherein:
the tangible medium further instructs at least one of the one or more processors to obtain a confidence weight by comparing the two or more types of vocal elements to the timestamped two or more types of vocal elements; and
the tangible medium further instructs at least one of the one or more processors to dynamically control the timing of the prerecorded vocal backing track based on at least in part whether the confidence weight is above or below a predetermined confidence threshold.

20. The system of claim 11, wherein:
the tangible medium instructs at least one of the one or more processors to:
extract vocal elements in a latent frame from a neural audio codec latent feature space and load a resulting extracted vocal elements into a predictive model; and
forecast alignment of the resulting extracted vocal elements in a time interval ahead of a current frame position of the latent frame.

21. The system of claim 20, wherein:
the tangible medium instructs at least one of the one or more processors to:
adjust prosody factors of the prerecorded vocal backing track in realtime based on the forecast alignment of the resulting extracted vocal elements in the time interval ahead of the current frame position.

* * * * *